(12) United States Patent
Zhang et al.

(10) Patent No.: US 10,856,260 B2
(45) Date of Patent: Dec. 1, 2020

(54) DATA TRANSMISSION METHOD AND RELATED DEVICE

(71) Applicant: Huawei Technologies Co., Ltd., Guangdong (CN)

(72) Inventors: Jian Zhang, Shanghai (CN); Mingzeng Dai, Shanghai (CN); Jing Liu, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 7 days.

(21) Appl. No.: 15/858,209

(22) Filed: Dec. 29, 2017

(65) Prior Publication Data

US 2018/0146452 A1 May 24, 2018

Related U.S. Application Data

(63) Continuation of application No. PCT/CN2016/085316, filed on Jun. 8, 2016.

(30) Foreign Application Priority Data

Jun. 30, 2015 (CN) .......................... 2015 1 0372345

(51) Int. Cl.
*H04W 48/20* (2009.01)
*H04W 24/04* (2009.01)
(Continued)

(52) U.S. Cl.
CPC ......... *H04W 72/005* (2013.01); *H04W 24/04* (2013.01); *H04W 28/16* (2013.01);
(Continued)

(58) Field of Classification Search
CPC ......... H04L 45/74; H04L 47/41; H04L 69/22; H04W 80/02; H04W 84/12; H04W 88/06; H04W 88/10; H04W 76/10; H04W 72/042
See application file for complete search history.

(56) References Cited

U.S. PATENT DOCUMENTS

2007/0258406 A1 11/2007 Kaitz et al.
2011/0310841 A1* 12/2011 Jung ................. H04W 36/0055
370/331
(Continued)

FOREIGN PATENT DOCUMENTS

CN 102111828 A 6/2011
CN 103945470 A 7/2014
(Continued)

*Primary Examiner* — Un C Cho
*Assistant Examiner* — Peter K Mak
(74) *Attorney, Agent, or Firm* — Womble Bond Dickinson (US) LLP

(57) ABSTRACT

The application provides a data transmission method and a related device. The data transmission method includes: determining, by a first radio access network node, first allocation information when a target radio access network node is the first radio access network node; or, when the target radio access network node is a second radio access network node, instructing, by the first radio access network node, the second radio access network node to determine second allocation information; or, when the target radio access network node is the first radio access network node and a second radio access network node, determining, by the first radio access network node, third allocation information and fourth allocation information.

17 Claims, 36 Drawing Sheets

(51) Int. Cl.
*H04W 72/04* (2009.01)
*H04W 74/08* (2009.01)
*H04W 72/00* (2009.01)
*H04W 28/16* (2009.01)
*H04W 48/08* (2009.01)
*H04W 48/16* (2009.01)

(52) U.S. Cl.
CPC .......... *H04W 48/08* (2013.01); *H04W 48/16* (2013.01); *H04W 48/20* (2013.01); *H04W 72/0453* (2013.01)

(56) References Cited

U.S. PATENT DOCUMENTS

| | | | |
|---|---|---|---|
| 2012/0300710 A1 | 11/2012 | Li et al. | |
| 2013/0176988 A1* | 7/2013 | Wang | H04L 61/2007 370/331 |
| 2014/0140335 A1* | 5/2014 | Wang | H04W 28/08 370/338 |
| 2014/0226481 A1 | 8/2014 | Dahod et al. | |
| 2014/0349667 A1 | 11/2014 | Hahn et al. | |
| 2015/0319800 A1* | 11/2015 | Park | H04L 1/1812 370/329 |
| 2015/0358865 A1* | 12/2015 | Fu | H04W 36/0033 455/436 |
| 2015/0373584 A1* | 12/2015 | Hong | H04W 28/08 370/329 |
| 2016/0029235 A1* | 1/2016 | Kim | H04W 24/08 370/252 |
| 2017/0171797 A1* | 6/2017 | Nigam | H04W 68/005 |
| 2017/0215122 A1* | 7/2017 | Nigam | H04W 12/08 |

FOREIGN PATENT DOCUMENTS

| | | |
|---|---|---|
| CN | 104113875 A | 10/2014 |
| EP | 2785107 A1 | 10/2014 |
| EP | 2919523 A1 | 9/2015 |
| EP | 2924924 A1 | 9/2015 |
| WO | 2005029881 A2 | 3/2005 |
| WO | 2014011091 A1 | 1/2014 |
| WO | 2014086027 A1 | 6/2014 |
| WO | 2014089833 A1 | 6/2014 |

* cited by examiner

DATA TRANSMISSION METHOD AND RELATED DEVICE

CROSS-REFERENCE TO RELATED APPLICATIONS

This application is a continuation of International Application No. PCT/CN2016/085316, filed on Jun. 8, 2016, which claims priority to Chinese Patent Application No. 201510372345.4, filed on Jun. 30, 2015, all of which are hereby incorporated by reference in their entireties.

TECHNICAL FIELD

The present disclosure is applicable to the communications field, and in particular, to a data transmission method and a related device.

BACKGROUND

Exponential growth of services drives a mobile network to evolve into a 5G mobile network. The 5G network needs to provide a larger bandwidth, higher spectrum efficiency, and the like to support explosive growth of services. Ultradense and low-power small-cell networks can effectively provide larger traffic. However, dense network deployment increases inter-cell interference and causes more complex interference scenarios. A cloud radio access network (C-RAN) is also referred to as a distributed base station. The cloud radio access network includes a remote radio head (RRH) and a baseband unit (BBU) pool. The RRH and the BBU pool are connected by using a common public radio interface (CPRI). According to different base station function division between the BBU and the RRH, there are two solutions. In solution 1 shown in FIG. 1, the BBU and the RRH are separated between a baseband processing part and a radio frequency part, that is, the CPRI in solution 1 is between the baseband processing part and the radio frequency part. In solution 2 shown in FIG. 2, the BBU and the RRH are separated between a main control & clock part and a baseband processing part, that is, the CPRI in solution 2 is between the main control & clock part and the baseband processing part.

According to different function division manners in solution 1 and solution 2, there are two C-RAN aggregation architectures. All digital signal processing units of a base station, including physical layer baseband processing, high-layer protocol processing, main control & clock, and the like, are centralized in the first C-RAN aggregation architecture, and connected to a distributed remote radio unit by using a CPRI high-speed fiber interface. The RRH is responsible for only a radio frequency transmitting and receiving function after digital-analog conversion. This architecture features a technical characteristic of centralized processing, can implement resource sharing to the greatest extent, and can more conveniently support collaborative signal processing between multiple base stations. A main disadvantage of this architecture is that a high requirement is imposed on a CPRI transmission bandwidth, for example, in TD-LTE, an 8-antenna 20 MHz single-carrier requires a bandwidth of 10 gigabits/second (Gbps). In the second C-RAN architecture, baseband signal processing parts such as physical layer demodulation and decoding of the base station are separated from the centralized BBU and placed in the RRH. Compared with the first C-RAN architecture, only demodulated data needs to be transmitted between a BBU device and an RRH device, and a transmission bandwidth can be reduced to 1/20 to 1/50 of an original transmission bandwidth. A disadvantage of the second C-RAN architecture is as follows: Baseband processing is integrated into the RRH, and this is not convenient for multiple base stations to share processing resources or collaborative processing for a radio signal. It may be learned that it is difficult to perform flexible deployment according to an existing service by using two division manners for the cloud radio access network in the prior art. For example, a division manner for the cloud radio access network in solution 1 cannot be reconfigured as a division manner for the cloud radio access network in solution 2.

SUMMARY

The present disclosure provides a data transmission method that can effectively reduce a performance requirement and costs for an interface between a first radio access network node and a second radio access network node.

A first aspect of embodiments of the present disclosure provides a data transmission method, including:

determining, by a first radio access network node, a target radio access network node to which a media access control layer serving a target terminal belongs; and determining, by the first radio access network node, first allocation information when the target radio access network node is the first radio access network node, where the first allocation information is used to instruct the first radio access network node to configure a first media access control layer function used to serve the target terminal; or when the target radio access network node is a second radio access network node, instructing, by the first radio access network node, the second radio access network node to determine second allocation information, where the second allocation information is used to instruct the second radio access network node to configure a second media access control layer function used to serve the target terminal; or when the target radio access network node is the first radio access network node and a second radio access network node, determining, by the first radio access network node, third allocation information and fourth allocation information, where the third allocation information is used to instruct the first radio access network node to configure a third media access control layer function used to serve the target terminal, the fourth allocation information is used to instruct the second radio access network node to configure a fourth media access control layer function used to serve the target terminal, and the third media access control layer function and the fourth media access control layer function collaboratively serve the target terminal.

With reference to the first aspect of the embodiments of the present disclosure, in a first implementation of the first aspect of the embodiments of the present disclosure, after the determining, by the first radio access network node, first allocation information, the method further includes:

configuring, by the first radio access network node, the first media access control layer function according to the first allocation information, where the first media access control layer function is all functions that are of a media access control layer of the first radio access network node and are used to serve the target terminal; and sending, by the first radio access network node, the first allocation information to the second radio access network node, where the first allocation information is used to enable the second radio access network node to determine that the first radio access network node is the target radio access network node.

With reference to the first aspect of the embodiments of the present disclosure, in a second implementation of the first aspect of the embodiments of the present disclosure, the instructing, by the first radio access network node, the second radio access network node to determine second allocation information includes:

generating, by the first radio access network node, configuration information; and sending, by the first radio access network node, the configuration information to the second radio access network node, where the configuration information is used to enable the second radio access network node to determine the second allocation information, so that the second radio access network node configures the second media access control layer function for the target terminal according to the second allocation information, and the second media access control layer function is all functions that are of a media access control layer of the second radio access network node and are used to serve the target terminal.

With reference to the first aspect of the embodiments of the present disclosure, in a third implementation of the first aspect of the embodiments of the present disclosure, the determining, by the first radio access network node, third allocation information and fourth allocation information includes:

determining, by the first radio access network node, the third allocation information and the fourth allocation information according to service data of the target terminal; and sending, by the first radio access network node, the third allocation information and the fourth allocation information to the second radio access network node;

or receiving, by the first radio access network node, the fourth allocation information sent by the second radio access network node, where the fourth allocation information is generated by the second radio access network node according to service data of the target terminal;

determining, by the first radio access network node, the third allocation information according to the fourth allocation information; and sending, by the first radio access network node, the third allocation information to the second radio access network node.

With reference to the first aspect of the embodiments of the present disclosure or the third implementation of the first aspect of the embodiments of the present disclosure, in a fourth implementation of the first aspect of the embodiments of the present disclosure, after the determining, by the first radio access network node, third allocation information and fourth allocation information, the method further includes:

configuring, by the first radio access network node, the third media access control layer function for the target terminal according to the third allocation information, where each of the third media access control layer function and the fourth media access control layer function is all functions of a media access control layer that can serve the target terminal.

With reference to the first aspect of the embodiments of the present disclosure or the third implementation of the first aspect of the embodiments of the present disclosure, in a fifth implementation of the first aspect of the embodiments of the present disclosure, before the determining, by the first radio access network node, third allocation information and fourth allocation information, the method further includes:

determining, by the first radio access network node, that the service data of the target terminal includes first service data and second service data, and after the determining, by the first radio access network node, third allocation information and fourth allocation information, the method further includes:

configuring, by the first radio access network node, the third media access control layer function for the target terminal according to the third allocation information, where the third media access control layer function is all functions that are of a media access control layer of the first radio access network node and are used to serve the first service data of the target terminal; where the fourth allocation information is further used to instruct the second radio access network node to configure the fourth media access control layer function used to serve the second service data of the target terminal, and the fourth media access control layer function is all functions that are of a media access control layer of the second radio access network node and are used to serve the second service data of the target terminal.

With reference to the first aspect of the embodiments of the present disclosure, in a sixth implementation of the first aspect of the embodiments of the present disclosure, after the determining, by the first radio access network node, first allocation information when the target radio access network node is the first radio access network node, the method further includes:

receiving, by the first radio access network node, a first request message sent by the second radio access network node, where the first request message is used to request to enable the target terminal to access the second radio access network node;

sending, by the first radio access network node, the second radio access network node a first response message generated according to the first request message, so that the second radio access network node processes the first response message and sends a processed first response message to the target terminal, where the processed first response message is used to enable the target terminal to generate a second request message used to trigger the first radio access network node to perform contention resolution, so that the target terminal sends the second request message to the second radio access network node, and the second radio access network node processes the second request message and sends a processed second request message to the first radio access network node;

receiving, by the first radio access network node, the processed second request message;

generating, by the first radio access network node, a contention resolution message according to the processed second request message; and sending, by the first radio access network node, a generated second response message to the second radio access network node, where the second response message is used to indicate the contention resolution message, and the second radio access network node processes the second response message and sends a processed second response message to the target terminal, so that the target terminal accesses the second radio access network node or obtains uplink synchronization with the second radio access network node according to the processed second response message.

With reference to the first aspect of the embodiments of the present disclosure, in a seventh implementation of the first aspect of the embodiments of the present disclosure, after the determining, by the first radio access network node, first allocation information when the target radio access network node is the first radio access network node, the method further includes:

allocating, by the first radio access network node, a dedicated physical random access channel PRACH resource and a third request message to the target terminal;

sending, by the first radio access network node, the dedicated physical random access channel PRACH resource and the third request message to the second radio access network node, so that the second radio access network node sends the dedicated physical random access channel PRACH resource and the third request message to the target terminal, the target terminal sends the third request message to the second radio access network node by using the dedicated physical random access channel PRACH resource, and the second radio access network node sends the third request message to the first radio access network node;

receiving, by the first radio access network node, the third request message; and sending, by the first radio access network node, the second radio access network node a third response message generated according to the third request message, so that the second radio access network node processes the third response message and sends a processed third response message to the target terminal, so that the target terminal accesses the second radio access network node or obtains uplink synchronization with the second radio access network node according to the processed third response message.

With reference to the first aspect of the embodiments of the present disclosure, in an eighth implementation of the first aspect of the embodiments of the present disclosure, when the target radio access network node is the second radio access network node, the method further includes:

receiving, by the first radio access network node, a fourth request message sent by the second radio access network node, where the fourth request message is used to request to enable the target terminal to access the second radio access network node;

sending, by the first radio access network node, the second radio access network node a fourth response message generated according to the fourth request message, so that the second radio access network node processes the fourth response message and sends a processed fourth response message to the target terminal, where the processed fourth response message is used to enable the target terminal to generate a fifth request message used to trigger the first radio access network node to perform contention resolution, the target terminal sends the fifth request message to the second radio access network node, and the second radio access network node processes the fifth request message and sends a processed fifth request message to the first radio access network node;

receiving, by the first radio access network node, the processed fifth request message;

generating, by the first radio access network node, a contention resolution message according to the processed fifth request message; and sending, by the first radio access network node, the contention resolution message to the second radio access network node, so that the second radio access network node generates a fifth response message according to the contention resolution message, and the second radio access network node processes the fifth response message and sends a processed fifth response message to the target terminal, so that the target terminal determines to access the second radio access network node or obtain uplink synchronization with the second radio access network node according to the processed fifth response message.

With reference to the first implementation of the first aspect of the embodiments of the present disclosure, in a ninth implementation of the first aspect of the embodiments of the present disclosure, after the sending, by the first radio access network node, the first allocation information to the second radio access network node, the method further includes:

generating, by the first radio access network node, downlink data and downlink control information according to the first media access control layer function, where the downlink data includes a downlink media access control service data unit MAC SDU and/or a downlink media access control control element MAC CE, and the downlink control information includes downlink hybrid automatic repeat request HARQ information and downlink assignment information; and sending, by the first radio access network node, the downlink data and the downlink control information to the second radio access network node, so that the second radio access network node sends the downlink data and the downlink control information to the target terminal.

With reference to the first implementation of the first aspect of the embodiments of the present disclosure, in a tenth implementation of the first aspect of the embodiments of the present disclosure, after the sending, by the first radio access network node, the first allocation information to the second radio access network node, the method further includes:

generating, by the first radio access network node, uplink control information according to the first media access control layer function;

sending, by the first radio access network node, the uplink control information to the second radio access network node, so that the second radio access network node sends the uplink control information to the target terminal, where the uplink control information includes uplink hybrid automatic repeat request HARQ information and uplink grant information;

receiving, by the media access control layer of the first radio access network node, uplink data, where the uplink data is sent by the target terminal to the second radio access network node, the second radio access network node sends the uplink data to the first radio access network node, the uplink data is generated by the target terminal according to the uplink control information, and the uplink data includes a MAC SDU and/or an uplink media access control control element MAC CE; and processing, by the media access control layer of the first radio access network node, the uplink data according to the first media access control layer function.

With reference to the first implementation of the first aspect of the embodiments of the present disclosure, in an eleventh implementation of the first aspect of the embodiments of the present disclosure, after the sending, by the first radio access network node, the first allocation information to the second radio access network node, the method further includes:

receiving, by the first radio access network node, channel state information CSI and/or a scheduling request SR of the target terminal, where the CSI and/or the SR are/is sent by the target terminal to the second radio access network node, and the second radio access network node sends the CSI and/or the SR to the first radio access network node.

With reference to the second implementation of the first aspect of the embodiments of the present disclosure, in a twelfth implementation of the first aspect of the embodiments of the present disclosure, after the sending, by the first radio access network node, the configuration information to the second radio access network node, the method further includes:

generating, by the first radio access network node, downlink data; and sending, by the first radio access network node, the downlink data to the second radio access network node, so that the media access control layer of the second radio access network node processes the downlink data according to the second media access control layer function so as to generate processed downlink data, and the second radio access network node sends the processed downlink data to the target terminal, where the processed downlink data includes a MAC SDU and/or a downlink media access control control element MAC CE.

With reference to the second implementation of the first aspect of the embodiments of the present disclosure, in a thirteenth implementation of the first aspect of the embodiments of the present disclosure, after the sending, by the first radio access network node, the configuration information to the second radio access network node, the method further includes:

receiving, by the first radio access network node, processed uplink data, where the processed uplink data is data that is generated after the media access control layer of the second radio access network node processes uplink data according to the second media access control layer function, the uplink data is sent by the target terminal to the second radio access network node, and the uplink data includes a MAC SDU and/or an uplink media access control control element MAC CE.

With reference to the fourth implementation of the first aspect of the embodiments of the present disclosure, in a fourteenth implementation of the first aspect of the embodiments of the present disclosure, after the configuring, by the first radio access network node, the third media access control layer function for the target terminal according to the third allocation information, the method further includes:

receiving, by the first radio access network node, downlink control information sent by the second radio access network node, where the downlink control information includes downlink hybrid automatic repeat request HARQ information and/or downlink assignment information;

generating, by the media access control layer of the first radio access network node, downlink data according to the third media access control layer function and the downlink control information; and sending, by the media access control layer of the first radio access network node, the downlink data to the second radio access network node, so that a media access control layer of the second radio access network node processes the downlink data according to the fourth media access control layer function so as to generate processed downlink data, and the second radio access network node sends the processed downlink data to the target terminal, where the processed downlink data includes a MAC SDU and/or a downlink media access control control element MAC CE.

With reference to the fourth implementation of the first aspect of the embodiments of the present disclosure, in a fifteenth implementation of the first aspect of the embodiments of the present disclosure, after the configuring, by the first radio access network node, the third media access control layer function for the target terminal according to the third allocation information, the method further includes:

receiving, by the media access control layer of the first radio access network node, processed uplink data, where the processed uplink data is data that is generated after a media access control layer of the second radio access network node processes uplink data according to the fourth media access control layer function, and the uplink data includes a MAC SDU and/or an uplink media access control control element MAC CE; and processing, by the media access control layer of the first radio access network node, the processed uplink data according to the third media access control layer function.

A second aspect of embodiments of the present disclosure provides a data transmission method, including:

receiving, by a second radio access network node, first allocation information sent by a first radio access network node, where the first allocation information is used to instruct the first radio access network node to configure a first media access control layer function used to serve a target terminal; and determining, by the second radio access network node, that a target radio access network node is the first radio access network node according to the first allocation information, where the target radio access network node is a radio access network node to which a media access control layer used to serve the target terminal belongs; or determining, by the second radio access network node, that the target radio access network node is the second radio access network node;

determining, by the second radio access network node, second allocation information; and configuring, by the second radio access network node according to the second allocation information, a second media access control layer function used to serve the target terminal; or determining, by the second radio access network node, that the target radio access network node is the first radio access network node and the second radio access network node;

determining, by the second radio access network node, third allocation information and fourth allocation information; and configuring, by the second radio access network node according to the fourth allocation information, a fourth media access control layer function used to serve the target terminal, where the third allocation information is used to instruct the first radio access network node to configure a third media access control layer function used to serve the target terminal, and the third media access control layer function and the fourth media access control layer function collaboratively serve the target terminal.

With reference to the second aspect of the embodiments of the present disclosure, in a first implementation of the second aspect of the embodiments of the present disclosure, after the receiving, by a second radio access network node, first allocation information sent by a first radio access network node, the method further includes:

determining, by the second radio access network node according to the first allocation information, that the first media access control layer function is all functions that are of a media access control layer of the first radio access network node and are used to serve the target terminal.

With reference to the second aspect of the embodiments of the present disclosure, in a second implementation of the second aspect of the embodiments of the present disclosure, the determining, by the second radio access network node, that the target radio access network node is the second radio access network node includes:

receiving, by the second radio access network node, configuration information sent by the first radio access network node, where the configuration information is used to indicate that the target radio access network node is the second radio access network node; and determining, by the second radio access network node, that the target radio access network node is the second radio access network node according to the configuration information; and the configuring, by the second radio access network node according to the second allocation information, a second media access control layer function used to serve the target terminal includes:

configuring, by the second radio access network node, the second media access control layer function for the target terminal according to the second allocation information, where the second media access control layer function is all functions that are of a media access control layer of the second radio access network node and are used to serve the target terminal.

With reference to the second aspect of the embodiments of the present disclosure, in a third implementation of the second aspect of the embodiments of the present disclosure, the determining, by the second radio access network node, that the target radio access network node is the first radio access network node and the second radio access network node includes:

receiving, by the second radio access network node, the third allocation information and the fourth allocation information that are sent by the first radio access network node, where the third allocation information and the fourth allocation information are allocation information determined by the first radio access network node according to service data of the target terminal; and determining, by the second radio access network node, that the target radio access network node is the first radio access network node and the second radio access network node according to the third allocation information and the fourth allocation information; or generating, by the second radio access network node, the fourth allocation information according to service data of the target terminal;

sending, by the second radio access network node, the fourth allocation information to the first radio access network node, so that the first radio access network node determines the third allocation information according to the fourth allocation information, and the first radio access network node sends the fourth allocation information to the second radio access network node; and determining, by the second radio access network node, that the target radio access network node is the first radio access network node and the second radio access network node according to the third allocation information and the fourth allocation information.

With reference to the second aspect of the embodiments of the present disclosure or the third implementation of the second aspect of the embodiments of the present disclosure, in a fourth implementation of the second aspect of the embodiments of the present disclosure, the method further includes:

determining, by the second radio access network node according to the third allocation information, that the third media access control layer function configured by the first radio access network node is all functions of a media access control layer that can serve the target terminal; and the configuring, by the second radio access network node according to the fourth allocation information, a fourth media access control layer function used to serve the target terminal includes:

configuring, by the second radio access network node, the fourth media access control layer function according to the fourth allocation information, where the fourth media access control layer function is all functions of a media access control layer that can serve the target terminal.

With reference to the second aspect of the embodiments of the present disclosure or the third implementation of the second aspect of the embodiments of the present disclosure, in a fifth implementation of the second aspect of the embodiments of the present disclosure, after the determining, by the second radio access network node, third allocation information and fourth allocation information, the method further includes:

determining, by the second radio access network node according to the third allocation information, that the first radio access network node configures the third media access control layer function, where the third media access control layer function is all functions that are of a media access control layer of the first radio access network node and are used to serve first service data of the target terminal, and the service data of the target terminal includes the first service data and second service data; and configuring, by the second radio access network node according to the fourth allocation information, the fourth media access control layer function used to serve the second service data of the target terminal, where the fourth media access control layer function is all functions that are of a media access control layer of the second radio access network node and are used to serve the second service data of the target terminal.

With reference to the second aspect of the embodiments of the present disclosure, in a sixth implementation of the second aspect of the embodiments of the present disclosure, after the receiving, by a second radio access network node, first allocation information sent by a first radio access network node, the method further includes:

determining, by the second radio access network node, a first request message, where the first request message is used to request to enable the target terminal to access the second radio access network node;

sending, by the second radio access network node, the first request message to the first radio access network node, so that the first radio access network node sends the second radio access network node a first response message generated according to the first request message;

receiving, by the second radio access network node, the first response message;

processing, by the second radio access network node, the first response message and sending a processed first response message to the target terminal, where the processed first response message is used to enable the target terminal to generate a second request message used to trigger the first radio access network node to perform contention resolution, and the target terminal sends the second request message to the second radio access network node;

receiving, by the second radio access network node, the second request message;

processing, by the second radio access network node, the second request message and sending a processed second request message to the first radio access network node, so that the first radio access network node receives the processed second request message, the first radio access network node generates a contention resolution message according to the processed second request message, and the first radio access network node sends a generated second response message to the second radio access network node, where the second response message is used to indicate the contention resolution message;

receiving, by the second radio access network node, the second response message, and processing, by the second radio access network node, the second response message and sending a processed second response message to the target terminal, so that the target terminal accesses the second radio access network node or obtains uplink synchronization with the second radio access network node according to the processed second response message.

With reference to the second aspect of the embodiments of the present disclosure, in a seventh implementation of the second aspect of the embodiments of the present disclosure, after the receiving, by a second radio access network node, first allocation information sent by a first radio access network node, the method further includes:

receiving, by the second radio access network node, a dedicated physical random access channel PRACH resource and a third request message that are allocated by the first radio access network node to the target terminal;

sending, by the second radio access network node, the dedicated physical random access channel PRACH resource and the third request message to the target terminal, so that the target terminal sends the third request message to the second radio access network node by using the dedicated physical random access channel PRACH resource;

sending, by the second radio access network node, the third request message to the first radio access network node, so that the first radio access network node receives the third request message, and the first radio access network node sends the second radio access network node a third response message generated according to the third request message;

receiving, by the second radio access network node, the third response message; and processing, by the second radio access network node, the third response message and sending a processed third response message to the target terminal, so that the target terminal accesses the second radio access network node or obtains uplink synchronization with the second radio access network node according to the processed third response message.

With reference to the second aspect of the embodiments of the present disclosure, in an eighth implementation of the second aspect of the embodiments of the present disclosure, after the determining, by the second radio access network node, that the target radio access network node is the second radio access network node, the method further includes:

generating, by the second radio access network node, a fourth request message, where the fourth request message is used to request to enable the target terminal to access the second radio access network node;

sending, by the second radio access network node, the fourth request message to the first radio access network node, so that the first radio access network node sends the second radio access network node a fourth response message generated according to the fourth request message;

receiving, by the second radio access network node, the fourth response message;

processing, by the second radio access network node, the fourth response message and sending a processed fourth response message to the target terminal, where the processed fourth response message is used to enable the target terminal to generate a fifth request message used to trigger the first radio access network node to perform contention resolution, and the target terminal sends the fifth request message to the second radio access network node;

receiving, by the second radio access network node, the fifth request message;

processing, by the second radio access network node, the fifth request message and sending a processed fifth request message to the first radio access network node, so that the first radio access network node receives the processed fifth request message, the first radio access network node generates a contention resolution message according to the processed fifth request message, and the first radio access network node sends the contention resolution message to the second radio access network node;

generating, by the second radio access network node, a fifth response message according to the contention resolution message; and processing, by the second radio access network node, the fifth response message and sending a processed fifth response message to the target terminal, so that the target terminal determines to access the second radio access network node or obtain uplink synchronization with the second radio access network node according to the processed fifth response message.

With reference to the first implementation of the second aspect of the embodiments of the present disclosure, in a ninth implementation of the second aspect of the embodiments of the present disclosure, after the determining, by the second radio access network node according to the first allocation information, that the first media access control layer function is all functions that are of a media access control layer of the first radio access network node and are used to serve the target terminal, the method further includes:

receiving, by the second radio access network node, downlink data and downlink control information that are sent by the first radio access network node, where the downlink data and the downlink control information are generated by the first radio access network node according to the first media access control layer function, the downlink data includes a downlink media access control service data unit MAC SDU and/or a downlink media access control control element MAC CE, and the downlink control information includes downlink hybrid automatic repeat request HARQ information and downlink assignment information; and sending, by the second radio access network node, the downlink data and the downlink control information to the target terminal.

With reference to the first implementation of the second aspect of the embodiments of the present disclosure, in a tenth implementation of the second aspect of the embodiments of the present disclosure, after the determining, by the second radio access network node according to the first allocation information, that the first media access control layer function is all functions that are of a media access control layer of the first radio access network node and are used to serve the target terminal, the method further includes:

receiving, by the second radio access network node, uplink control information sent by the first radio access network node, where the uplink control information is generated by the first radio access network node according to the first media access control layer function;

sending, by the second radio access network node, the uplink control information to the target terminal, where the uplink control information includes uplink hybrid automatic repeat request HARQ information and uplink grant information;

receiving, by the second radio access network node, uplink data sent by the target terminal, where the uplink data is generated by the target terminal according to the uplink control information, and the uplink data includes a MAC SDU and/or an uplink media access control control element MAC CE; and sending, by the second radio access network node, the uplink data to the first radio access network node, so that the media access control layer of the first radio access network node receives the uplink data, and the media access control layer of the first radio access network node processes the uplink data according to the first media access control layer function.

With reference to the first implementation of the second aspect of the embodiments of the present disclosure, in an eleventh implementation of the second aspect of the embodiments of the present disclosure, after the determining, by the second radio access network node according to the first allocation information, that the first media access control layer function is all functions that are of a media access control layer of the first radio access network node and are used to serve the target terminal, the method further includes:

receiving, by the second radio access network node, channel state information CSI and/or a scheduling request SR of the target terminal that are/is sent by the target terminal; and sending, by the second radio access network node, the CSI and/or the SR to the first radio access network node, so that the first radio access network node receives the CSI and/or the SR.

With reference to the second implementation of the second aspect of the embodiments of the present disclosure, in a twelfth implementation of the second aspect of the embodiments of the present disclosure, after the configuring, by the second radio access network node, the second media access control layer function for the target terminal according to the second allocation information, the method further includes:

receiving, by the second radio access network node, downlink data sent by the first radio access network node;

processing, by the media access control layer of the second radio access network node, the downlink data according to the second media access control layer function so as to generate processed downlink data; and sending, by the second radio access network node, the processed downlink data to the target terminal, where the processed downlink data includes a MAC SDU and/or a downlink media access control control element MAC CE.

With reference to the second implementation of the second aspect of the embodiments of the present disclosure, in a thirteenth implementation of the second aspect of the embodiments of the present disclosure, after the configuring, by the second radio access network node, the second media access control layer function for the target terminal according to the second allocation information, the method further includes:

receiving, by the second radio access network node, uplink data sent by the target terminal, where the uplink data includes a MAC SDU and/or an uplink media access control control element MAC CE;

processing, by the media access control layer of the second radio access network node, the uplink data according to the second media access control layer function so as to generate processed uplink data; and sending, by the second radio access network node, the processed uplink data to the first radio access network node.

With reference to the fourth implementation of the second aspect of the embodiments of the present disclosure, in a fourteenth implementation of the second aspect of the embodiments of the present disclosure, after the configuring, by the second radio access network node, the fourth media access control layer function according to the fourth allocation information, the method further includes:

sending, by the second radio access network node, downlink control information to the first radio access network node, where the downlink control information includes downlink hybrid automatic repeat request HARQ information and/or downlink assignment information, so that the media access control layer of the first radio access network node generates downlink data according to the third media access control layer function and the downlink control information, and the media access control layer of the first radio access network node sends the downlink data to the second radio access network node;

processing, by the media access control layer of the second radio access network node, the downlink data according to the fourth media access control layer function so as to generate processed downlink data; and sending, by the second radio access network node, the processed downlink data to the target terminal, where the processed downlink data includes a MAC SDU and/or a downlink media access control control element MAC CE.

With reference to the fourth implementation of the second aspect of the embodiments of the present disclosure, in a fifteenth implementation of the second aspect of the embodiments of the present disclosure, after the configuring, by the second radio access network node, the fourth media access control layer function according to the fourth allocation information, the method further includes:

receiving, by the second radio access network node, uplink data sent by the target terminal, where the uplink data includes a MAC SDU and/or an uplink media access control control element MAC CE;

processing, by the media access control layer of the second radio access network node, the uplink data according to the fourth media access control layer function so as to generate processed uplink data; and sending, by the second radio access network node, the processed uplink data to the first radio access network node, so that the media access control layer of the first radio access network node receives the processed uplink data, and the media access control layer of the first radio access network node processes the processed uplink data according to the third media access control layer function.

A third aspect of embodiments of the present disclosure provides a first radio access network node, including:

a first determining unit, configured to determine a target radio access network node to which a media access control layer serving a target terminal belongs; and a second determining unit, configured to determine first allocation information when the target radio access network node is the first radio access network node, where the first allocation information is used to instruct the first radio access network node to configure a first media access control layer function used to serve the target terminal; or a first instruction unit, configured to: when the target radio access network node is a second radio access network node, instruct the second radio access network node to determine second allocation information, where the second allocation information is used to instruct the second radio access network node to configure a second media access control layer function used to serve the target terminal; or a third determining unit, configured to: when the target radio access network node is the first radio access network node and a second radio access network node, determine third allocation information and fourth allocation information, where the third allocation information is used to instruct the first radio access network node to configure a third media access control layer function used to serve the target terminal, the fourth allocation information is used to instruct the second radio access network node to configure a fourth media access control layer function used to serve the target terminal, and the third media access control layer function and the fourth media access control layer function collaboratively serve the target terminal.

With reference to the third aspect of the embodiments of the present disclosure, in a first implementation of the third aspect of the embodiments of the present disclosure, the first radio access network node further includes:

a first configuration unit, configured to configure the first media access control layer function according to the first allocation information, where the first media access control layer function is all functions that are of a media access control layer of the first radio access network node and are used to serve the target terminal, and a first sending unit, configured to send the first allocation information to the second radio access network node, where the first allocation information is used to enable the second radio access network node to determine that the first radio access network node is the target radio access network node.

With reference to the third aspect of the embodiments of the present disclosure, in a second implementation of the third aspect of the embodiments of the present disclosure, the first instruction unit includes:

a first generation module, configured to generate configuration information; and a first sending module, configured to send the configuration information to the second radio access network node, where the configuration information is used to enable the second radio access network node to determine the second allocation information, so that the second radio access network node configures the second media access control layer function for the target terminal according to the second allocation information, and the second media access control layer function is all functions that are of a media access control layer of the second radio access network node and are used to serve the target terminal.

With reference to the third aspect of the embodiments of the present disclosure, in a third implementation of the third aspect of the embodiments of the present disclosure, the third determining unit includes:

a first determining module, configured to determine the third allocation information and the fourth allocation information according to service data of the target terminal; and a second sending module, configured to send the third allocation information and the fourth allocation information to the second radio access network node;

or a first receiving module, configured to receive the fourth allocation information sent by the second radio access network node, where the fourth allocation information is generated by the second radio access network node according to service data of the target terminal;

a second determining module, configured to determine the third allocation information according to the fourth allocation information; and a third sending module, configured to send the third allocation information to the second radio access network node.

With reference to the third aspect of the embodiments of the present disclosure or the third implementation of the third aspect of the embodiments of the present disclosure, in a fourth implementation of the third aspect of the embodiments of the present disclosure, the first radio access network node further includes:

a second configuration unit, configured to configure the third media access control layer function for the target terminal according to the third allocation information, where each of the third media access control layer function and the fourth media access control layer function is all functions of a media access control layer that can serve the target terminal.

With reference to the third aspect of the embodiments of the present disclosure or the third implementation of the third aspect of the embodiments of the present disclosure, in a fifth implementation of the third aspect of the embodiments of the present disclosure, the first radio access network node further includes:

a fourth determining unit, configured to determine that the service data of the target terminal includes first service data and second service data; and a third configuration unit, configured to configure the third media access control layer function for the target terminal according to the third allocation information, where the third media access control layer function is all functions that are of a media access control layer of the first radio access network node and are used to serve the first service data of the target terminal, the fourth allocation information is further used to instruct the second radio access network node to configure the fourth media access control layer function used to serve the second service data of the target terminal, and the fourth media access control layer function is all functions that are of a media access control layer of the second radio access network node and are used to serve the second service data of the target terminal.

With reference to the third aspect of the embodiments of the present disclosure, in a sixth implementation of the third aspect of the embodiments of the present disclosure, the first radio access network node further includes:

a first receiving unit, configured to receive a first request message sent by the second radio access network node, where the first request message is used to request to enable the target terminal to access the second radio access network node;

a second sending unit, configured to send the second radio access network node a first response message generated according to the first request message, so that the second radio access network node processes the first response message and sends a processed first response message to the target terminal, where the processed first response message is used to enable the target terminal to generate a second request message used to trigger the first radio access network node to perform contention resolution, the target terminal sends the second request message to the second radio access network node, and the second radio access network node processes the second request message and sends a processed second request message to the first radio access network node;

a second receiving unit, configured to receive the processed second request message;

a first generation unit, configured to generate a contention resolution message according to the processed second request message; and a third sending unit, configured to send a generated second response message to the second radio access network node, where the second response message is used to indicate the contention resolution message, and the second radio access network node processes the second response message and sends a processed second response message to the target terminal, so that the target terminal accesses the second radio access network node or obtains uplink synchronization with the second radio access network node according to the processed second response message.

With reference to the third aspect of the embodiments of the present disclosure, in a seventh implementation of the third aspect of the embodiments of the present disclosure, the first radio access network node further includes:

a fifth determining unit, configured to allocate a dedicated physical random access channel PRACH resource and a third request message to the target terminal;

a fourth sending unit, configured to send the dedicated physical random access channel PRACH resource and the third request message to the second radio access network node, so that the second radio access network node sends the dedicated physical random access channel PRACH resource and the third request message to the target terminal, the target terminal sends the third request message to the second radio access network node by using the dedicated physical random access channel PRACH resource, and the second radio access network node sends the third request message to the first radio access network node;

a third receiving unit, configured to receive the third request message; and a second generation unit, configured to send the second radio access network node a third response message generated according to the third request message, so that the second radio access network node processes the third response message and sends a processed third response message to the target terminal, so that the target terminal accesses the second radio access network node or obtains uplink synchronization with the second radio access network node according to the processed third response message.

With reference to the third aspect of the embodiments of the present disclosure, in an eighth implementation of the third aspect of the embodiments of the present disclosure, the first radio access network node further includes:

a fourth receiving unit, configured to receive a fourth request message sent by the second radio access network node, where the fourth request message is used to request to enable the target terminal to access the second radio access network node;

a third generation unit, configured to send the second radio access network node a fourth response message generated according to the fourth request message, so that the second radio access network node processes the fourth response message and sends a processed fourth response message to the target terminal, where the processed fourth response message is used to enable the target terminal to generate a fifth request message used to trigger the first radio access network node to perform contention resolution, the target terminal sends the fifth request message to the second radio access network node, and the second radio access network node processes the fifth request message and sends a processed fifth request message to the first radio access network node;

a fifth receiving unit, configured to receive the processed fifth request message;

a fourth generation unit, configured to generate a contention resolution message according to the processed fifth request message; and a fifth sending unit, configured to send the contention resolution message to the second radio access network node, so that the second radio access network node generates a fifth response message according to the contention resolution message, and the second radio access network node processes the fifth response message and sends a processed fifth response message to the target terminal, so that the target terminal determines to access the second radio access network node or obtain uplink synchronization with the second radio access network node according to the processed fifth response message.

With reference to the first implementation of the third aspect of the embodiments of the present disclosure, in a ninth implementation of the third aspect of the embodiments of the present disclosure, the first radio access network node further includes:

a fifth generation unit, configured to generate downlink data and downlink control information according to the first media access control layer function, where the downlink data includes a downlink media access control service data unit MAC SDU and/or a downlink media access control control element MAC CE, and the downlink control information includes downlink hybrid automatic repeat request HARQ information and downlink assignment information; and a sixth sending unit, configured to send the downlink data and the downlink control information to the second radio access network node, so that the second radio access network node sends the downlink data and the downlink control information to the target terminal.

With reference to the first implementation of the third aspect of the embodiments of the present disclosure, in a tenth implementation of the third aspect of the embodiments of the present disclosure, the first radio access network node further includes:

a sixth generation unit, configured to generate uplink control information according to the first media access control layer function;

a seventh sending unit, configured to send the uplink control information to the second radio access network node, so that the second radio access network node sends the uplink control information to the target terminal, where the uplink control information includes uplink hybrid automatic repeat request HARQ information and uplink grant information;

a sixth receiving unit, configured to be used by the media access control layer of the first radio access network node to receive uplink data, where the uplink data is sent by the target terminal to the second radio access network node, the second radio access network node sends the uplink data to the first radio access network node, the uplink data is generated by the target terminal according to the uplink control information, and the uplink data includes a MAC SDU and/or an uplink media access control control element MAC CE; and a first processing unit, configured to be used by the media access control layer of the first radio access network node to process the uplink data according to the first media access control layer function.

With reference to the first implementation of the third aspect of the embodiments of the present disclosure, in an eleventh implementation of the third aspect of the embodiments of the present disclosure, the first radio access network node further includes:

a seventh receiving unit, configured to receive channel state information CSI and/or a scheduling request SR of the target terminal, where the CSI and/or the SR are/is sent by the target terminal to the second radio access network node, and the second radio access network node sends the CSI and/or the SR to the first radio access network node.

With reference to the second implementation of the third aspect of the embodiments of the present disclosure, in a twelfth implementation of the third aspect of the embodiments of the present disclosure, the first radio access network node further includes:

a seventh generation unit, configured to generate downlink data; and an eighth sending unit, configured to send the downlink data to the second radio access network node, so that the media access control layer of the second radio access network node processes the downlink data according to the second media access control layer function so as to generate processed downlink data, and the second radio access network node sends the processed downlink data to the target terminal, where the processed downlink data includes a MAC SDU and/or a downlink media access control control element MAC CE.

With reference to the second implementation of the third aspect of the embodiments of the present disclosure, in a thirteenth implementation of the third aspect of the embodiments of the present disclosure, the first radio access network node further includes:

an eighth receiving unit, configured to receive processed uplink data, where the processed uplink data is data that is generated after the media access control layer of the second radio access network node processes uplink data according to the second media access control layer function, the uplink data is sent by the target terminal to the second radio access network node, and the uplink data includes a MAC SDU and/or an uplink media access control control element MAC CE.

With reference to the fourth implementation of the third aspect of the embodiments of the present disclosure, in a fourteenth implementation of the third aspect of the embodiments of the present disclosure, the first radio access network node further includes:

a ninth receiving unit, configured to receive downlink control information sent by the second radio access network node, where the downlink control information includes downlink hybrid automatic repeat request HARQ information and/or downlink assignment information;

an eighth generation unit, configured to be used by a media access control layer of the first radio access network node to generate downlink data according to the third media access control layer function and the downlink control information; and a ninth sending unit, configured to be used by the media access control layer of the first radio access network node to send the downlink data to the second radio access network node, so that a media access control layer of the second radio access network node processes the downlink data according to the fourth media access control layer function so as to generate processed downlink data, and the second radio access network node sends the processed downlink data to the target terminal, where the processed downlink data includes a MAC SDU and/or a downlink media access control control element MAC CE.

With reference to the fourth implementation of the third aspect of the embodiments of the present disclosure, in a fifteenth implementation of the third aspect of the embodiments of the present disclosure, the first radio access network node further includes:

a tenth receiving unit, configured to be used by a media access control layer of the first radio access network node to receive processed uplink data, where the processed uplink data is data that is generated after a media access control layer of the second radio access network node processes uplink data according to the fourth media access control layer function, and the uplink data includes a MAC SDU and/or an uplink media access control control element MAC CE; and a second processing unit, configured to be used by the media access control layer of the first radio access network node to process the processed uplink data according to the third media access control layer function.

A fourth aspect of embodiments of the present disclosure provides a second radio access network node, including:

an eleventh receiving unit, configured to receive first allocation information sent by a first radio access network node, where the first allocation information is used to instruct the first radio access network node to configure a first media access control layer function used to serve a target terminal; and a sixth determining unit, configured to determine that a target radio access network node is the first radio access network node according to the first allocation information, where the target radio access network node is a radio access network node to which a media access control layer used to serve the target terminal belongs; or a seventh determining unit, configured to determine that the target radio access network node is the second radio access network node;

an eighth determining unit, configured to determine second allocation information; and a fourth configuration unit, configured to: according to the second allocation information, configure a second media access control layer function used to serve the target terminal; or a ninth determining unit, configured to determine that the target radio access network node is the first radio access network node and the second radio access network node;

a tenth determining unit, configured to determine third allocation information and fourth allocation information; and a fifth configuration unit, configured to: according to the fourth allocation information, configure a fourth media access control layer function used to serve the target terminal, where the third allocation information is used to instruct the first radio access network node to configure a third media access control layer function used to serve the target terminal, and the third media access control layer function and the fourth media access control layer function collaboratively serve the target terminal.

With reference to the fourth aspect of the embodiments of the present disclosure, in a first implementation of the fourth aspect of the embodiments of the present disclosure, the second radio access network node further includes:

an eleventh determining unit, configured to: according to the first allocation information, determine, by the second radio access network node, that the first media access control layer function is all functions that are of a media access control layer of the first radio access network node and are used to serve the target terminal.

With reference to the fourth aspect of the embodiments of the present disclosure, in a second implementation of the fourth aspect of the embodiments of the present disclosure, the seventh determining unit includes:

a second receiving module, configured to receive configuration information sent by the first radio access network node, where the configuration information is used to indicate that the target radio access network node is the second radio access network node; and a configuration module, configured to determine that the target radio access network node is the second radio access network node according to the configuration information; where the fourth configuration unit is further configured to configure the second media access control layer function for the target terminal according to the second allocation information, where the second media access control layer function is all functions that are of a media access control layer of the second radio access network node and are used to serve the target terminal.

With reference to the fourth aspect of the embodiments of the present disclosure, in a third implementation of the fourth aspect of the embodiments of the present disclosure, the ninth determining unit includes:

a third receiving module, configured to receive the third allocation information and the fourth allocation information that are sent by the first radio access network node, where the third allocation information and the fourth allocation information are allocation information determined by the first radio access network node according to service data of the target terminal; and a third determining module, configured to determine that the target radio access network node is the first radio access network node and the second radio access network node according to the third allocation information and the fourth allocation information; or a second generation module, configured to generate the fourth allocation information according to service data of the target terminal;

a fourth sending module, configured to send the fourth allocation information to the first radio access network node, so that the first radio access network node determines the third allocation information according to the fourth allocation information, and the first radio access network node sends the fourth allocation information to the second radio access network node; and a fourth determining module, configured to determine that the target radio access network node is the first radio access network node and the second radio access network node according to the third allocation information and the fourth allocation information.

With reference to the fourth aspect of the embodiments of the present disclosure or the third implementation of the fourth aspect of the embodiments of the present disclosure, in a fourth implementation of the fourth aspect of the embodiments of the present disclosure, the second radio access network node further includes:

a twelfth determining unit, configured to: according to the third allocation information, determine that the third media access control layer function configured by the first radio access network node is all functions of a media access control layer that can serve the target terminal; where the fifth configuration unit is further configured to configure the fourth media access control layer function according to the fourth allocation information, where the fourth media access control layer function is all functions of a media access control layer that can serve the target terminal.

With reference to the fourth aspect of the embodiments of the present disclosure or the third implementation of the fourth aspect of the embodiments of the present disclosure, in a fifth implementation of the fourth aspect of the embodiments of the present disclosure, the second radio access network node further includes:

a thirteenth determining unit, configured to: according to the third allocation information, determine that the first radio access network node configures the third media access control layer function, where the third media access control layer function is all functions that are of a media access control layer of the first radio access network node and are used to serve first service data of the target terminal, and the service data of the target terminal includes the first service data and second service data; where the fifth configuration unit is further configured to: according to the fourth allocation information, configure the fourth media access control layer function used to serve the second service data of the target terminal, where the fourth media access control layer function is all functions that are of a media access control layer of the second radio access network node and are used to serve the second service data of the target terminal.

With reference to the fourth aspect of the embodiments of the present disclosure, in a sixth implementation of the fourth aspect of the embodiments of the present disclosure, the second radio access network node further includes:

a fourteenth determining unit, configured to determine a first request message, where the first request message is used to request to enable the target terminal to access the second radio access network node;

a tenth sending unit, configured to send the first request message to the first radio access network node, so that the first radio access network node sends the second radio access network node a first response message generated according to the first request message;

a twelfth receiving unit, configured to receive the first response message;

a third processing unit, configured to process the first response message and send a processed first response message to the target terminal, where the processed first response message is used to enable the target terminal to generate a second request message used to trigger the first radio access network node to perform contention resolution, and the target terminal sends the second request message to the second radio access network node;

a thirteenth receiving unit, configured to receive the second request message;

a fourth processing unit, configured to process the second request message and send a processed second request message to the first radio access network node, so that the first radio access network node receives the processed second request message, the first radio access network node generates a contention resolution message according to the processed second request message, and the first radio access network node sends a generated second response message to the second radio access network node, where the second response message is used to indicate the contention resolution message;

a fourteenth receiving unit, configured to receive the second response message; and a fifth processing unit, configured to process the second response message and send a processed second response message to the target terminal, so that the target terminal accesses the second radio access network node or obtains uplink synchronization with the second radio access network node according to the processed second response message.

With reference to the fourth aspect of the embodiments of the present disclosure, in a seventh implementation of the fourth aspect of the embodiments of the present disclosure, the second radio access network node further includes:

a fifteenth receiving unit, configured to receive a dedicated physical random access channel PRACH resource and a third request message that are allocated by the first radio access network node to the target terminal;

an eleventh sending unit, configured to send the dedicated physical random access channel PRACH resource and the third request message to the target terminal, so that the target terminal sends the third request message to the second radio access network node by using the dedicated physical random access channel PRACH resource;

a twelfth sending unit, configured to send the third request message to the first radio access network node, so that the first radio access network node receives the third request message, and the first radio access network node sends the second radio access network node a third response message generated according to the third request message;

a sixteenth receiving unit, configured to receive the third response message; and a sixth processing unit, configured to process the third response message and send a processed third response message to the target terminal, so that the target terminal accesses the second radio access network node or obtains uplink synchronization with the second radio access network node according to the processed third response message.

With reference to the fourth aspect of the embodiments of the present disclosure, in an eighth implementation of the fourth aspect of the embodiments of the present disclosure, the second radio access network node further includes:

a ninth generation unit, configured to generate a fourth request message, where the fourth request message is used to request to enable the target terminal to access the second radio access network node;

a thirteenth sending unit, configured to send the fourth request message to the first radio access network node, so that the first radio access network node sends the second radio access network node a fourth response message generated according to the fourth request message;

a seventeenth receiving unit, configured to receive the fourth response message;

a seventh processing unit, configured to process the fourth response message and send a processed fourth response message to the target terminal, where the processed fourth response message is used to enable the target terminal to generate a fifth request message used to trigger the first radio access network node to perform contention resolution, and the target terminal sends the fifth request message to the second radio access network node;

an eighteenth receiving unit, configured to receive the fifth request message;

an eighth processing unit, configured to process the fifth request message and send a processed fifth request message to the first radio access network node, so that the first radio access network node receives the processed fifth request message, the first radio access network node generates a contention resolution message according to the processed fifth request message, and the first radio access network node sends the contention resolution message to the second radio access network node;

a tenth generation unit, configured to generate a fifth response message according to the contention resolution message; and a ninth processing unit, configured to process the fifth response message and send a processed fifth response message to the target terminal, so that the target terminal determines to access the second radio access network node or obtain uplink synchronization with the second radio access network node according to the processed fifth response message.

With reference to the first implementation of the fourth aspect of the embodiments of the present disclosure, in a ninth implementation of the fourth aspect of the embodiments of the present disclosure, the second radio access network node further includes:

a nineteenth receiving unit, configured to receive downlink data and downlink control information that are sent by the first radio access network node, where the downlink data and the downlink control information are generated by the first radio access network node according to the first media access control layer function, the downlink data includes a downlink media access control service data unit MAC SDU and/or a downlink media access control control element MAC CE, and the downlink control information includes downlink hybrid automatic repeat request HARQ information and downlink assignment information; and a fourteenth sending unit, configured to send the downlink data and the downlink control information to the target terminal.

With reference to the first implementation of the fourth aspect of the embodiments of the present disclosure, in a tenth implementation of the fourth aspect of the embodiments of the present disclosure, the second radio access network node further includes:

a twentieth receiving unit, configured to receive uplink control information sent by the first radio access network node, where the uplink control information is generated by the first radio access network node according to the first media access control layer function;

a fifteenth sending unit, configured to send the uplink control information to the target terminal, where the uplink control information includes uplink hybrid automatic repeat request HARQ information and uplink grant information;

a twenty-first receiving unit, configured to receive uplink data sent by the target terminal, where the uplink data is generated by the target terminal according to the uplink control information, and the uplink data includes a MAC SDU and/or an uplink media access control control element MAC CE; and a sixteenth sending unit, configured to send the uplink data to the first radio access network node, so that the media access control layer of the first radio access network node receives the uplink data, and the media access control layer of the first radio access network node processes the uplink data according to the first media access control layer function.

With reference to the first implementation of the fourth aspect of the embodiments of the present disclosure, in an eleventh implementation of the fourth aspect of the embodiments of the present disclosure, the second radio access network node further includes:

a twenty-second receiving unit, configured to receive channel state information CSI and/or a scheduling request SR of the target terminal that are/is sent by the target terminal; and a seventeenth sending unit, configured to send the CSI and/or the SR to the first radio access network node, so that the first radio access network node receives the CSI and/or the SR.

With reference to the second implementation of the fourth aspect of the embodiments of the present disclosure, in a twelfth implementation of the fourth aspect of the embodiments of the present disclosure, the second radio access network node further includes:

a twenty-third receiving unit, configured to receive downlink data sent by the first radio access network node;

a tenth processing unit, configured to be used by the media access control layer of the second radio access network node to process the downlink data according to the second media access control layer function so as to generate processed downlink data; and an eighteenth sending unit, configured to send the processed downlink data to the target terminal, where the processed downlink data includes a MAC SDU and/or a downlink media access control control element MAC CE.

With reference to the second implementation of the fourth aspect of the embodiments of the present disclosure, in a thirteenth implementation of the fourth aspect of the embodiments of the present disclosure, the second radio access network node further includes:

a twenty-fourth receiving unit, configured to receive uplink data sent by the target terminal, where the uplink data includes a MAC SDU and/or an uplink media access control control element MAC CE;

an eleventh processing unit, configured to be used by the media access control layer of the second radio access network node to process the uplink data according to the second media access control layer function so as to generate processed uplink data; and an eighteenth sending unit, configured to send the processed uplink data to the first radio access network node.

With reference to the fourth implementation of the fourth aspect of the embodiments of the present disclosure, in a fourteenth implementation of the fourth aspect of the embodiments of the present disclosure, the second radio access network node further includes:

a nineteenth sending unit, configured to send downlink control information to the first radio access network node, where the downlink control information includes downlink hybrid automatic repeat request HARQ information and/or downlink assignment information, so that a media access control layer of the first radio access network node generates downlink data according to the third media access control layer function and the downlink control information, and the media access control layer of the first radio access network node sends the downlink data to the second radio access network node;

a twelfth processing unit, configured to be used by a media access control layer of the second radio access network node to process the downlink data according to the fourth media access control layer function so as to generate processed downlink data; and a twentieth sending unit, configured to send the processed downlink data to the target terminal, where the processed downlink data includes a MAC SDU and/or a downlink media access control control element MAC CE.

With reference to the fourth implementation of the fourth aspect of the embodiments of the present disclosure, in a fifteenth implementation of the fourth aspect of the embodiments of the present disclosure, the second radio access network node further includes:

a twenty-fifth receiving unit, configured to receive uplink data sent by the target terminal, where the uplink data includes a MAC SDU and/or an uplink media access control control element MAC CE;

a thirteenth processing unit, configured to be used by a media access control layer of the second radio access network node to process the uplink data according to the fourth media access control layer function so as to generate processed uplink data; and a twenty-first sending unit, configured to send the processed uplink data to the first radio access network node, so that a media access control layer of the first radio access network node receives the processed uplink data, and the media access control layer of the first radio access network node processes the processed uplink data according to the third media access control layer function.

The embodiments of the present disclosure provide a data transmission method and a related device. The data transmission method includes: determining, by a first radio access network node, a target radio access network node to which a media access control layer serving a target terminal belongs; and determining, by the first radio access network node, first allocation information when the target radio access network node is the first radio access network node; or, when the target radio access network node is a second radio access network node, instructing, by the first radio access network node, the second radio access network node to determine second allocation information; or, when the target radio access network node is the first radio access network node and a second radio access network node, determining, by the first radio access network node, third allocation information and fourth allocation information. According to the data transmission method shown in the embodiments, system performance is effectively improved; a performance requirement and costs for an interface between a first radio access network node and a second radio access network node are reduced, for example, bandwidth and delay requirements on the interface are reduced; a quality of service (QoS) requirement of a service can be met; and system resource utilization efficiency is improved.

DESCRIPTION OF EMBODIMENTS

Figure 1:
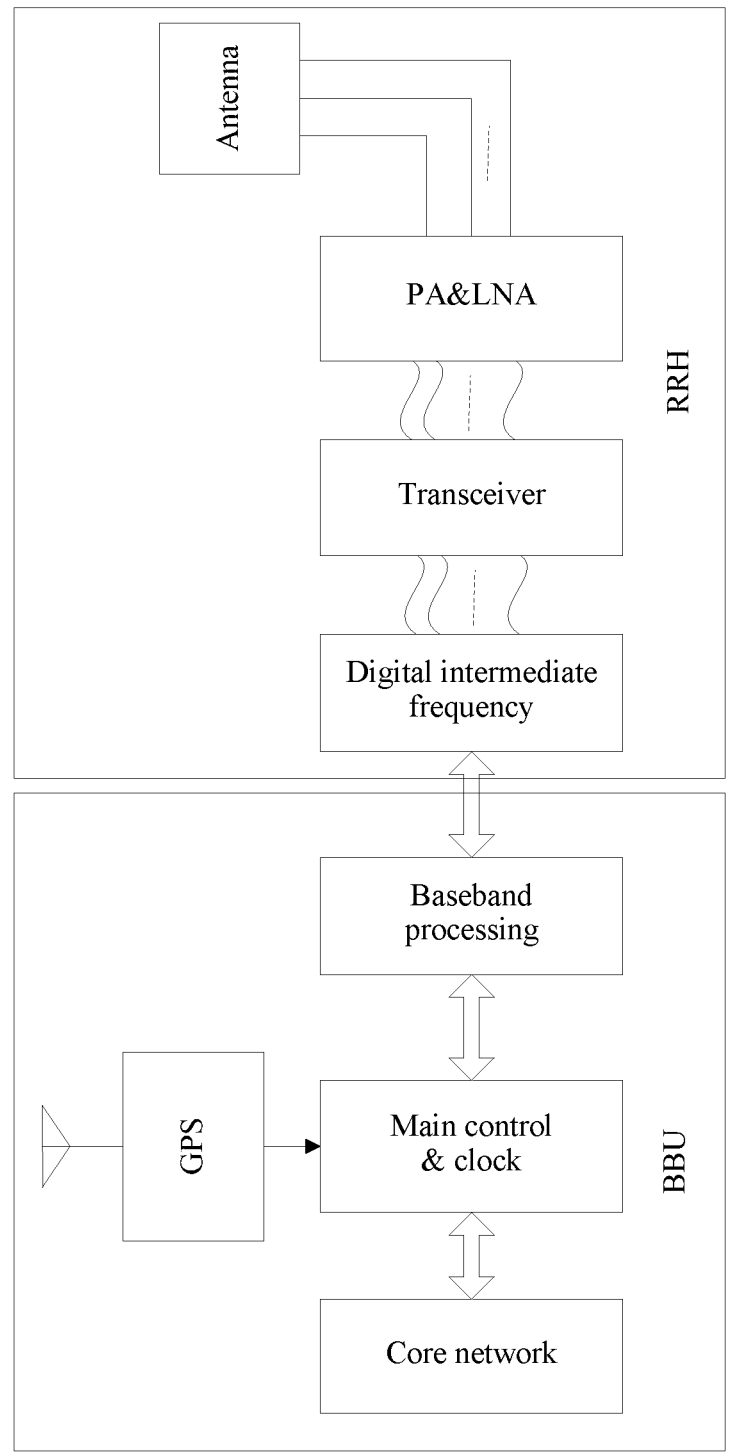
FIG. 1 is a schematic structural diagram of a cloud radio access network according to the prior art.
Figure 2:
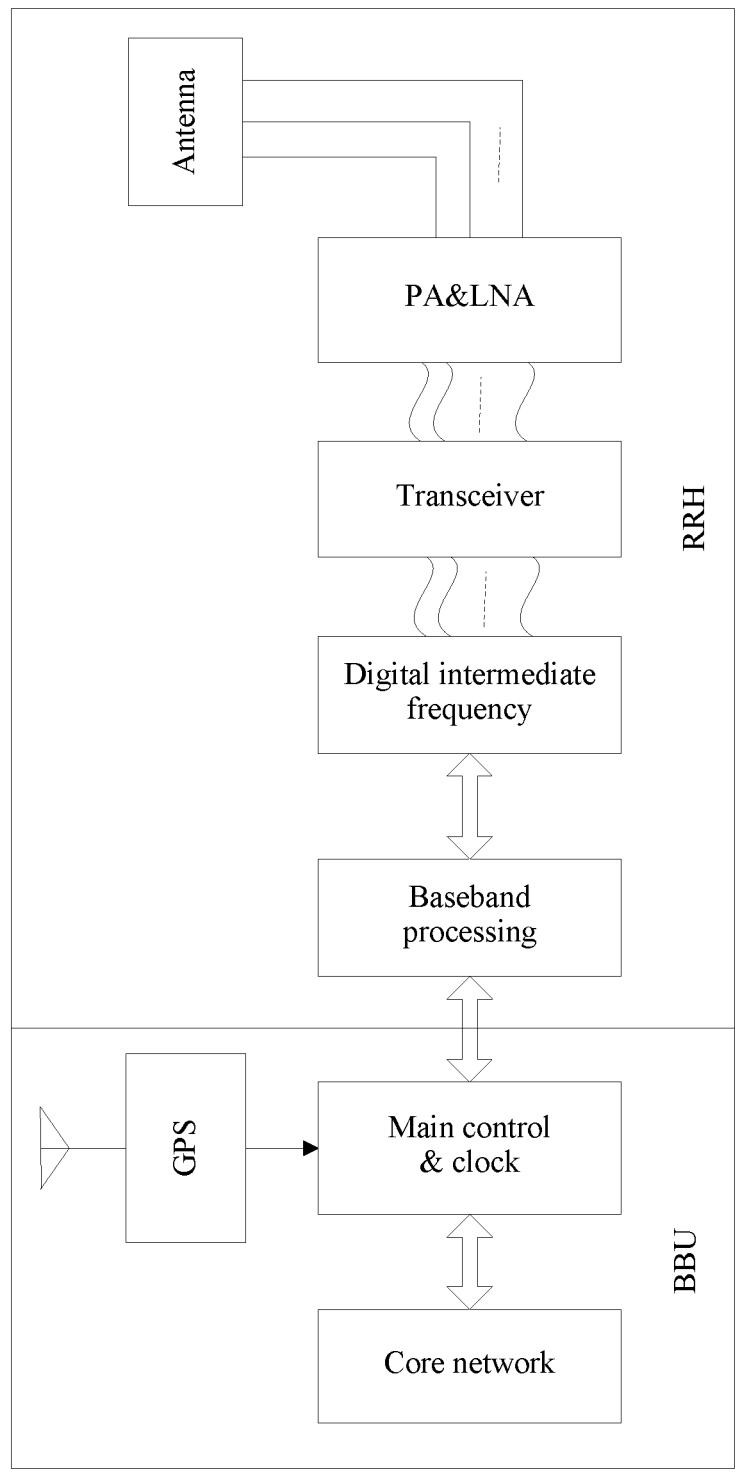
FIG. 2 is another schematic structural diagram of a cloud radio access network according to the prior art.
Figure 3:
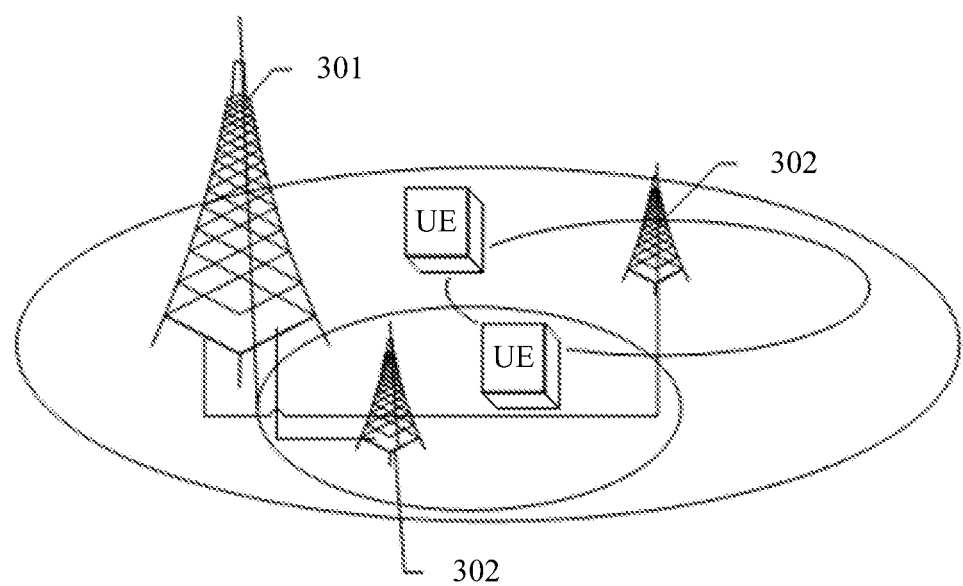
FIG. 3 is a schematic structural diagram of a system architecture according to an embodiment of the present disclosure.

For a structure of a system architecture that is shown in embodiments of the present disclosure and that can implement a data transmission method provided in the embodiments of the present disclosure, refer to FIG. 3.

The system architecture includes a first radio access network node 301 and a second radio access network node 302. There is an interface between the first radio access network node 301 and the second radio access network node 302. The interface may be carried by a carrier such as an optical fiber or wireless, and this is not limited.

Each of the first radio access network node 301 and the second radio access network node 302 may be an independent radio access network node or a distributed radio access network node, and has some or all functions of a wireless protocol stack. Between the first radio access network node 301 and the second radio access network node 302, there is an interface used to transmit information, and the interface may be a wired or wireless interface.

The first radio access network node 301 may be an LTE eNodeB or a base station of another radio access technology such as a millimeter wave or a Universal Mobile Telecommunications System (UMTS,).

In UMTS, the first radio access network node 301 may be an evolved NodeB combined by a radio network controller (RNC) and a Node B.

The second radio access network node 302 may be an LTE eNodeB or a base station or an evolved NodeB of another radio access technology such as a millimeter wave or a UMTS.

The first radio access network node 301 may be a baseband unit (BBU) pool in a cloud radio access network (C-RAN) architecture, and the second radio access network node 302 may be a remote radio head (RRH) in the C-RAN architecture.

The first radio access network node 301 may be a centralized processing network element in a radio access network as a service (RANaaS) architecture or the like, and the second radio access network node 302 may be a distributed processing network element in the RANaaS architecture or the like.

The first radio access network node 301 may provide wireless coverage or may not provide wireless coverage. For example, if the first radio access network node 301 provides wireless coverage, the first radio access network node 301 has a radio frequency (RF) system. If the first radio access network node 301 does not provide wireless coverage, the first radio access network node 301 does not have an RF system.

The second radio access network node 302 generally provides wireless coverage, that is, the second radio access network node 302 has an RF system.

A radio spectrum used by the first radio access network node 301 and a radio spectrum used by the second radio access network node 302 may be at a same frequency band (band) or a same frequency, or may be at different frequency bands or frequencies.

Second radio access network nodes 302 may use a same frequency band (band) or a same frequency, or may use different frequency bands or frequencies.

The system architecture structure shown in FIG. 3 may include multiple first radio access network nodes 301 and multiple second radio access network nodes 302.

The multiple second radio access network nodes 302 may be connected to a central control network element of the second radio access network node 302, and then connected to the first radio access network node 301.

The first radio access network node 301 and the second radio access network node 302 are different components of a same distributed base station. The first radio access network node 301 includes a radio resource control (RRC) layer and a packet data convergence protocol (PDCP) layer of a wireless interface protocol, and optionally, further includes one or more of the following wireless interface protocol layers: a radio link control (RLC) layer, a media access control (MAC) layer, or a physical (PHY) layer. The second radio access network node 302 includes a radio frequency unit, and optionally, further includes one or more of the following wireless interface protocol layers: a RLC layer, a MAC layer, a PHY layer, or a baseband processing unit.

The distributed base station may include one first radio access network node 301 and multiple second radio access network nodes 302.

Alternatively, each of the first radio access network node 301 and the second radio access network node 302 may be an independent base station and has all protocol layers of the wireless interface protocol layers: a RRC layer, a PDCP layer, a RLC layer, a MAC layer, a PHY layer, and a radio frequency unit.

In this embodiment of the present disclosure, one first radio access network node 301 and one second radio access network node 302 shown in FIG. 3 are used as an example for description.

Figure 4:
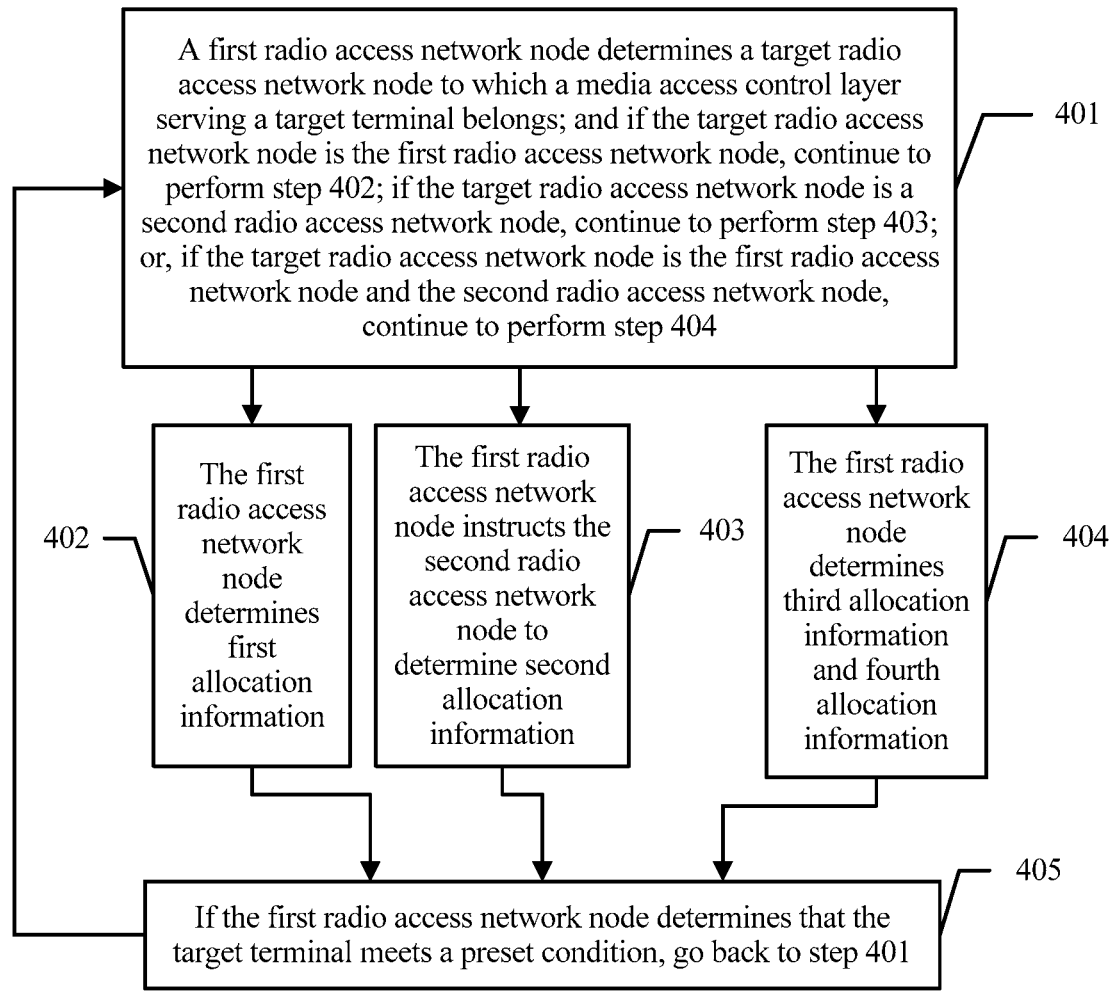
FIG. 4 is a step flowchart of a data transmission method according to an embodiment of the present disclosure.

With reference to FIG. 4, a data transmission method provided by an embodiment of the present disclosure is described in detail in the following.

401. A first radio access network node determines a target radio access network node to which a media access control layer serving a target terminal belongs; and if the target radio access network node is the first radio access network node, continue to perform step 402; if the target radio access network node is a second radio access network node, continue to perform step 403; or, if the target radio access network node is the first radio access network node and the second radio access network node, continue to perform step 404.

The target radio access network node is the first radio access network node, the second radio access network node, or the first radio access network node and the second radio access network node.

A specific quantity of the target terminal is not limited in this embodiment, that is, there may be one or more target terminals. For different target terminals, target radio access network nodes to which media access control layers serving the target terminals belong may be the same or different. A same target radio access network node may be used for all terminals within coverage of the second radio access network node. When the first radio access network node also has wireless coverage, a same target radio access network node is used for all terminals within coverage of the first radio access network node.

More specifically, the first radio access network node may determine the target radio access network node when the target terminal initially accesses a network and sets up a service or when the target terminal sets up or modifies a service bearer in a radio resource control (RRC) connected state; or determine the target radio access network node according to a wireless condition or when the target terminal moves.

More specifically, the first radio access network node may indicate the target radio access network node in a system information broadcast, and therefore, all terminals within coverage of the second radio access network node and/or the first radio access network node use a same target radio access network node.

Several cases in which the first radio access network node determines the target radio access network node are described by using examples in the following. It should be noted that a manner of determining the target radio access network node used to serve the target terminal is only an example in this embodiment and is not limited.

For example, if there are two target terminals, one target terminal UE1 uses a frame structure of a 0.1 millisecond subframe or transmission time interval (TTI), and the other target terminal UE2 uses a frame structure of a 1 ms subframe or TTI, the first radio access network node may determine that a target radio access network node serving UE1 is the second radio access network node, and that a target radio access network node serving UE2 is the first radio access network node. Therefore, this reduces impact caused by a delay on an interface between the first radio access network node and the second radio access network node to a short-TTI frame structure.

For another example, if a low-delay service is configured for one target terminal UE1, and a delay-insensitive service is configured for the other target terminal UE2, the first radio access network node determines that a target radio access network node serving UE2 is the first radio access network node, and that a target radio access network node serving UE1 is the second radio access network node. Therefore, this reduces impact caused by a delay on an interface between the first radio access network node and the second radio access network node to the low-delay service.

For another example, if one target terminal UE1 uses a cell of a millimeter wave such as 28 gigahertz (GHz) and a large bandwidth such as a bandwidth of 200 megahertz (MHz), and the other target terminal UE2 uses a cell of a low frequency such as 2.6 GHz and a small bandwidth such as a bandwidth of 20 MHz, the first radio access network node may determine that a target radio access network node serving UE2 is the first radio access network node, and that a target radio access network node serving UE1 is the second radio access network node. Therefore, this reduces impact caused by a capacity on an interface between the first radio access network node and the second radio access network node to a large-bandwidth service.

For another example, if one target terminal UE1 is located at edges of multiple cells, the other target terminal UE2 is located at the center of one of the cells, and the cells use a same frequency or different frequencies, the first radio access network node may determine that a target radio access network node serving UE1 is the first radio access network node, and that a target radio access network node serving UE2 is the second radio access network node. The first radio access network node can more conveniently obtain wireless condition information of multiple cells, and therefore, the first radio access network node can perform interference control or load balancing among multiple cells.

For another example, if there is one target terminal, and the target terminal is located at a cell edge and uses a frame structure of a 0.1 ms subframe, the first radio access network node determines that a target radio access network node serving the target terminal is the first radio access network node and the second radio access network node. The first radio access network node and the second radio access network node collaboratively serve the target terminal, and therefore, the target radio access network node can meet both delay and wireless condition requirements. A specific collaborative service manner is not limited in this embodiment.

For another example, the first radio access network node and the second radio access network node may determine, based on a round trip time (RTT, round trip time) of a hybrid automatic repeat request (HARQ, hybrid automatic retransmission request), whether a delay on an interface between the first radio access network node and the second radio access network node meets a service delay requirement, so as to determine whether to use the first radio access network node to serve the target terminal, or use the second radio access network node to serve the target terminal, or use the first radio access network node and the second radio access network node to collaboratively serve the target terminal. The interface between the first radio access network node and the second radio access network node may be referred to as a backhaul (backhaul or fronthaul).

In this embodiment, how the first radio access network node specifically determines the target radio access network node is not limited, provided that the first radio access network node can determine the target radio access network node serving the target terminal.

In this embodiment, how the target radio access network node specifically serves the target terminal is not limited, provided that the target radio access network node serves the target terminal to effectively ensure data transmission between both of the first radio access network node and the second radio access network node and the target terminal.

402. The first radio access network node determines first allocation information.

The first allocation information is used to instruct the first radio access network node to configure a first media access control layer function used to serve the target terminal.

In this embodiment, the first radio access network node can configure, according to the first allocation information, the first media access control layer function serving the target terminal, so that the first radio access network node can serve the target terminal according to the configured first media access control layer function.

403. The first radio access network node instructs the second radio access network node to determine second allocation information.

The second allocation information is used to instruct the second radio access network node to configure a second media access control layer function used to serve the target terminal, so that the second radio access network node can serve the target terminal according to the configured second media access control layer function.

404. The first radio access network node determines third allocation information and fourth allocation information.

The third allocation information is used to instruct the first radio access network node to configure a third media access control layer function used to serve the target terminal, and the fourth allocation information is used to instruct the second radio access network node to configure a fourth media access control layer function used to serve the target terminal.

In this embodiment, the first radio access network node can configure the third media access control layer function according to the determined third allocation information, and the second radio access network node can configure the fourth media access control layer function according to the determined fourth allocation information.

In this embodiment, the first media access control layer function, the second media access control layer function, the third media access control layer function, and the fourth media access control layer function include at least one or more of the following:

scheduling, priority, logical channel multiplexing/demultiplexing, radio resource allocation, HARQ control, random access, power control, or the like.

Step 405 continues to be performed after step 402, step 403, or step 404 is performed.

405. If the first radio access network node determines that the target terminal meets a preset condition, go back to step 401.

The preset condition is as follows: Service data of the target terminal is reconfigured, added, or deleted, or a quality of service (QoS) parameter of a service borne by a control plane signaling radio bearer SRB or a user plane data radio bearer DRB is changed, or a wireless condition of the target terminal changes, for example, a wireless environment of the target terminal changes when the target terminal moves.

If the first radio access network node determines that the target terminal meets the preset condition, the first radio access network node is triggered to perform again the step of determining the target radio access network node, that is, go back to step 401.

In this step, the first radio access network node may determine, according to the service data and/or the wireless condition of the target terminal, whether the target terminal meets the preset condition. Alternatively, the second radio access network node may determine, according to the service data and/or the wireless condition of the target terminal, whether the target terminal meets the preset condition, and notify the first radio access network node of a result of the determining. Alternatively, the first radio access network node and the second radio access network node negotiate to determine whether the target terminal meets the preset condition, for example, the first radio access network node determines whether the service data of the target terminal changes, and the second radio access network node determines whether the wireless condition of the target terminal changes. Once one of the cases occurs, go back to step 401.

It should be noted that a media access control MAC layer of the first radio access network node or the second radio access network node in this embodiment is mainly to perform MAC control for a corresponding target terminal, for example, a HARQ entity and a target-terminal-specific resource part. The first radio access network node and the second radio access network node further need to manage another terminal. Therefore, from a perspective of a cell, both of the first radio access network node and the second radio access network node include the MAC layer, at least a common part of the MAC layer, such as a common part of random access process control or a common part of scheduling/priority processing because these functions relate to control for multiple terminals.

According to the data transmission method shown in this embodiment, system performance is effectively improved; a performance requirement and costs for an interface between a first radio access network node and a second radio access network node are reduced, for example, bandwidth and delay requirements on the interface are reduced; a quality of service (QoS) requirement of a service can be met; and system resource utilization efficiency is improved.

How to implement data transmission if the first radio access network node determines that the target radio access network node is the first radio access network node is described in detail with reference to an embodiment shown in FIG. 5 in the following.

The following describes this embodiment in detail with reference to a specific application scenario.

That is, this embodiment uses an example that the target terminal uses a cell of a low frequency such as 2.6 GHz and a small bandwidth such as a bandwidth of 20 MHz. In addition, both the first radio access network node and the second radio access network node are wirelessly connected to the target terminal.

501. The first radio access network node determines that a target radio access network node to which a media access control layer serving the target terminal belongs is the first radio access network node.

In this embodiment, because the target terminal uses a cell of a low frequency such as 2.6 GHz and a small bandwidth such as a bandwidth of 20 MHz, the first radio access network node may determine that the target radio access network node serving the target terminal is the first radio access network node, thereby reducing impact caused by a capacity on an interface between the first radio access network node and the second radio access network node to a large-bandwidth service.

How the first radio access network node specifically determines that the target radio access network node is the first radio access network node is not limited in this embodiment. For example, the first radio access network node may determine the target radio access network node according to service data and a wireless condition of the target terminal; or the second radio access network node may determine the target radio access network node according to service data and a wireless condition of the target terminal, and the second radio access network node notifies the first radio access network node of the determined target radio access network node; or, the first radio access network node and the second radio access network node may negotiate to determine the target radio access network node according to service data and a wireless condition of the target terminal.

502. The first radio access network node determines first allocation information.

A specific manner in which the first radio access network node and the second radio access network node provide wireless coverage for the target terminal is not limited in this embodiment. For example, both the first radio access network node and the second radio access network node provide wireless coverage, or the first radio access network node does not provide wireless coverage, but the second radio access network node provides wireless coverage.

That the first radio access network node does not provide wireless coverage, but the second radio access network node provides wireless coverage is used as an example for description in this embodiment.

In this embodiment, the media access control layer serving the target terminal belongs to the first radio access network node. That is, a case in which a wireless connection of the first radio access network node provides an RRC control plane function, and the target terminal uses a user plane function provided by a wireless connection of the second radio access network node is used as an example for description.

Figure 6:
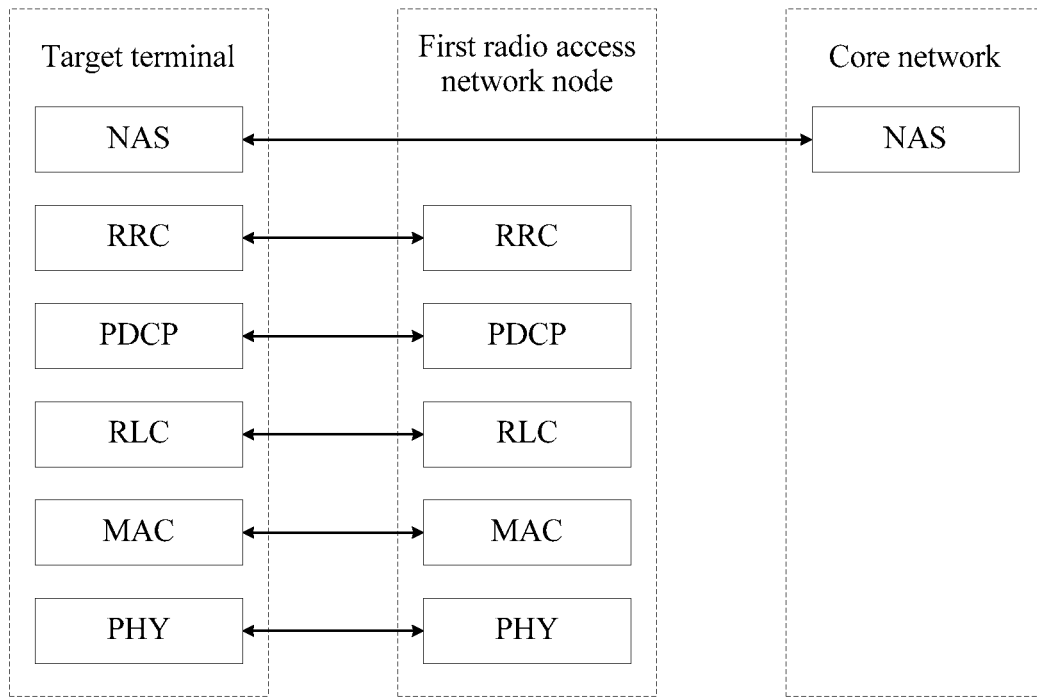
FIG. 6 is a schematic configuration diagram of a control plane protocol stack configured by a first radio access network node according to an embodiment of the present disclosure.
Figure 7:
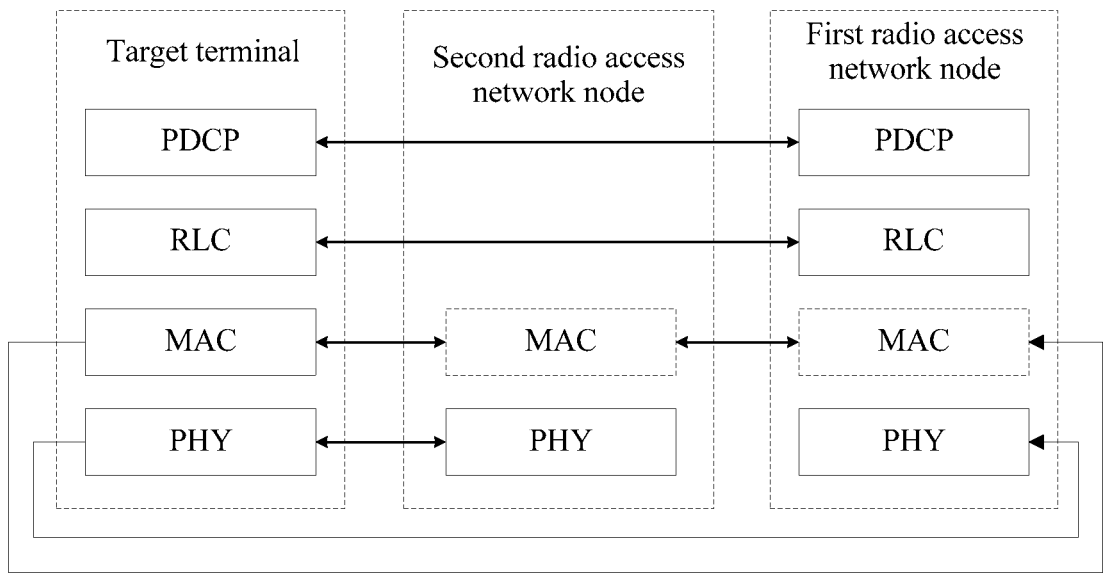
FIG. 7 is a schematic configuration diagram of a user plane protocol stack configured by a first radio access network node according to an embodiment of the present disclosure.

Control plane protocol stack configuration configured by the first radio access network node is shown in FIG. 6, and user plane protocol stack configuration configured by the first radio access network node is shown in FIG. 7.

As shown in FIG. 7, MAC layers of the first radio access network node and the second radio access network node are denoted by dashed lines, indicating that the MAC layer of the first radio access network node or the MAC layer of the second radio access network node can be flexibly configured and used according to the service data and the wireless condition of the target terminal, or the MAC layer of the first radio access network node and the MAC layer of the second radio access network node can be flexibly configured and collaboratively used according to the service data and the wireless condition of the target terminal. Configuring and using the MAC layer of the first radio access network node is used as an example in this embodiment.

In this embodiment, after the first radio access network node determines that the target radio access network node is the first radio access network node, the first radio access network node can generate the first allocation information.

The first allocation information refers to function division of the MAC layer of the first radio access network node, and the first allocation information may be sent to the second radio access network node by using the interface between the first radio access network node and the second radio access network node.

503. The first radio access network node configures a first media access control layer function according to the first allocation information.

The first radio access network node can configure the first media access control layer function according to the first allocation information, where the first media access control layer function is all functions that are of the media access control layer of the first radio access network node and are used to serve the target terminal.

The first media access control layer function includes at least one or more of the following:

scheduling, priority, logical channel multiplexing/demultiplexing, radio resource allocation, HARQ control, random access, power control, or the like.

504. The first radio access network node sends the first allocation information to the second radio access network node.

The second radio access network node receives the first allocation information generated by the first radio access network node, where the first allocation information is used to enable the second radio access network node to determine that the first radio access network node is the target radio access network node.

The second radio access network node sends the first allocation information to the target terminal by using a radio interface between the second radio access network node and the target terminal, so that the target terminal determines, according to the first allocation information, that the target radio access network node serving the target terminal is the first radio access network node.

Preferably, in this embodiment, the second radio access network node may send a radio resource control connection reconfiguration (RRC Connection Reconfiguration) message to the target terminal. The radio resource control connection reconfiguration message is used to enable the target terminal to determine that a media access control layer of the target terminal is corresponding to the media access control layer of the first radio access network node, so that the target terminal determines that the first radio access network node is the target radio access network node.

505. The first radio access network node performs data transmission with the target terminal according to the configured first media access control layer function.

For example, for control plane SRB data, the second radio access network node uses a control plane signaling radio bearer SRB to bear RRC signaling between the second radio access network node and the target terminal. The MAC layer of the first radio access network node packetizes a MAC PDU including RRC downlink signaling by using an interface message between the first radio access network node and the second radio access network node, and sends the interface message to the second radio access network node. The second radio access network node extracts the MAC PDU in the interface message and directly transfers the MAC PDU to a PHY layer or the MAC layer of the second radio access network node. The MAC layer of the second radio access network node does not further process the MAC PDU, and the physical layer of the second radio access network node further processes the MAC PDU, and then sends the MAC PDU to the target terminal by using the radio interface between the second radio access network node and the target terminal.

For another example, for control plane SRB uplink data, from a perspective of an RRC layer of the target terminal, an equivalent RRC protocol layer is still on the first radio access network node. An uplink RRC message that the target terminal needs to send is first sent to the second radio access network node. The second radio access network node packetizes a MAC SDU including the uplink RRC message by using an interface message between the first radio access network node and the second radio access network node, and sends the interface message to the first radio access network node. The first radio access network node extracts the MAC SDU in the interface message and transfers the MAC SDU to an RLC layer of the first radio access network node, and after being processed by using each layer of protocol, the MAC SDU is further transferred to an RRC layer of the first radio access network node.

For another example, for user plane DRB downlink data, the MAC layer of the first radio access network node allocates a radio resource for downlink data transmission for the target terminal. The media access control MAC layer of the first radio access network node generates a media access control protocol data unit MAC PDU according to the service data of the target terminal. A hybrid automatic repeat request HARQ entity of the first radio access network node controls HARQ transmission for the MAC PDU of the target terminal. The second radio access network node performs the HARQ process and physical layer processing, and the MAC layer function of the second radio access network node is disabled and is transparent to the target terminal. The first radio access network node sends the MAC PDU to the second radio access network node, so that the second radio access network node processes the MAC PDU at the physical layer and sends the MAC PDU to the target terminal by using the radio interface between the second radio access network node and the target terminal.

For another example, for user plane DRB uplink data, the MAC layer of the first radio access network node allocates a radio resource for uplink data transmission of the target terminal. The target terminal sends all or some uplink data of the target terminal from the target terminal to the second radio access network node according to the first allocation information, that is, the user plane protocol stack configuration shown in FIG. 7. The second radio access network node receives the uplink data from the target terminal, and after successfully decoding the uplink data at the physical layer, sends the uplink data to the MAC layer of the first radio access network node. The MAC layer of the second radio access network node is transparent to the target terminal, and the MAC layer of the second radio access network node further transfers the uplink data to an upper-layer protocol layer for processing.

In this manner, for downlink data and uplink data, when a MAC PDU is transmitted over the interface between the first radio access network node and the second radio access network node, before being transmitted, the MAC PDU may be encapsulated in a data format specified in an interface protocol. For example, the MAC PDU is transmitted by using the GTP-U protocol, the IP protocol, or the CPRI protocol, and this is not limited herein.

Optionally, all or some downlink data of a user plane data radio bearer (DRB) is first sent from the first radio access network node to the second radio access network node, and data offloading may start from a PDCP layer or an RLC layer, and therefore, the downlink data sent from the first radio access network node to the second radio access network node may be a PDCP protocol data unit (PDU) or an RLC PDU.

Correspondingly, the second radio access network node sends received all or some uplink data of a user plane DRB to the first radio access network node, and data offloading may start from a PDCP layer or an RLC layer, and therefore, the uplink data sent from the second radio access network node to the first radio access network node may be a PDCP protocol data unit (PDU) or an RLC PDU.

That is, this embodiment uses an example that both the first radio access network node and the second radio access network node provide wireless coverage. Therefore, the first radio access network node and the second radio access network node may perform wireless communication with the target terminal simultaneously or in a time-division manner.

Specifically, the first radio access network node generates downlink data according to the configured first media access control layer function, and the downlink data may be further processed by the second radio access network node and then sent to the target terminal, or the first radio access network node directly sends the downlink data to the target terminal.

Uplink data of the target terminal may be processed by the second radio access network node and then sent to the first radio access network node, or the target terminal may directly send uplink data to the first radio access network node, and the first radio access network node processes the uplink data according to the first media access control layer function.

It may be learned from the foregoing description that there are two data transmission manners. One manner is that the first radio access network node performs data transmission with the target terminal by using the second radio access network node, and the other manner is that the first radio access network node directly performs data transmission with the target terminal.

In the first data transmission process, if the first radio access network node performs data transmission with the target terminal by using the second radio access network node, before data transmission is performed, the first radio access network node needs to enable the target terminal to access the second radio access network node.

506. If the first radio access network node determines that the target terminal meets a preset condition, go back to step 501.

For details, refer to step 405 shown in FIG. 4. The details are not described in this embodiment.

The following describes in detail how the first radio access network node enables the target terminal to access the second radio access network node.

Specifically, there are two manners of accessing the second radio access network node by the target terminal. One manner is that the target terminal accesses the second radio access network node based on a contention-based random access process, and the other manner is that the target terminal accesses the second radio access network node based on a non-contention-based random access process.

Figure 8:
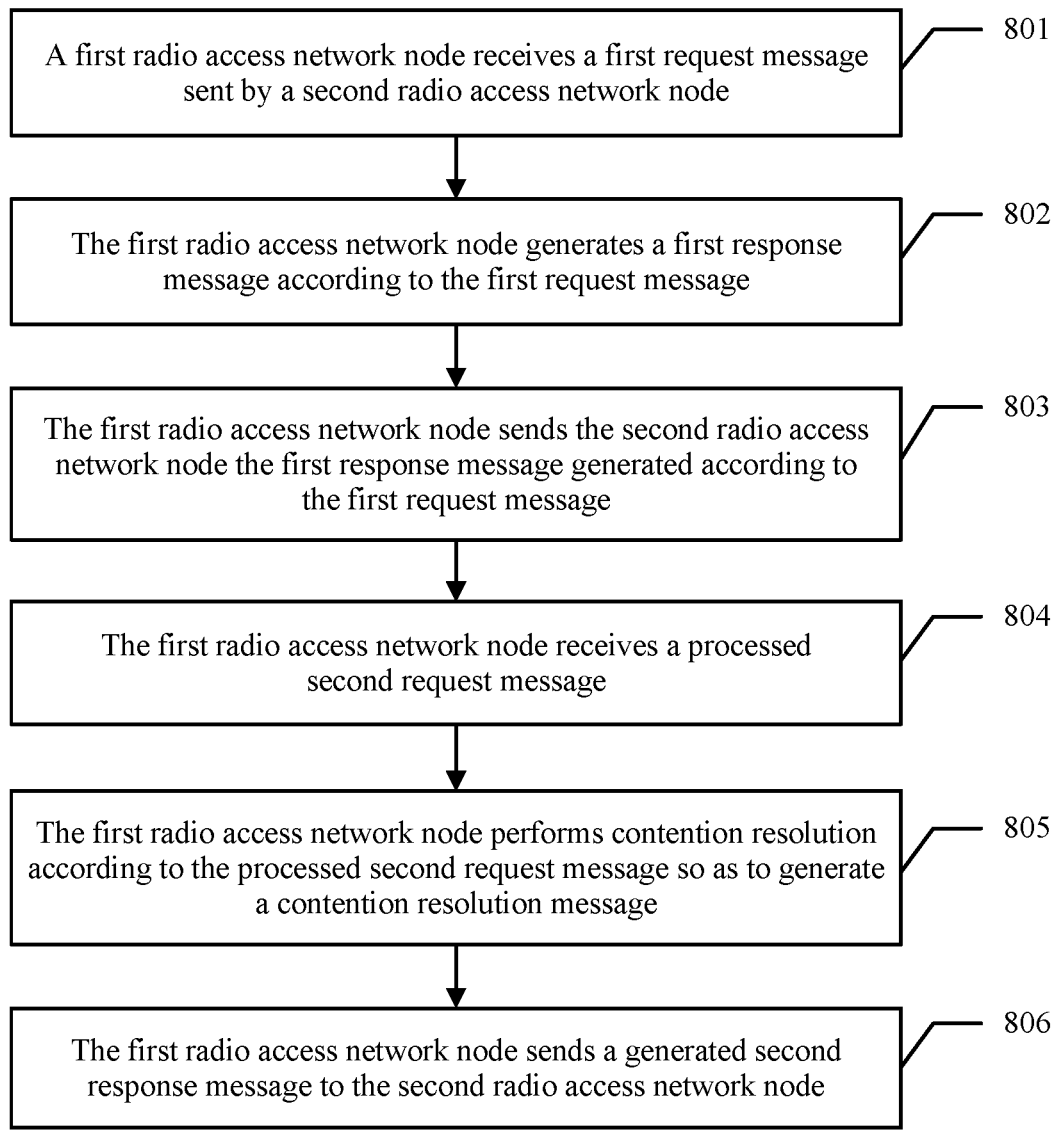
FIG. 8 is a step flowchart of enabling a target terminal by a first radio access network node to access a second radio access network node according to an embodiment of the present disclosure.

More specifically, with reference to FIG. 8, the following describes in detail how the target terminal accesses the second radio access network node based on the contention-based random access process.

801. The first radio access network node receives a first request message sent by the second radio access network node.

The first request message is used to request to enable the target terminal to access the second radio access network node.

The first request message is a random access preamble selected by the target terminal, and the target terminal sends the first request message to the second radio access network node according to a selected random access time-frequency resource.

The first radio access network node and the second radio access network node perform information transmission through an interface. The interface may be an X2 interface, a CPRI interface, a radio interface, or an interface in another form. A specific form of the interface is not limited in this embodiment of the present disclosure.

The first request message is further used to request the first radio access network node to generate a random access response (RAR) message at a MAC layer.

The second radio access network node further adds random access preamble index (RAPID) information to the first request message.

If the first radio access network node needs to calculate a random access-radio network temporary identifier RA-RNTI, the first request message further includes physical random access channel (PRACH) time-frequency resource information.

Specifically, a function of the first request message is as follows:

If the first request message includes PRACH time-frequency resource information, the first radio access network node calculates an RA-RNTI.

The first radio access network node calculates uplink TA, where the uplink TA is uplink TA from the target terminal to the second radio access network node, and TA indicates a distance between the target terminal and an antenna port.

TA=Timing Advance. A function of timing advance is to compensate for a wave transmission delay, and timing advance is essentially intended to improve channel encoding/decoding efficiency.

The first radio access network node allocates an uplink grant (UL grant).

An RRC layer of the first radio access network node allocates a temporary cell radio network temporary identifier (TC-RNTI).

If the first request message does not include a physical random access channel, it indicates that the second radio access network node calculates an RA-RNTI and uplink TA, and the second radio access network node sends a calculation result of the RA-RNTI and the uplink TA to the first radio access network node.

802. The first radio access network node generates a first response message according to the first request message.

The first response message includes the random access response (RAR) message and the RA-RNTI.

803. The first radio access network node sends the second radio access network node the first response message generated according to the first request message.

After receiving the first response message, the second radio access network node processes the first response message and generates a processed first response message.

The second radio access network node sends the processed first response message to the target terminal.

RA-RNTI information is indicated by using a physical downlink control channel PDCCH, and the RAR message is indicated by using a physical downlink shared channel PDSCH.

A format of the first response message sent by the first radio access network node to the second radio access network node may be different from a format of the processed first response message sent by the second radio access network node to the target terminal.

In step 801, the first radio access network node may send a UL grant and a TC-RNTI to the second radio access network node, and the second radio access network node generates and sends a first response message to the target terminal.

The processed first response message is used to enable the target terminal to generate a second request message used to trigger the first radio access network node to perform contention resolution, and the target terminal sends the second request message to the second radio access network node.

After receiving the second request message, the second radio access network node processes the second request message and generates a processed second request message.

The second radio access network node sends the processed second request message to the first radio access network node.

The second request message includes an identifier S-TMSI of the target terminal or a random number, or a cell radio network temporary identifier (C-RNTI). Optionally, the second request message further includes a radio resource control connection request (RRC Connection Request) message or a radio resource control connection reestablishment request (RRC Connection Reestablishment Request) message.

The second radio access network node processes the second request message, so that the processed second request message includes the identifier S-TMSI of the target terminal, the random number, or the C-RNTI. Optionally, the processed second request message may further include an RRC connection request or RRC connection reestablishment request message. The second radio access network node sends the foregoing message to the first radio access network node by using an interface message between the second radio access network node and the first radio access network node.

804. The first radio access network node receives a processed second request message.

805. The first radio access network node performs contention resolution according to the processed second request message so as to generate a contention resolution message.

806. The first radio access network node sends a generated second response message to the second radio access network node.

The second response message is used to indicate the contention resolution message.

For example, the first radio access network node uses the C-RNTI as a contention resolution identifier. Optionally, the second response message may further include a radio resource control connection setup (RRC Connection Setup) message, a radio resource control connection reestablishment (RRC Connection Reestablishment) message, or the like.

After receiving the second response message, the second radio access network node processes the second response message and generates a processed second response message.

The second radio access network node sends the processed second response message to the target terminal.

Specifically, after processing, at a physical layer, the second response message received from the first radio access network node, the second radio access network node sends the processed second response message to the target terminal.

More specifically, the second radio access network node indicates the message to the target terminal by using a downlink assignment (DL assignment) or an uplink grant (UL grant) on a physical downlink control channel (PDCCH) scrambled by using the C-RNTI or the TC-RNTI.

The first radio access network node sends the second response message to the second radio access network node by using an interface message between the second radio access network node and the first radio access network node. A format of the second response message may be different from a format of the processed second response message sent by the second radio access network node to the target terminal. For example, the second response message sent by the first radio access network node to the second radio access network node is a MAC PDU that is packetized by using an interface message and that includes the second response message.

The target terminal accesses the second radio access network node or obtains uplink synchronization with the second radio access network node according to the processed second response message.

It should be noted that if the first radio access network node directly performs data transmission with the target terminal, the first radio access network node needs to enable the target terminal to directly access the first radio access network node, and enable the target terminal to obtain uplink synchronization with the first radio access network node. For an implementation process, refer to FIG. 8, and details are not described. A difference lies in that the uplink timing advance TA in step 802 is TA between the target terminal and the first radio access network node.

Figure 9:
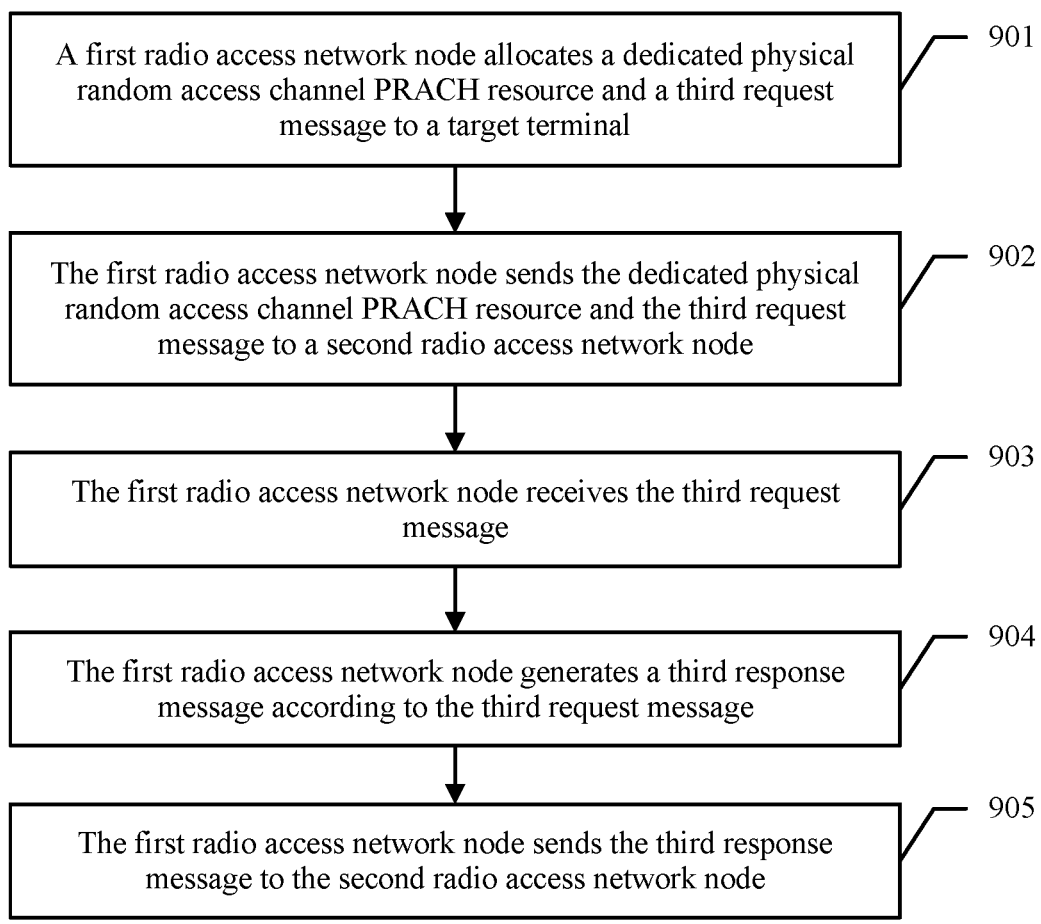
FIG. 9 is another step flowchart of enabling a target terminal by a first radio access network node to access a second radio access network node according to an embodiment of the present disclosure.

With reference to FIG. 9, the following describes in detail how the target terminal accesses the second radio access network node based on the non-contention-based random access process.

901. The first radio access network node allocates a dedicated physical random access channel PRACH resource and a third request message to the target terminal.

The third request message is a random access preamble selected by the target terminal, so that the target terminal can send the third request message according to the dedicated physical random access channel PRACH resource allocated by the first radio access network node.

For specific content included in the third request message, refer to content included in the first request message shown in FIG. 8, and details are not described in this embodiment.

902. The first radio access network node sends the dedicated physical random access channel PRACH resource and the third request message to the second radio access network node.

The second radio access network node sends the dedicated physical random access channel PRACH resource and the third request message (that is, information about the random access preamble) to the target terminal, for example, indicates the dedicated physical random access channel PRACH resource and the third request message to the target terminal by using a PDCCH.

The target terminal sends the third request message, that is, the random access preamble, by using the dedicated physical random access channel PRACH resource.

The target terminal sends the third request message to the second radio access network node by using the dedicated physical random access channel PRACH resource, so that the second radio access network node sends the third request message to the first radio access network node.

Certainly, in another embodiment, the second radio access network node may allocate the dedicated physical random access channel PRACH resource and the third request message to the target terminal.

It should be noted that the random access preamble shown in FIG. 9 is allocated by the first radio access network node or the second radio access network node to the target terminal.

903. The first radio access network node receives the third request message.

904. The first radio access network node generates a third response message according to the third request message.

For a specific process in which the first radio access network node generates the third response message according to the third request message, refer to FIG. 8 for a specific process in which the first radio access network node generates the first response message according to the first request message. Details are not described in this embodiment.

905. The first radio access network node sends the third response message to the second radio access network node.

After receiving the third response message, the second radio access network node processes the third response message to generate a processed third response message, and the second radio access network node sends the processed third response message to the target terminal, so that the target terminal accesses the second radio access network node or obtains uplink synchronization with the second radio access network node according to the processed third response message, so as to complete a non-contention-based random access process.

It should be noted that if the first radio access network node directly performs data transmission with the target terminal, the first radio access network node needs to enable the target terminal to directly access the first radio access network node, and enable the target terminal to obtain uplink synchronization with the first radio access network node. For an implementation process, refer to FIG. 8, and details are not described. A difference lies in that the uplink timing advance TA in the third request message is TA between the target terminal and the first radio access network node.

The following describes a specific transmission scenario of data transmission by using an example.

In a downlink data transmission process:

The first radio access network node generates downlink data and downlink control information according to the first media access control layer function.

Specifically, a MAC layer and a PHY layer of the first radio access network node cooperate to generate the downlink data and the downlink control information.

The downlink data includes a downlink media access control service data unit MAC SDU and/or a downlink media access control control element (MAC CE).

The downlink control information includes downlink hybrid automatic repeat request (HARQ) information and downlink assignment information.

The first radio access network node sends the downlink data and the downlink control information to the second radio access network node.

The second radio access network node sends the downlink data and the downlink control information to the target terminal.

The second radio access network node sends the downlink data and the downlink control information over different physical channels.

Specifically, the second radio access network node sends the downlink control information to the target terminal over a PDCCH.

Specifically, the second radio access network node sends the downlink data to the target terminal over a PDSCH.

After receiving the downlink control information, the target terminal receives the downlink data according to an indication of the downlink control information.

The following provides detailed description by using a specific application scenario.

The downlink control information generated by the first radio access network node according to the configured first media access control layer function may be downlink assignment (DL assignment) information.

In a downlink spatial multiplexing case, the downlink assignment information includes information such as a group of an NDI, a TB size, and a HARQ process identifier that are generated for each transport block.

The downlink assignment information may be hybrid automatic repeat request HARQ information, and the HARQ information includes a new data indicator (NDI), a transport block (TB) size, a HARQ process identifier (HARQ process Id), and other information.

The first radio access network node sends the HARQ information to the second radio access network node, and the second radio access network node indicates, over a PDCCH, the HARQ information to the target terminal that has accessed the second radio access network node.

The target terminal sends a HARQ ACK/NACK to PHY of the second radio access network node, and the second radio access network node indicates the HARQ ACK/NACK to the MAC layer of the first radio access network node by using the interface between the second radio access network node and the first radio access network node.

Therefore, the MAC layer of the first radio access network node determines to schedule new transmission or retransmit a HARQ redundancy version (RV). The first radio access network node sends new downlink assignment information to the second radio access network node, so that the second radio access network node resends the new downlink assignment information to the target terminal.

For another example, the first radio access network node generates a downlink MAC CE according to the configured first media access control layer function.

The first radio access network node sends the downlink MAC CE to the second radio access network node by using the interface between the first radio access network node and the second radio access network node.

The second radio access network node sends the downlink MAC CE to the target terminal.

The MAC CE includes at least one or more of the following: a TA command, secondary carrier (SCell) activation/deactivation, or a discontinuous reception command (DRX cmd).

In an uplink data transmission process:

The first radio access network node generates uplink control information according to the first media access control layer function.

The first radio access network node sends the uplink control information to the second radio access network node.

The second radio access network node sends the uplink control information to the target terminal.

Specifically, the second radio access network node sends the uplink control information to the target terminal over a PDCCH.

The uplink control information includes uplink hybrid automatic repeat request HARQ information and uplink grant information.

The media access control layer of the first radio access network node receives uplink data.

The uplink data is sent by the target terminal to the second radio access network node.

The second radio access network node sends the uplink data to the first radio access network node.

The uplink data is generated by the target terminal according to the uplink control information, and the uplink data includes a MAC SDU and/or an uplink MAC CE.

The media access control layer of the first radio access network node processes the uplink data according to the first media access control layer function.

The following provides detailed description by using a specific application scenario.

The uplink control information generated by the first radio access network node according to the configured first media access control layer function may be uplink grant (UL grant) information.

The uplink grant information may be hybrid automatic repeat request HARQ information, and the HARQ information includes a new data indicator (NDI), a transport block (TB) size, a redundancy version, and other information.

The first radio access network node sends the HARQ information to the second radio access network node, and a PDCCH of the second radio access network node indicates the HARQ information to the target terminal.

The target terminal sends a data packet to the second radio access network node over a physical uplink shared channel (PUSCH).

After successfully decoding the data packet at a physical layer, the second radio access network node sends a MAC PDU to the first radio access network node by using the interface between the second radio access network node and the first radio access network node.

The second radio access network node generates and sends a HARQ ACK/NACK to the target terminal, and indicates the HARQ ACK/NACK message to the first radio access network node by using the interface between the second radio access network node and the first radio access network node.

Therefore, the MAC layer of the first radio access network node determines to schedule new transmission or retransmit a HARQ redundancy version (RV). The first radio access network node sends new uplink grant information to the second radio access network node, so that the second radio access network node can send the new uplink grant information to the target terminal.

For another example, the target terminal generates an uplink MAC CE.

The target terminal sends the uplink MAC CE to the second radio access network node.

The second radio access network node sends the uplink MAC CE to the first radio access network node by using the interface between the first radio access network node and the second radio access network node.

The uplink MAC CE includes at least one or more of the following: a buffer status report (BSR), a power headroom report (PHR, power headroom report), or the like.

For another example, the target terminal sends uplink channel state information (CSI) to the second radio access network node.

The second radio access network node sends the uplink CSI to the first radio access network node by using the interface between the first radio access network node and the second radio access network node.

The first radio access network node makes a scheduling decision according to the uplink CSI, for example, determines to schedule a used modulation and coding scheme (MCS).

The uplink CSI includes at least one or more of the following information:

a channel quality indication (CQI), a precoding matrix index, a rank indication, a precoding type indication (PTI), and other information.

For another example, the target terminal sends uplink SR information to the second radio access network node.

The second radio access network node sends the uplink SR information to the first radio access network node by using the interface between the first radio access network node and the second radio access network node.

The first radio access network node allocates an uplink grant to the target terminal according to the uplink SR information.

In the foregoing application scenarios, the uplink data and the downlink data between the first radio access network node and the target terminal are sent by using the second radio access network node. Certainly, when the target terminal has accessed the first radio access network node and has synchronized with the first radio access network node, the first radio access network node directly implements uplink data and downlink data transmission with the target terminal. Details are not described.

In this embodiment, according to service data and a wireless condition of the target terminal, the first radio access network node may determine that a target radio access network node to which a media access control layer serving the target terminal belongs is the first radio access network node, so that a MAC layer of the first radio access network node serves the target terminal. That is, the first radio access network node generates first allocation information, and configures a first media access control layer function according to the first allocation information. In addition, the first media access control layer function is all functions that are of the media access control layer of the first radio access network node and are used to serve the target terminal. It may be learned that in this embodiment, a target radio access network node can be flexibly determined according to the service data and the wireless condition of the target terminal, so that flexible deployment can be implemented according to an existing service. In addition, a performance requirement and costs for an interface between the first radio access network node and the second radio access network node are reduced, for example, bandwidth and delay requirements on the interface are reduced; a quality of service (QoS) requirement of the service can be met; and system resource utilization efficiency is improved.

Figure 10:
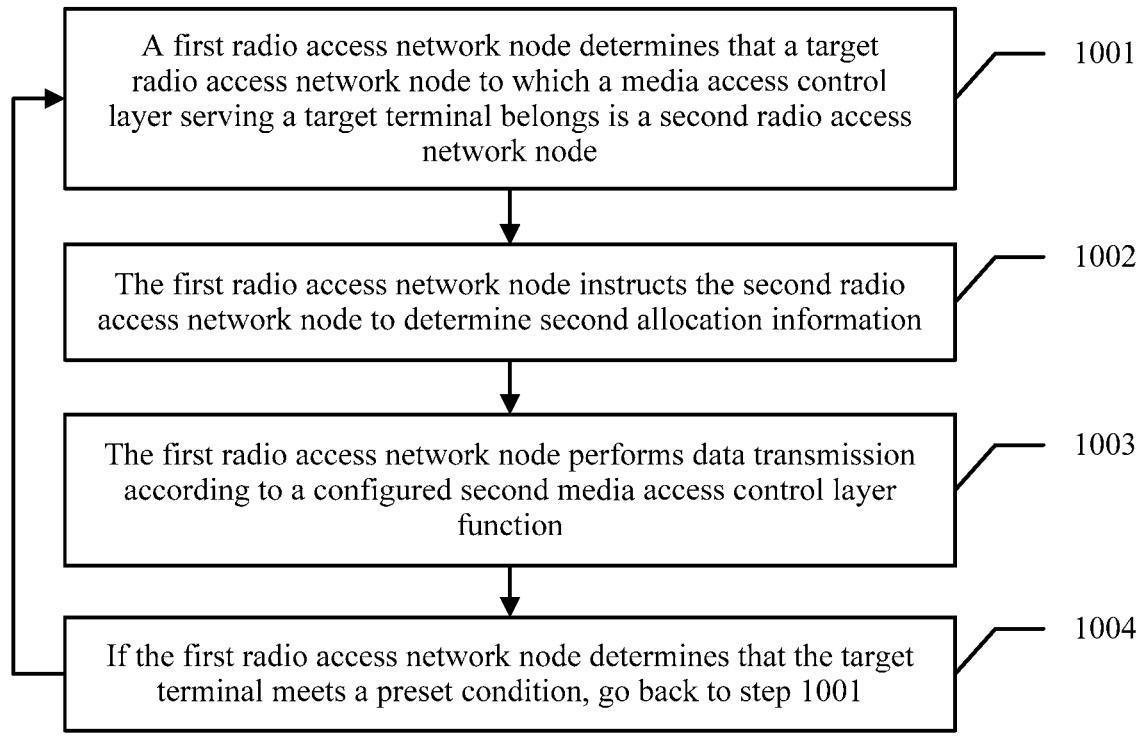
FIG. 10 is another step flowchart of a data transmission method according to an embodiment of the present disclosure.

How to implement data transmission if the first radio access network node determines that the target radio access network node is the second radio access network node is described in detail with reference to an embodiment shown in FIG. 10 in the following.

The following describes this embodiment in detail with reference to a specific application scenario.

1001. The first radio access network node determines that a target radio access network node to which a media access control layer serving the target terminal belongs is the second radio access network node.

How the first radio access network node specifically determines that the target radio access network node is the second radio access network node is not limited in this embodiment. For example, the first radio access network node may determine the target radio access network node according to service data and a wireless condition of the target terminal; or the second radio access network node may determine the target radio access network node according to service data and a wireless condition of the target terminal, and the second radio access network node notifies the first radio access network node of the determined target radio access network node; or, the first radio access network node and the second radio access network node may negotiate to determine the target radio access network node according to service data and a wireless condition of the target terminal.

For example, the target terminal is located in the center of a cell provided by a second radio access network node.

Therefore, the first radio access network node determines that the target radio access network node serving the target terminal is the second radio access network node. Unlike a terminal at a cell edge, such a target terminal is usually not interfered by a wireless condition of another cell.

This embodiment may be specifically applied to a case in which both the first radio access network node and the second radio access network node provide wireless coverage, or only the second radio access network node provides wireless coverage, and the target terminal is wirelessly connected to only the second radio access network node.

1002. The first radio access network node instructs the second radio access network node to determine second allocation information.

The second allocation information is used to instruct the second radio access network node to configure a second media access control layer function used to serve the target terminal.

In this embodiment, how the first radio access network node specifically instructs the second radio access network node to determine the second allocation information is not limited, provided that the second radio access network node can determine the second allocation information under control of the first radio access network node.

For example, the first radio access network node may semi-statically instruct the second radio access network node to determine the second allocation information.

Specifically, the first radio access network node generates configuration information; and the first radio access network node sends the configuration information to the second radio access network node, where the configuration information is used to enable the second radio access network node to determine the second allocation information, so that the second radio access network node configures the second media access control layer function for the target terminal according to the second allocation information, and the second media access control layer function is all functions that are of a media access control layer of the second radio access network node and are used to serve the target terminal.

That is, each time after receiving the configuration information, the second radio access network node always generates the second allocation information according to the configuration information.

For another example, the first radio access network node may dynamically instruct the second radio access network node to determine the second allocation information.

Specifically, the first radio access network node dynamically instructs the second radio access network node to generate the second allocation information according to the service data and the wireless condition of the target terminal.

A case in which both the first radio access network node and the second radio access network node provide wireless coverage, or only the second radio access network node provides wireless coverage, and the target terminal is wirelessly connected to only the second radio access network node is used as an example for description in this embodiment.

Figure 11:
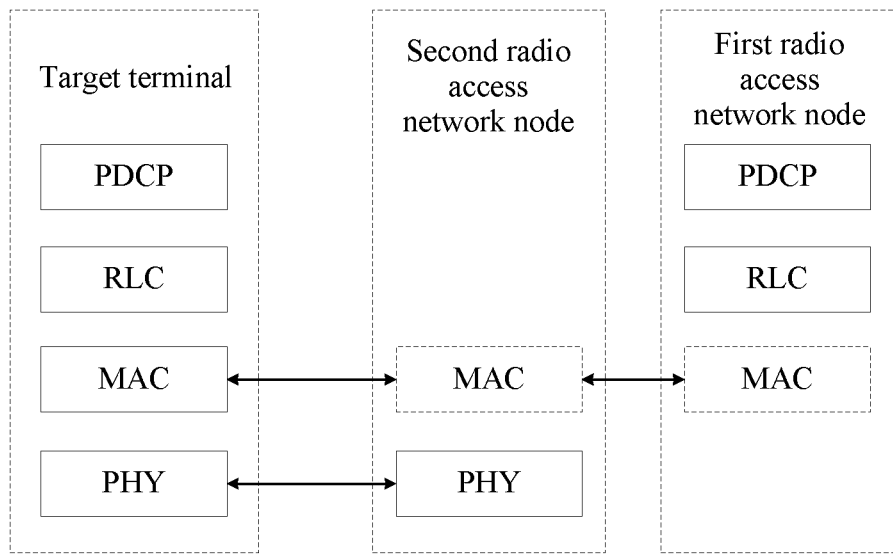
FIG. 11 is a schematic configuration diagram of a user plane protocol stack configured by a second radio access network node according to an embodiment of the present disclosure.
Figure 12:
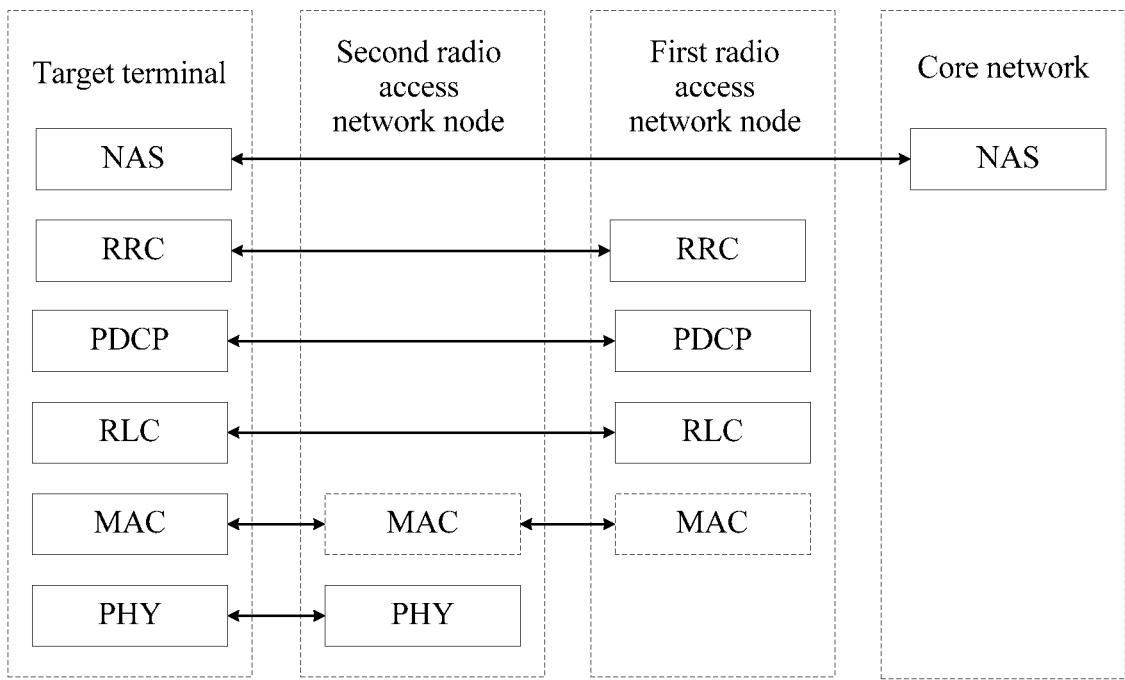
FIG. 12 is a schematic configuration diagram of a control plane protocol stack configured by a second radio access network node according to an embodiment of the present disclosure.

User plane protocol stack configuration configured by the second radio access network node according to the second allocation information is shown in FIG. 11, and control plane protocol stack configuration configured by the second radio access network node according to the second allocation information is shown in FIG. 12.

With reference to FIG. 11 and FIG. 12, the following describes how the first radio access network node specifically instructs the second radio access network node to determine the second allocation information. The first radio access network node sends configuration information, and the configuration information is MAC layer function allocation information determined by the first radio access network node. The configuration information is packetized by using an interface message between the first radio access network node and the second radio access network node and then sent to the second radio access network node. A specific process in which the second radio access network node determines the second allocation information according to the configuration information is as follows: The second radio access network node determines, according to the configuration information, all functions that are of the media access control layer of the second radio access network node and used to serve the target terminal. The second media access control layer function includes at least one or more of the following:

scheduling, priority, logical channel multiplexing/demultiplexing, radio resource allocation, HARQ control, random access, power control, or the like.

Figure 13:
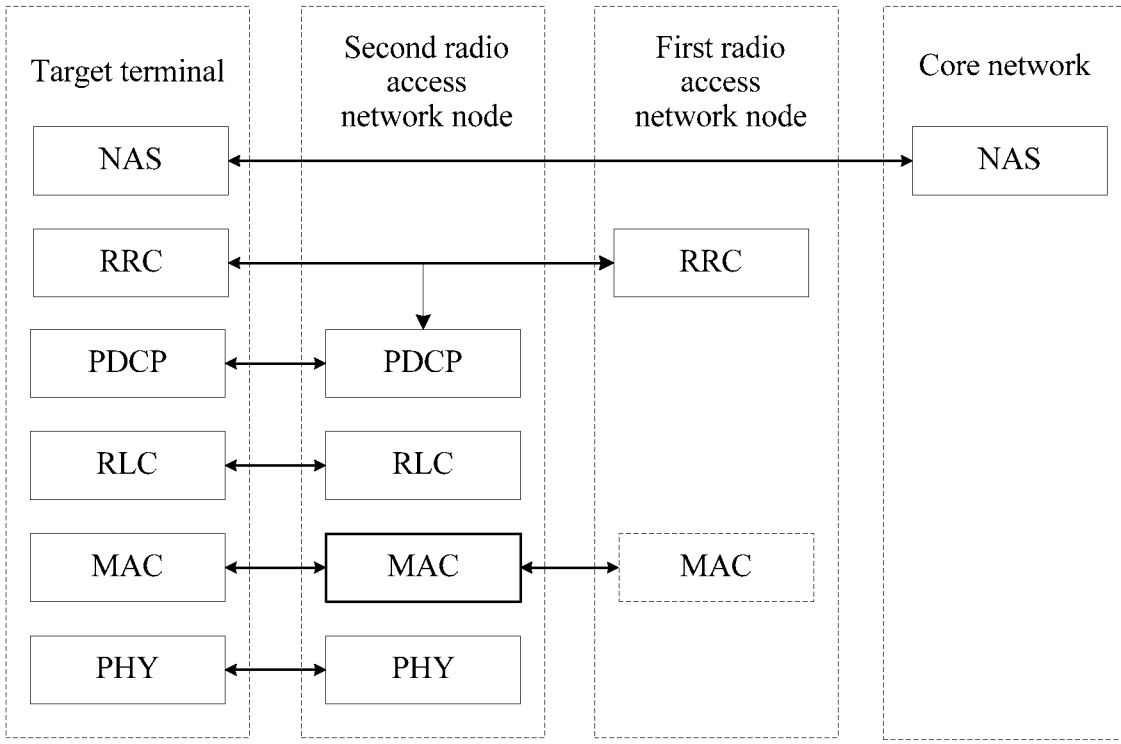
FIG. 13 is another schematic configuration diagram of a control plane protocol stack configured by a second radio access network node according to an embodiment of the present disclosure.

For the control plane protocol stack configuration configured by the second radio access network node according to the second allocation information, further refer to FIG. 13.

The second radio access network node uses an SRB or a DRB to bear RRC signaling between the second radio access network node and the target terminal.

The SRB and the DRB particularly refer to radio interface protocol stacks between both of the first radio access network node and the second radio access network node and the target terminal.

A processing manner of a control plane protocol stack is as follows: For example, an SRB of the first radio access network node includes a PDCP layer of the first radio access network node. After an RRC message of the first radio access network node is processed at the PDCP layer of the first radio access network node, a PDCP PDU is packetized by using an interface message between the first radio access network node and the second radio access network node and then sent to the second radio access network node. The second radio access network node extracts the PDCP PDU from the interface message and directly transfers the PDCP PDU to an RLC layer, and after being processed at the RLC layer, the PDCP PDU is further transferred to a lower-layer protocol layer. From a perspective of an RRC layer of the target terminal, an equivalent RRC protocol layer is still on the first radio access network node.

Another processing manner of the control plane protocol stack is as follows: For another example, an SRB of the first radio access network node includes an RLC layer of the first radio access network node. The first radio access network node sends an RLC PDU including RRC downlink signaling to the second radio access network node by using an interface message between the first radio access network node and the second radio access network node. Subsequent processing is not described. All downlink data of a user plane data radio bearer DRB is first sent from the first radio access network node to the second radio access network node, and data offloading may start from a PDCP layer of the first radio access network node or the RLC layer of the first radio access network node. Therefore, the downlink data sent from the first radio access network node to the second radio access network node may be a PDCP protocol data unit (PDU) or an RLC PDU. Then, after being processed by the second radio access network node, the downlink data is sent to the target terminal by using a wireless connection between the second radio access network node and the target terminal.

All uplink data of the user plane DRB is sent from the target terminal to the second radio access network node, and then is sent from the second radio access network node to the first radio access network node. Correspondingly, the uplink data sent from the second radio access network node to the first radio access network node may be a MAC PDU or a TB.

1003. The first radio access network node performs data transmission according to a configured second media access control layer function.

1004. If the first radio access network node determines that the target terminal meets a preset condition, go back to step 1001.

For details, refer to step 405 shown in FIG. 4. The details are not described in this embodiment.

The following describes step 1003 in detail.

Specifically, the first radio access network node sends generated downlink data to the second radio access network node, and the second radio access network node processes the downlink data according to the second media access control layer function and sends processed downlink data to the target terminal.

The target terminal sends uplink data to the second radio access network node, and the second radio access network node processes the uplink data according to the second media access control layer function and sends processed uplink data to the first radio access network node.

It may be learned from the foregoing description that before the first radio access network node sends the generated downlink data to the second radio access network node, and the second radio access network node processes the downlink data according to the second media access control layer function and sends the processed downlink data to the target terminal, the target terminal needs to access the second radio access network node, and the target terminal needs to obtain synchronization with the second radio access network node.

Specifically, there are two manners of accessing the second radio access network node by the target terminal. One manner is that the target terminal accesses the second radio access network node based on a contention-based random access process, and the other manner is that the target terminal accesses the second radio access network node based on a non-contention-based random access process.

Figure 14:
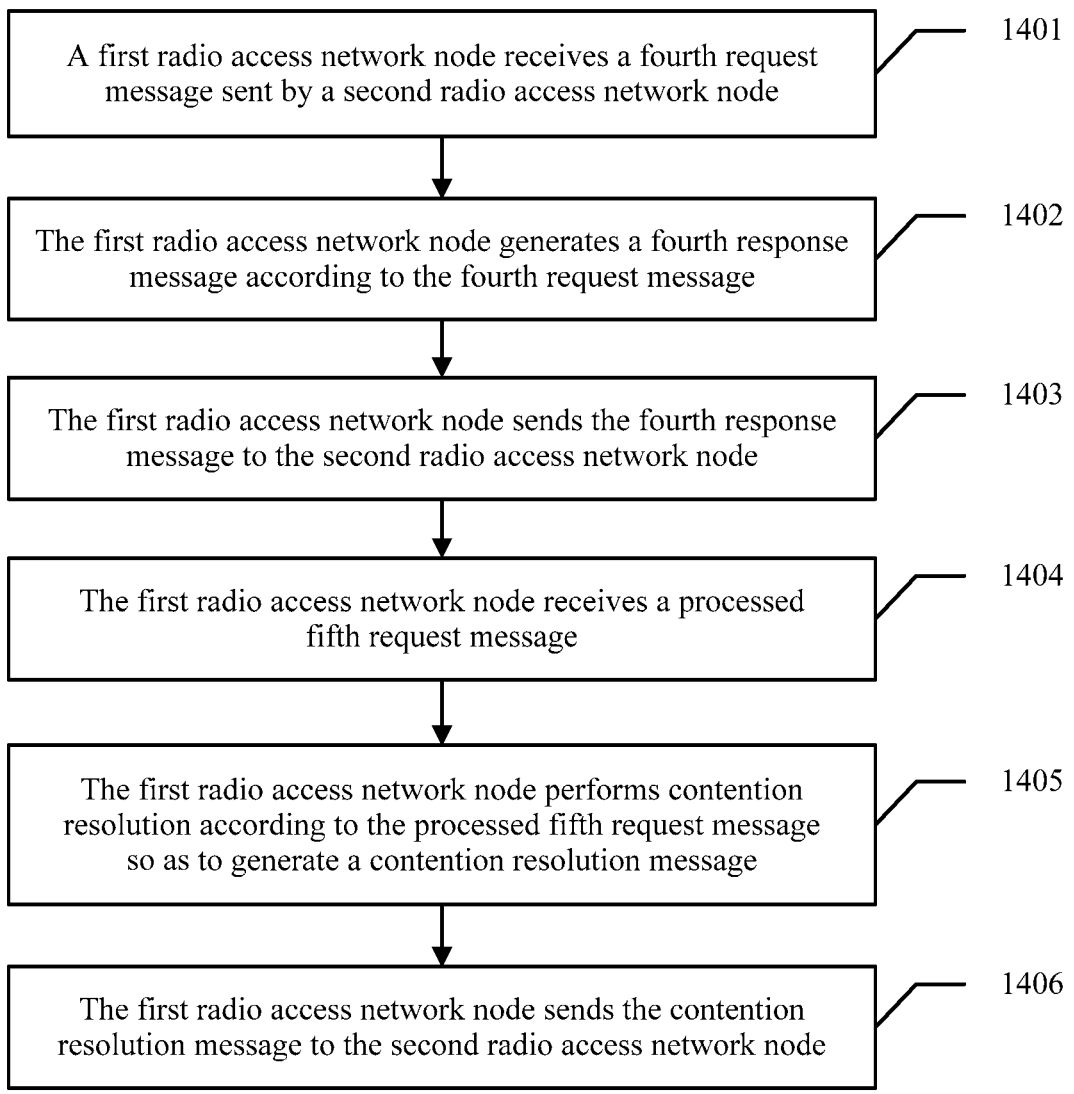
FIG. 14 is another step flowchart of enabling a target terminal by a first radio access network node to access a second radio access network node according to an embodiment of the present disclosure.

More specifically, with reference to FIG. 14, the following describes in detail how the target terminal accesses the second radio access network node based on the contention-based random access process.

1401. The first radio access network node receives a fourth request message sent by the second radio access network node.

The fourth request message is used to request to enable the target terminal to access the second radio access network node.

The fourth request message is a random access preamble selected by the target terminal, and the target terminal sends the fourth request message to the second radio access network node according to a selected random access time-frequency resource.

The first radio access network node and the second radio access network node perform information transmission through an interface. The interface may be an X2 interface, a CPRI interface, a radio interface, or an interface in another form. A specific form of the interface is not limited in this embodiment of the present disclosure.

The fourth request message is further used to request the first radio access network node to allocate a temporary cell radio network temporary identifier (TC-RNTI).

1402. The first radio access network node generates a fourth response message according to the fourth request message.

The fourth response message includes a TC-RNTI allocated by an RRC layer of the first radio access network node.

1403. The first radio access network node sends the fourth response message to the second radio access network node.

A manner of processing the fourth response message by the second radio access network node to generate a processed fourth response message may be as follows: The second radio access network node calculates an RA-RNTI to generate an RAR message, and adds information, such as a random access preamble index RAPID, uplink timing advance TA, and an uplink grant (UL grant), to the RAR message.

The second radio access network node forwards the target terminal the processed fourth response message including the RAR message, and the processed fourth response message is used to enable the target terminal to generate a fifth request message used to trigger the first radio access network node to perform contention resolution. The target terminal sends the fifth request message to the second radio access network node, and the second radio access network node processes the fifth request message and sends a generated processed fifth request message to the first radio access network node.

1404. The first radio access network node receives a processed fifth request message.

The processed fifth request message includes an S-TMSI of the target terminal or a random number, or a cell radio network temporary identifier (C-RNTI). Optionally, the processed fifth request message further includes a radio resource control connection request (RRC Connection Request) message or a radio resource control connection reestablishment request (RRC Connection Reestablishment Request) message.

The second radio access network node sends the processed fifth request message to the first radio access network node. The processed fifth request message includes the S-TMSI of the target terminal, the random number, or the C-RNTI. Optionally, the processed fifth request message may further include an RRC connection request or RRC connection reestablishment request message. The second radio access network node sends the foregoing message to the first radio access network node by using an interface message between the second radio access network node and the first radio access network node.

1405. The first radio access network node performs contention resolution according to the processed fifth request message so as to generate a contention resolution message.

For example, the first radio access network node uses the C-RNTI as a contention resolution identifier. Optionally, the message may further include a radio resource control connection setup (RRC Connection Setup) message, a radio resource control connection reestablishment (RRC Connection Reestablishment) message, or the like.

1406. The first radio access network node sends the contention resolution message to the second radio access network node.

The second radio access network node generates a fifth response message according to the contention resolution message; and the second radio access network node processes the fifth response message to generate a processed fifth response message, and sends the processed fifth response message to the target terminal, so that the target terminal determines to access the second radio access network node or obtain uplink synchronization with the second radio access network node according to the processed fifth response message.

Specifically, the second radio access network node indicates the processed fifth response message to UE by using a downlink assignment (DL assignment) or an uplink grant (UL grant) on a physical downlink control channel (PDCCH) scrambled by using the C-RNTI.

In this embodiment, the target terminal may access the second radio access network node in a non-contention-based random access manner. For a specific implementation process, refer to a non-contention-based random access process in a conventional LTE technology. Details are not described herein.

The following describes a specific transmission scenario of data transmission by using an example.

In a downlink data transmission process:

The first radio access network node generates downlink data; and the first radio access network node sends the downlink data to the second radio access network node.

The downlink data may be an RLC PDU or a MAC SDU, or may be a PDCP PDU.

A media access control layer of the second radio access network node processes the downlink data according to a second media access control layer function so as to generate processed downlink data.

The processed downlink data may be a MAC PDU.

The second radio access network node sends the processed downlink data to the target terminal, where the processed downlink data includes a MAC SDU and/or a downlink MAC CE.

In this transmission process, downlink control information is directly generated by the second radio access network node according to the second media access control layer function and sent to the target terminal.

The following provides detailed description by using a specific application scenario.

For example, the second radio access network node generates a downlink MAC PDU according to the configured second media access control layer function.

According to a wireless condition of the target terminal, the MAC layer of the second radio access network node determines the target terminal that needs to be scheduled and a logical channel of the target terminal.

By using an interface between the first radio access network node and the second radio access network node, the second radio access network node indicates a size of an RLC PDU that can be generated at an RLC layer of the first radio access network node.

The second radio access network node may indicate information about a total size of multiple RLC PDUs that can be scheduled by all logical channels or separately indicate information about a size of one or more RLC PDUs that can be scheduled by each logical channel.

The second radio access network node sends downlink assignment information including HARQ information to the target terminal, and the target terminal sends a HARQ ACK/NACK feedback to the second radio access network node. For details, refer to a prior-art HARQ processing process.

For another example, the second radio access network node generates and sends a downlink MAC CE to UE. The manner is the same as a sending manner of a downlink MAC CE in the conventional LTE technology.

In an uplink data transmission process:

The first radio access network node receives processed uplink data.

The processed uplink data is data generated after the media access control layer of the second radio access network node processes uplink data according to the second media access control layer function. The uplink data is sent by the target terminal to the second radio access network node, and the uplink data includes a MAC SDU and/or an uplink MAC CE.

The following provides detailed description by using a specific application scenario.

For uplink HARQ processing, the second radio access network node sends uplink grant information including HARQ information to the target terminal according to the second media access control layer function.

The target terminal sends data to the second radio access network node over a PUSCH.

The second radio access network node generates and sends a HARQ ACK/NACK to the target terminal. For details, refer to a prior-art HARQ processing process.

For another example, the first radio access network node sends logical channel configuration information in RRC configuration information to the second radio access network node.

During downlink scheduling, the second radio access network node obtains logical channel information according to the second media access control layer function, and schedules user data according to a logical channel priority.

UE generates and sends an uplink MAC CE to the second radio access network node. The manner is the same as a sending manner of an uplink MAC CE in the conventional LTE technology. For a BSR and a PHR, the second radio access network node may further send the BSR and the PHR to the first radio access network node, so that the first radio access network node can allocate a size of an initial PRB resource pool to the UE according to BSR information, and can negotiate a power control policy of the UE with the second radio access network node according to PHR information. For example, power allocation is performed when the UE sends uplink information to the first radio access network node and the second radio access network node simultaneously.

For another example, the target terminal sends uplink CSI information to the second radio access network node.

Optionally, the second radio access network node sends the CSI information to the first radio access network node by using the interface between the first radio access network node and the second radio access network node.

The first radio access network node allocates an initial PRB resource pool to the target terminal according to the CSI information, and/or determines to use the MAC layer of the second radio access network node to serve the target terminal.

For another example, the target terminal sends uplink SR information to the second radio access network node.

The second radio access network node allocates an uplink grant to the target terminal according to an SR.

In this embodiment, the first radio access network node may determine that the target radio access network node is the second radio access network node according to service data and a wireless condition of the target terminal, so that a MAC layer of the second radio access network node serves the target terminal. It may be learned that in this embodiment, a target radio access network node can be flexibly determined according to the service data and the wireless condition of the target terminal, so that flexible deployment can be implemented according to an existing service. In addition, a performance requirement and costs for an interface between the first radio access network node and the second radio access network node are reduced, for example, bandwidth and delay requirements on the interface are reduced; a quality of service (QoS) requirement of the service can be met; and system resource utilization efficiency is improved.

The following describes a case in which the target radio access network node is the first radio access network node and the second radio access network node. In this embodiment, according to different service conditions of the target terminal, there are two cases in which the target radio access network node is the first radio access network node and the second radio access network node. One case is that the first radio access network node and the second radio access network node serve the target terminal together, and the other case is that the first radio access network node and the second radio access network node separately serve different services of the target terminal.

First, how the first radio access network node and the second radio access network node serve the target terminal together and implement data transmission is described in detail with reference to an embodiment shown in FIG. 15 in the following.

1501. The first radio access network node determines that the target radio access network node serving the target terminal is the first radio access network node and the second radio access network node.

For example, if the target terminal is at a cell edge, and uses a frame structure of a 0.1 ms subframe, the first radio access network node may determine that the first radio access network node and the second radio access network node collaboratively serve the target terminal.

It should be noted that how the first radio access network node specifically determines that the target radio access network node is the first radio access network node and the second radio access network node is not limited in this embodiment. For example, the first radio access network node may determine the target radio access network node according to service data and a wireless condition of the target terminal; or the second radio access network node may determine the target radio access network node according to service data and a wireless condition of the target terminal, and the second radio access network node notifies the first radio access network node of the determined target radio access network node; or, the first radio access network node and the second radio access network node may negotiate to determine the target radio access network node according to service data and a wireless condition of the target terminal.

1502. The first radio access network node determines third allocation information and fourth allocation information.

How the first radio access network node specifically determines the third allocation information and the fourth allocation information is not limited in this embodiment, provided that the determined third allocation information is used to instruct the first radio access network node to configure a third media access control layer function used to serve the target terminal, and the determined fourth allocation information is used to instruct the second radio access network node to configure a fourth media access control layer function used to serve the target terminal.

For example, the first radio access network node determines the third allocation information and the fourth allocation information according to the service data and the wireless condition of the target terminal; and the first radio access network node sends the third allocation information and the fourth allocation information to the second radio access network node, so that the second radio access network node can determine a configuration condition of the third media access control layer function of the first radio access network node according to the third allocation information, and the second radio access network node can configure the fourth media access control layer function according to the fourth allocation information.

For another example, the first radio access network node receives the fourth allocation information sent by the second radio access network node, where the fourth allocation information is generated by the second radio access network node, that is, the second radio access network node determines the fourth allocation information according to the service data and the wireless condition of the target terminal;

the first radio access network node determines the third allocation information according to the fourth allocation information; and the first radio access network node sends the third allocation information to the second radio access network node, so that the second radio access network node can determine the configuration condition of the third media access control layer function of the first radio access network node according to the third allocation information.

The third allocation information and the fourth allocation information are not limited in this embodiment. Preferably, that the third allocation information is a MAC PDU of a MAC layer of the first radio access network node is used as an example, and that the fourth allocation information is a MAC PDU of a MAC layer and the like of the second radio access network node is used as an example for description.

1503. The first radio access network node configures a third media access control layer function for the target terminal according to the third allocation information.

The third allocation information is used to enable the first radio access network node to configure the third media access control layer function for the target terminal, and the fourth allocation information is used to enable the second radio access network node to configure the fourth media access control layer function for the target terminal. In addition, the third media access control layer function and the fourth media access control layer function are all functions that can serve the target terminal.

For example, if all the functions that serve the target terminal are scheduling, a priority, logical channel multiplexing/demultiplexing, radio resource allocation, HARQ control, random access, and power control, the third media access control layer function that is configured by the first radio access network node according to the third allocation information is a part of all the functions used to serve the target terminal, for example, scheduling, a priority, logical channel multiplexing/demultiplexing, and radio resource allocation; and the second radio access network node configures, according to the fourth allocation information, the other part of all the functions used to serve the target terminal. That is, the fourth media access control layer function that is configured by the second radio access network node according to the fourth allocation information is HARQ control, random access, and power control. Therefore, the first radio access network node and the second radio access network node collaboratively serve the target terminal.

1504. The first radio access network node performs data transmission according to the configured third media access control layer function.

The following describes how to perform data transmission in detail.

A case in which both the first radio access network node and the second radio access network node provide wireless coverage, or only the second radio access network node provides wireless coverage, and the target terminal is wirelessly connected to only the second radio access network node is used as an example for description in this embodiment.

In a downlink data transmission process:

The first radio access network node receives downlink control information sent by the second radio access network node.

The downlink control information includes HARQ information and/or downlink assignment information.

The media access control layer of the first radio access network node generates downlink data according to the third media access control layer function and the downlink control information.

That the downlink data generated by the first radio access network node is a MAC PDU, and the second radio access network node generates the downlink control information to perform scheduling is used as an example. The first radio access network node needs to first receive the downlink control information from the second radio access network node, and the first radio access network node generates the MAC PDU according to the downlink control information.

The media access control layer of the first radio access network node sends the downlink data to the second radio access network node.

The media access control layer of the second radio access network node processes the downlink data according to the fourth media access control layer function so as to generate processed downlink data.

The second radio access network node sends the processed downlink data to the target terminal.

The processed downlink data includes a MAC SDU and/or a downlink MAC CE.

The second radio access network node sends the downlink control information to the target terminal, so that the target terminal can receive the downlink data according to the downlink control information.

In an uplink data transmission process:

The media access control layer of the first radio access network node receives processed uplink data.

The processed uplink data is data generated after the media access control layer of the second radio access network node processes uplink data according to the fourth media access control layer function.

The uplink data includes a MAC SDU and/or an uplink MAC CE.

The media access control layer of the first radio access network node processes the processed uplink data according to the third media access control layer function.

It may be learned that the first radio access network node and the second radio access network node implement collaborative data processing in this step.

1505. If the first radio access network node determines that the target terminal meets a preset condition, go back to step 1501.

For details of this step, refer to step 405 shown in FIG. 4. The details are not described herein.

In this embodiment, the first radio access network node may determine that the target radio access network node is the first radio access network node and the second radio access network node according to service data and a wireless condition of the target terminal, so that MAC layers of the first radio access network node and the second radio access network node separately serve the target terminal. It may be learned that in this embodiment, a target radio access network node can be flexibly determined according to service data and the wireless condition of the target terminal, so that flexible deployment can be implemented according to an existing service. In addition, a performance requirement and costs for an interface between the first radio access network node and the second radio access network node are reduced, for example, bandwidth and delay requirements on the interface are reduced; a quality of service (QoS) requirement of the service can be met; and system resource utilization efficiency is improved.

How the first radio access network node and the second radio access network node serve different services of the target terminal and implement data transmission is described in detail with reference to an embodiment shown in FIG. 16 in the following.

1601. The first radio access network node determines that service data of the target terminal includes first service data and second service data.

An application scenario of this embodiment may be that two different data radio bearers (DRB) are configured for the target terminal, that is, the first service data and the second service data. The first service data uses a frame structure of a 0.1 ms subframe, and the second service data uses a frame structure of a 1 ms subframe.

The first radio access network node determines the first service data and the second service data.

1602. The first radio access network node determines that the target radio access network node serving the target terminal is the first radio access network node and the second radio access network node.

In this application scenario of this embodiment, two different data radio bearers are configured for the target terminal. Therefore, the first radio access network node may determine that the target radio access network node is the first radio access network node and the second radio access network node according to a configuration condition of the data radio bearers of the target terminal, so that a MAC layer of the first radio access network node is used to serve the first service data of the target terminal, and a MAC layer of the second radio access network node is used to serve the second service data of the target terminal. Therefore, this reduces impact caused by a delay on an interface between the first radio access network node and the second radio access network node to a short-subframe frame structure.

This embodiment uses an application scenario in which the first radio access network node and the second radio access network node simultaneously serve the target terminal as an example for description, and sets no limitation. In practical application, this embodiment may be applied to another different application scenario as required, provided that the first radio access network node and the second radio access network node can serve different service data of the target terminal simultaneously or in a time-division manner.

It should be noted that how the first radio access network node specifically determines that the target radio access network node is the first radio access network node and the second radio access network node is not limited in this embodiment. For example, the first radio access network node may determine the target radio access network node according to service data and a wireless condition of the target terminal; or the second radio access network node may determine the target radio access network node according to service data and a wireless condition of the target terminal, and the second radio access network node notifies the first radio access network node of the determined target radio access network node; or, the first radio access network node and the second radio access network node may negotiate to determine the target radio access network node according to service data and a wireless condition of the target terminal.

1603. The first radio access network node determines third allocation information and fourth allocation information.

How the first radio access network node specifically determines the third allocation information and the fourth allocation information is not limited in this embodiment, provided that the determined third allocation information is used to instruct the first radio access network node to configure a third media access control layer function used to serve the target terminal, and the determined fourth allocation information is used to instruct the second radio access network node to configure a fourth media access control layer function used to serve the target terminal. In addition, the third media access control layer function is all functions that are of the media access control layer of the first radio access network node and are used to serve the first service data of the target terminal, the fourth allocation information is further used to instruct the second radio access network node to configure the fourth media access control layer function used to serve the second service data of the target terminal, and the fourth media access control layer function is all functions that are of the media access control layer of the second radio access network node and are used to serve the second service data of the target terminal.

For example, the first radio access network node determines the third allocation information and the fourth allocation information according to the service data of the target terminal, and sends the determined third allocation information and fourth allocation information to the second radio access network node.

For another example, the second radio access network node determines the fourth allocation information according to the service data of the target terminal, and sends the fourth allocation information to the first radio access network node, and the first radio access network node determines the third allocation information according to the fourth allocation information.

Preferably, the third allocation information in this embodiment is a MAC PDU of the MAC layer of the first radio access network node, and the fourth allocation information is a MAC PDU of the MAC layer of the second radio access network node.

1604. The first radio access network node configures a third media access control layer function for the target terminal according to the third allocation information.

The third allocation information is used to enable the MAC layer of the first radio access network node to serve the first service data of the target terminal, and the fourth allocation information is used to enable the MAC layer of the second radio access network node to serve the second service data of the target terminal.

1605. If the first radio access network node determines that the target terminal meets a preset condition, go back to step 1601.

Figure 15:
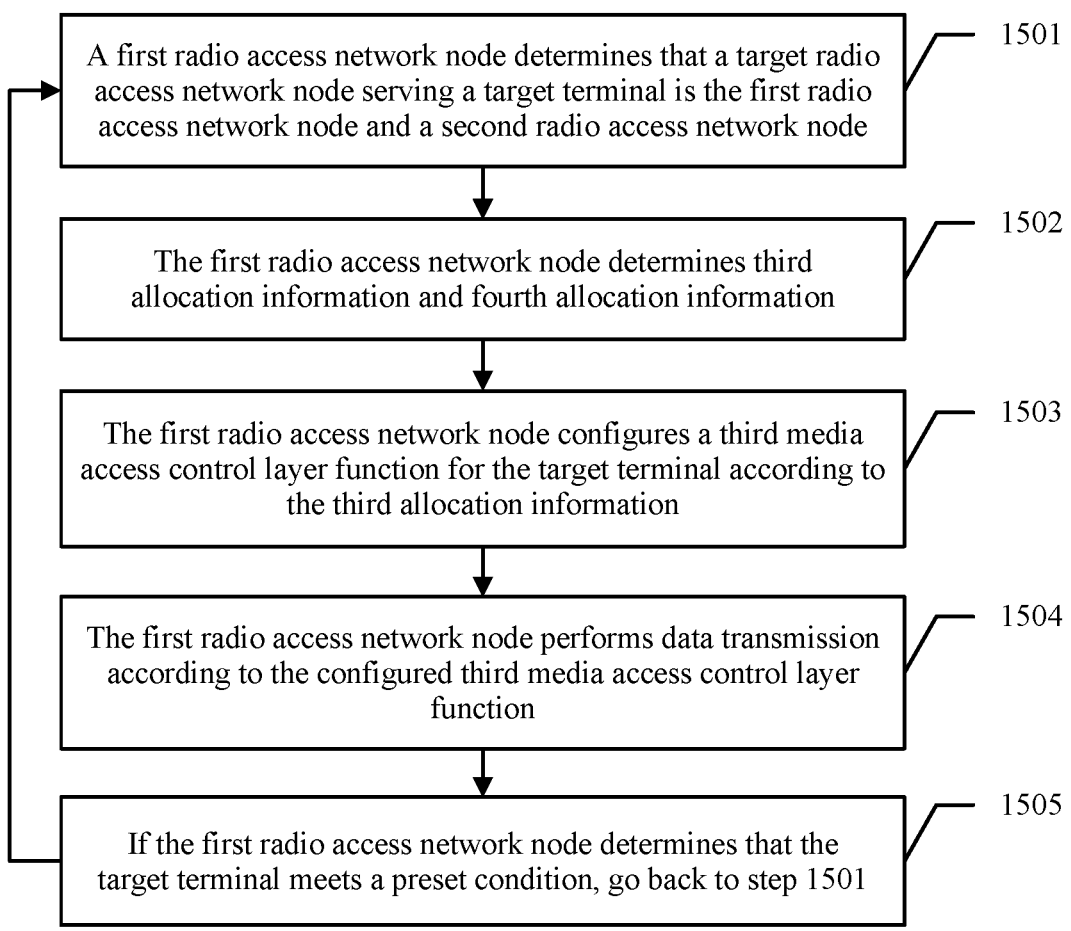
FIG. 15 is another step flowchart of a data transmission method according to an embodiment of the present disclosure.

For a specific process of this step, refer to step 1501 shown in FIG. 15. Details are not described herein.

Figure 16:
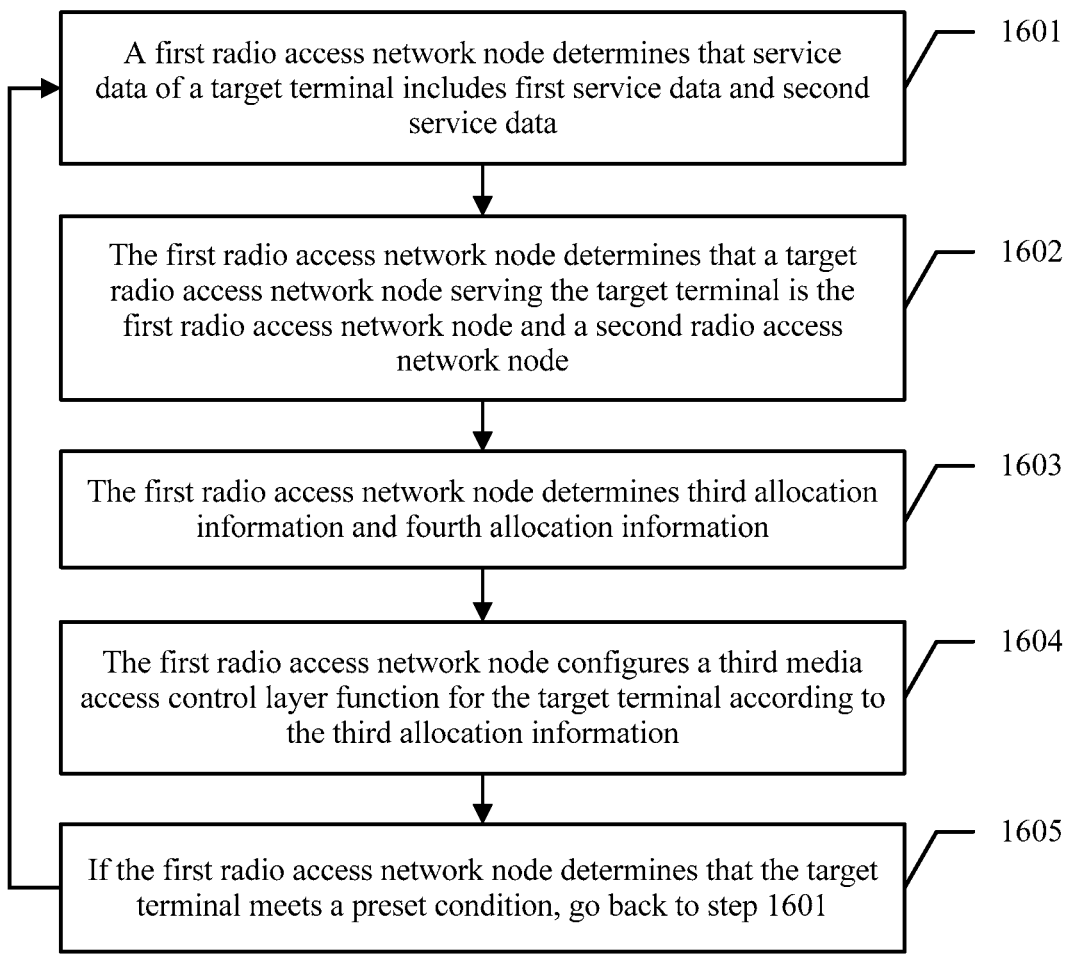
FIG. 16 is another step flowchart of a data transmission method according to an embodiment of the present disclosure.

That the first radio access network node and the second radio access network node collaboratively serve the target terminal shown in FIG. 15 and FIG. 16 is an example, and is not limited. For another example, for PRB resource allocation information in a downlink assignment and an uplink grant, the target terminal sends uplink CSI information to the second radio access network node. Optionally, the second radio access network node sends the CSI information to the first radio access network node by using the interface between the first radio access network node and the second radio access network node. The first radio access network node uses the uplink CSI information to enable the MAC layer of the first radio access network node to allocate an initial physical resource block (PRB) pool, and the first radio access network node sends initial allocation information of the PRB pool to the second radio access network node by using the third allocation information. The PRB pool may be used by the second radio access network node to schedule the target terminal in a period of time.

When the first radio access network node allocates the PRB pool, information such as load of multiple cells, the wireless condition of the target terminal, and a service requirement of the target terminal are considered.

According to the received third allocation information, the second radio access network node determines, in a subframe, to select some PRBs from the PRB pool and allocates the PRBs to the target terminal. The second radio access network node sends the foregoing resource allocation information to the target terminal over a PDCCH to perform subframe-level scheduling, so that the first radio access network node and the second radio access network node collaboratively serve the target terminal.

The foregoing describes the data transmission method from a perspective of the first radio access network node, and the following describes the data transmission method from a perspective of the second radio access network node.

For a structure of a system architecture that is shown in the embodiments of the present disclosure and that can implement a data transmission method provided in the embodiments of the present disclosure, refer to FIG. 3. For details, refer to the foregoing description, and the details are not described in this embodiment.

Figure 17:
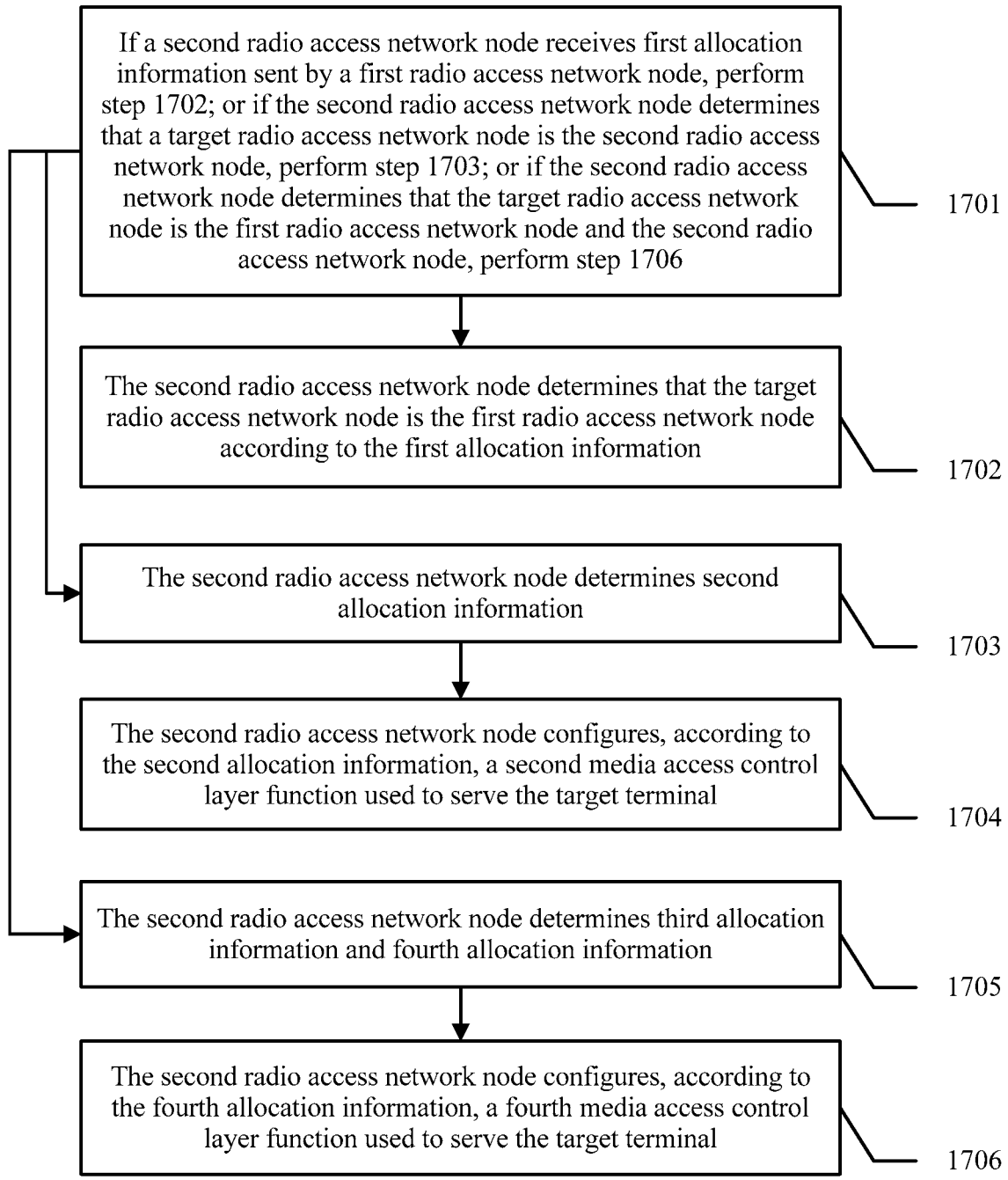
FIG. 17 is a step flowchart of a data transmission method according to an embodiment of the present disclosure.

Refer to FIG. 17 for the data transmission method. The data transmission method includes:

1701. If a second radio access network node receives first allocation information sent by a first radio access network node, perform step 1702; or if the second radio access network node determines that a target radio access network node is the second radio access network node, perform step 1703; or if the second radio access network node determines that the target radio access network node is the first radio access network node and the second radio access network node, perform step 1705.

1702. The second radio access network node determines that the target radio access network node is the first radio access network node according to the first allocation information.

The second radio access network node receives the first allocation information sent by the first radio access network node, and the second radio access network node may determine that the first radio access network node is the target radio access network node according to the first allocation information.

The first allocation information is used to instruct the first radio access network node to configure a first media access control layer function used to serve the target terminal.

In this embodiment, the first radio access network node determines a target radio access network node to which a media access control layer serving the target terminal belongs. The target radio access network node is the first radio access network node, the second radio access network node, or the first radio access network node and the second radio access network node. The first radio access network node can notify the second radio access network node of the determined target radio access network node.

A specific quantity of the target terminal is not limited in this embodiment, that is, there may be one or more target terminals. For different target terminals, target radio access network nodes to which media access control layers serving the target terminals belong may be the same or different. A same target radio access network node may be used for all terminals within coverage of the second radio access network node. When the first radio access network node also has wireless coverage, a same target radio access network node is used for all terminals within coverage of the first radio access network node.

If the first radio access network node determines that the target radio access network node is the first radio access network node, the first radio access network node sends the generated first allocation information to the second radio access network node.

For a process in which the first radio access network node specifically determines the target radio access network node, refer to the foregoing embodiment. Details are not described in this embodiment.

If the first radio access network node determines that the target radio access network node is the first radio access network node, the first radio access network node sends the first allocation information to the second radio access network node. The first allocation information is used to instruct the first radio access network node to configure a first media access control layer function used to serve the target terminal; or if the first radio access network node determines that the target radio access network node is the second radio access network node, the first radio access network node instructs the second radio access network node to determine second allocation information.

Specifically, that is, the first radio access network node triggers the second radio access network node to perform step 1703 to step 1704.

1703. The second radio access network node determines second allocation information.

1704. The second radio access network node configures, according to the second allocation information, a second media access control layer function used to serve the target terminal; or if the first radio access network node determines that the target radio access network node is the first radio access network node and the second radio access network node, the first radio access network node triggers the second radio access network node to perform step 1705 to step 1706.

1705. The second radio access network node determines third allocation information and fourth allocation information.

1706. The second radio access network node configures, according to the fourth allocation information, a fourth media access control layer function used to serve the target terminal.

The third allocation information is used to instruct the first radio access network node to configure the third media access control layer function used to serve the target terminal, and the third media access control layer function and the fourth media access control layer function collaboratively serve the target terminal.

In this embodiment, the first media access control layer function, the second media access control layer function, the third media access control layer function, and the fourth media access control layer function include at least one or more of the following:

scheduling, priority, logical channel multiplexing/demultiplexing, radio resource allocation, HARQ control, random access, power control, or the like.

It should be noted that a media access control MAC layer of the first radio access network node or the second radio access network node in this embodiment is mainly to perform MAC control for a corresponding target terminal, for example, a HARQ entity and a target-terminal-specific resource part. The first radio access network node and the second radio access network node further need to manage another terminal. Therefore, from a perspective of a cell, both of the first radio access network node and the second radio access network node include the MAC layer, at least a common part of the MAC layer, such as a common part of random access process control or a common part of scheduling/priority processing because these functions relate to control for multiple terminals.

According to the data transmission method shown in this embodiment, system performance is effectively improved; a performance requirement and costs for an interface between a first radio access network node and a second radio access network node are reduced, for example, bandwidth and delay requirements on the interface are reduced; a quality of service (QoS) requirement of a service can be met; and system resource utilization efficiency is improved.

Figure 18:
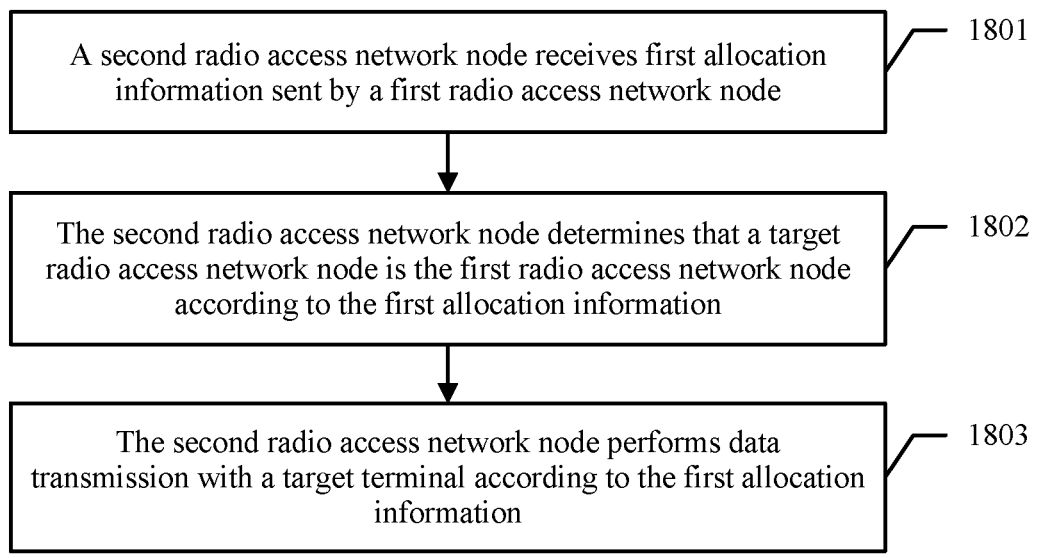
FIG. 18 is another step flowchart of a data transmission method according to an embodiment of the present disclosure.

If the first radio access network node determines that the target radio access network node is the first radio access network node, how the second radio access network node implements data transmission is described in detail with reference to an embodiment shown in FIG. 18 in the following.

That is, in this embodiment, when the first radio access network node determines that the target radio access network node is the first radio access network node, the first radio access network node generates the first allocation information.

For details about how the first radio access network node specifically determines that the target radio access network node is the first radio access network node, refer to the foregoing embodiment. The details are not described in this embodiment.

A specific manner in which the first radio access network node and the second radio access network node provide wireless coverage for the target terminal is not limited in this embodiment. For example, both the first radio access network node and the second radio access network node provide wireless coverage, or the first radio access network node does not provide wireless coverage, but the second radio access network node provides wireless coverage.

That the first radio access network node does not provide wireless coverage, but the second radio access network node provides wireless coverage is used as an example for description in this embodiment.

In this embodiment, the media access control layer serving the target terminal belongs to the first radio access network node. That is, a case in which a wireless connection of the first radio access network node provides an RRC control plane function, and the target terminal uses a user plane function provided by a wireless connection of the second radio access network node is used as an example for description.

Control plane protocol stack configuration configured by the first radio access network node is shown in FIG. 6, and user plane protocol stack configuration configured by the first radio access network node is shown in FIG. 7.

For details, refer to the foregoing embodiment. The details are not described in this embodiment.

The first radio access network node can configure the first media access control layer function according to the first allocation information, where the first media access control layer function is all functions that are of the media access control layer of the first radio access network node and are used to serve the target terminal.

The first media access control layer function includes at least one or more of the following:

scheduling, priority, logical channel multiplexing/demultiplexing, radio resource allocation, HARQ control, random access, power control, or the like.

The first radio access network node sends the generated first allocation information to the second radio access network node, so as to trigger the second radio access network node to perform step 1801 to step 1803.

1801. The second radio access network node receives the first allocation information sent by the first radio access network node.

The second radio access network node receives the first allocation information generated by the first radio access network node, where the first allocation information is used to enable the second radio access network node to determine that the first radio access network node is the target radio access network node.

The second radio access network node sends the first allocation information to the target terminal by using a radio interface between the second radio access network node and the target terminal, so that the target terminal determines, according to the first allocation information, that the target radio access network node serving the target terminal is the first radio access network node.

Preferably, in this embodiment, the second radio access network node may send a radio resource control connection reconfiguration (RRC Connection Reconfiguration) message to the target terminal. The radio resource control connection reconfiguration message is used to enable the target terminal to determine that a media access control layer of the target terminal is corresponding to the media access control layer of the first radio access network node, so that the target terminal determines that the first radio access network node is the target radio access network node.

1802. The second radio access network node determines that the target radio access network node is the first radio access network node according to the first allocation information.

Specifically, the second radio access network node determines, according to the first allocation information, that the first media access control layer function is all functions that are of the media access control layer of the first radio access network node and are used to serve the target terminal.

1803. The second radio access network node performs data transmission with the target terminal according to the first allocation information.

Figure 5:
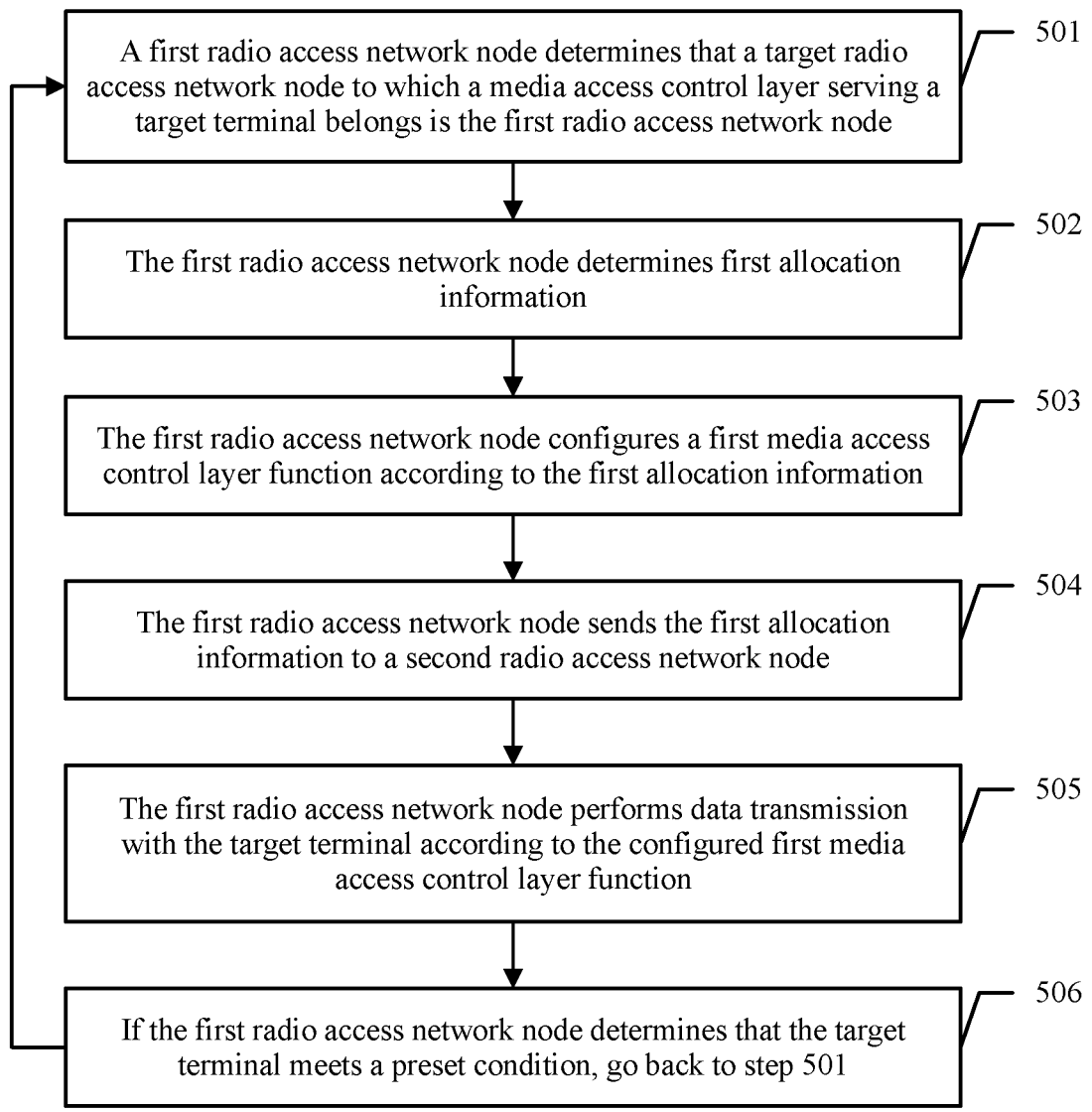
FIG. 5 is another step flowchart of a data transmission method according to an embodiment of the present disclosure.

For a specific data transmission process, refer to step 505 shown in FIG. 5. Details are not described herein.

In the specific data transmission process, and in a downlink data transmission process:

The second radio access network node receives downlink data and downlink control information that are sent by the first radio access network node. The downlink data and the downlink control information are generated by the first radio access network node according to the first media access control layer function. The downlink data includes a downlink media access control service data unit MAC SDU and/or a downlink MAC CE. The downlink control information includes HARQ information and downlink assignment information.

The second radio access network node sends the downlink data and the downlink control information to the target terminal.

In an uplink data transmission process:

The second radio access network node receives uplink control information sent by the first radio access network node, where the uplink control information is generated by the first radio access network node according to the first media access control layer function.

The second radio access network node sends the uplink control information to the target terminal, where the uplink control information includes uplink hybrid automatic repeat request HARQ information and uplink grant information.

The second radio access network node receives the uplink data sent by the target terminal, the uplink data is generated by the target terminal according to the uplink control information, and the uplink data includes a MAC SDU and/or an uplink MAC CE.

The second radio access network node sends the uplink data to the first radio access network node, so that the media access control layer of the first radio access network node receives the uplink data, and the media access control layer of the first radio access network node processes the uplink data according to the first media access control layer function.

The second radio access network node receives channel state information CSI and/or a scheduling request SR of the target terminal that are/is sent by the target terminal.

The second radio access network node sends the CSI and/or the SR to the first radio access network node, so that the first radio access network node receives the CSI and/or the SR.

For details about how data transmission is specifically performed if the target radio access network node is the first radio access network node and for a specific application scenario of data transmission, refer to the foregoing embodiment. The details are not described in this embodiment.

Figure 19:
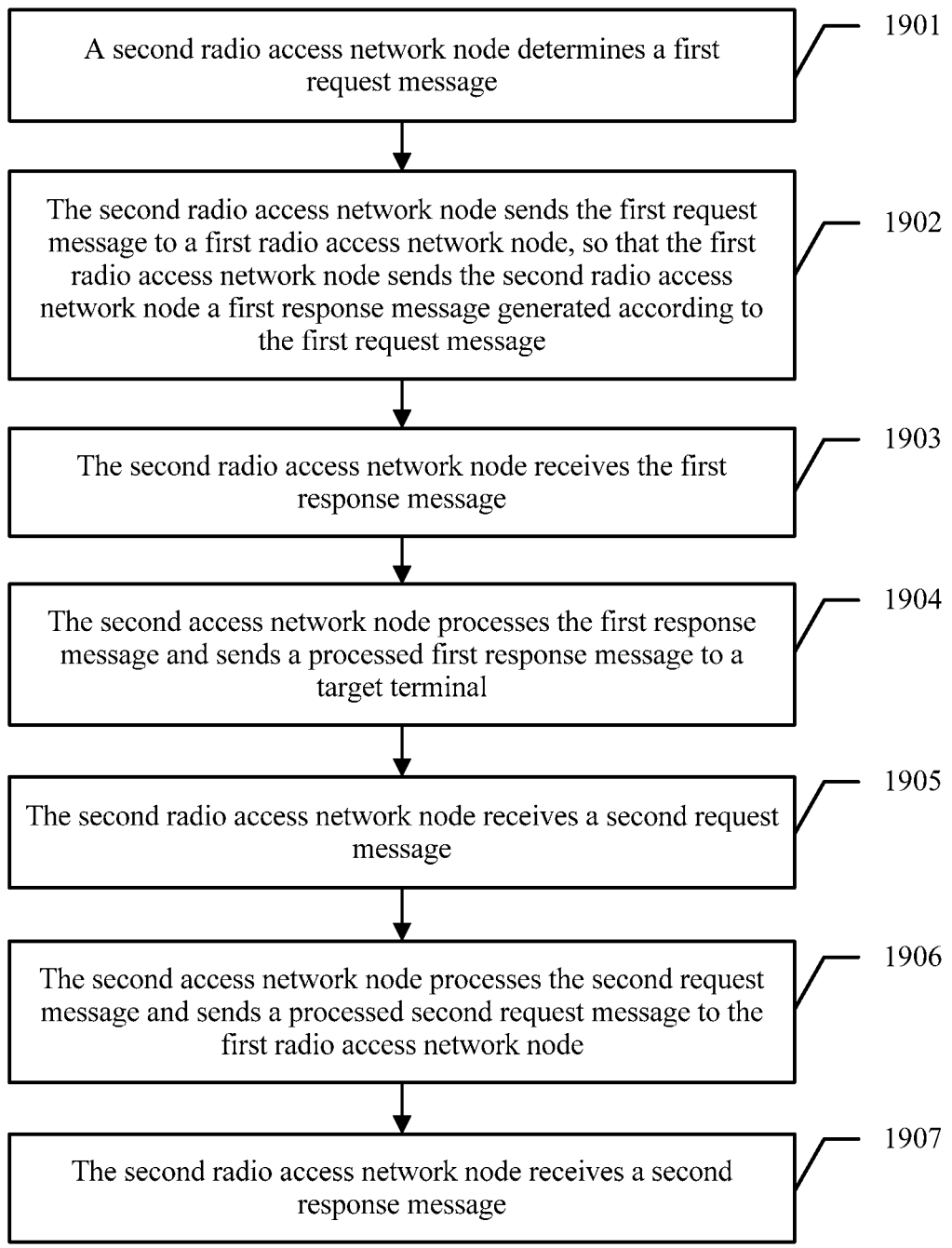
FIG. 19 is another step flowchart of a data transmission method according to an embodiment of the present disclosure.

More specifically, with reference to FIG. 19, the following describes in detail how the target terminal accesses the second radio access network node based on a contention-based random access process.

1901. The second radio access network node determines a first request message.

The first request message is used to request to enable the target terminal to access the second radio access network node.

For specific content included in the first request message, refer to content included in the first request message shown in FIG. 8, and details are not described in this embodiment.

1902. The second radio access network node sends the first request message to the first radio access network node, so that the first radio access network node sends the second radio access network node a first response message generated according to the first request message.

The first response message includes a random access response (RAR, random access response) message and an RA-RNTI.

1903. The second radio access network node receives the first response message.

1904. The second radio access network node processes the first response message and sends a processed first response message to the target terminal.

The processed first response message is used to enable the target terminal to generate a second request message used to trigger the first radio access network node to perform contention resolution, and the target terminal sends the second request message to the second radio access network node.

The second radio access network node sends the processed first response message to the target terminal.

For specific content included in the processed first response message, refer to content included in the first request message shown in FIG. 8, and details are not described in this embodiment.

1905. The second radio access network node receives a second request message.

1906. The second radio access network node processes the second request message and sends a processed second request message to the first radio access network node.

The first radio access network node receives the processed second request message, so that the first radio access network node generates a contention resolution message according to the processed second request message, and the first radio access network node sends a generated second response message to the second radio access network node. The second response message is used to indicate the contention resolution message.

For specific content included in the second request message, refer to content included in the first request message shown in FIG. 8, and details are not described in this embodiment.

1907. The second radio access network node receives a second response message.

The second radio access network node processes the second response message and sends a processed second response message to the target terminal, so that the target terminal accesses the second radio access network node or obtains uplink synchronization with the second radio access network node according to the processed second response message.

Specifically, after processing, at a physical layer, the second response message received from the first radio access network node, the second radio access network node sends the processed second response message to the target terminal.

More specifically, the second radio access network node indicates the message to the target terminal by using a downlink assignment (DL assignment) or an uplink grant (UL grant) on a physical downlink control channel (PDCCH) scrambled by using a C-RNTI or a TC-RNTI.

The first radio access network node sends the second response message to the second radio access network node by using an interface message between the second radio access network node and the first radio access network node. A format of the second response message may be different from a format of the processed second response message sent by the second radio access network node to the target terminal. For example, the second response message sent by the first radio access network node to the second radio access network node is a MAC PDU that is packetized by using an interface message and that includes the second response message.

The target terminal accesses the second radio access network node or obtains uplink synchronization with the second radio access network node according to the processed second response message.

It should be noted that if the first radio access network node directly performs data transmission with the target terminal, the first radio access network node needs to enable the target terminal to directly access the first radio access network node, and enable the target terminal to obtain uplink synchronization with the first radio access network node. For an implementation process, refer to FIG. 19, and details are not described. A difference lies in that the uplink timing advance TA is TA between the target terminal and the first radio access network node.

Figure 20:
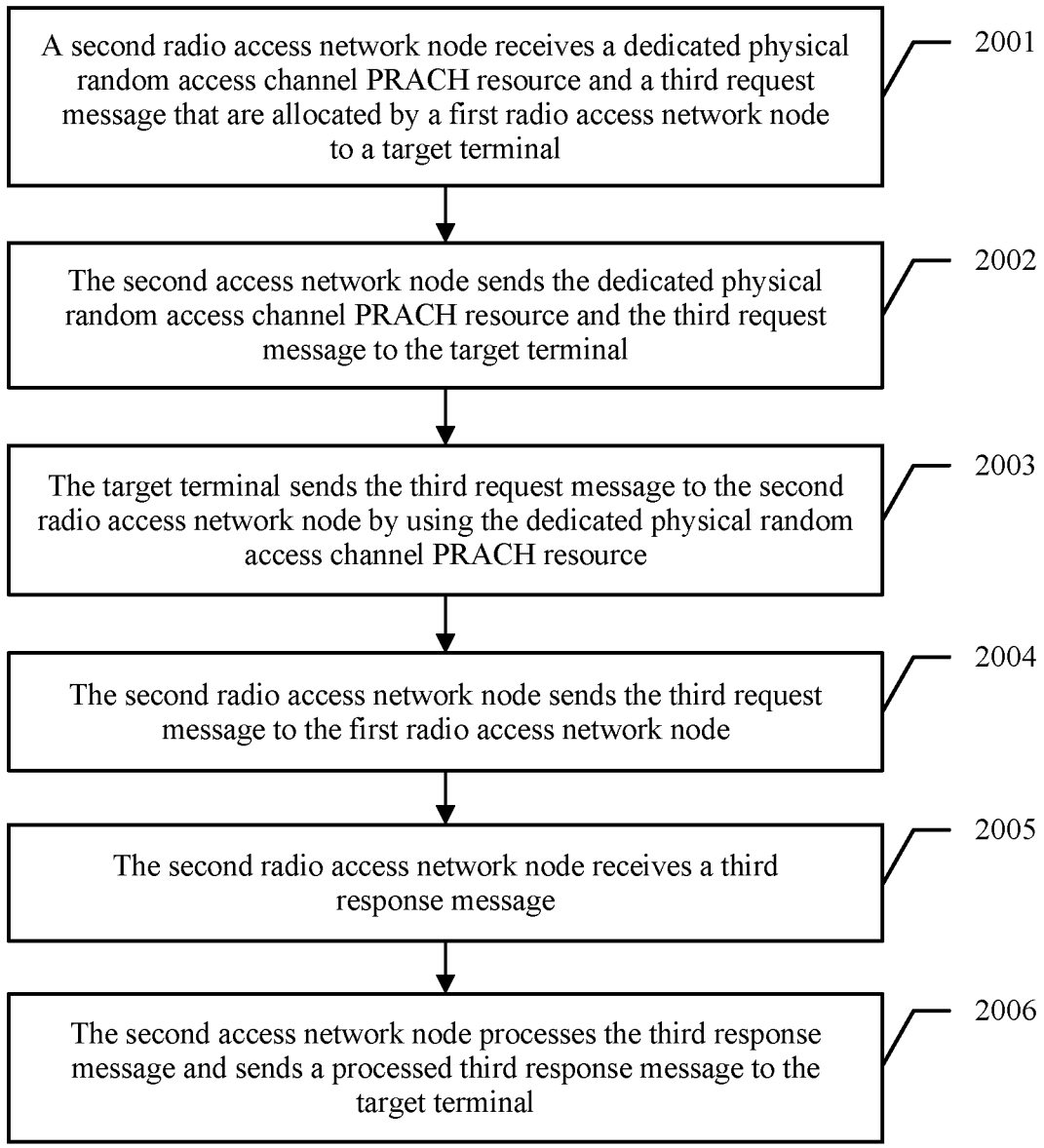
FIG. 20 is another step flowchart of a data transmission method according to an embodiment of the present disclosure.

With reference to FIG. 20, the following describes in detail how the target terminal accesses the second radio access network node based on a non-contention-based random access process.

2001. The second radio access network node receives a dedicated physical random access channel PRACH resource and a third request message that are allocated by the first radio access network node to the target terminal.

The third request message is a random access preamble selected by the target terminal, so that the target terminal can send the third request message according to the dedicated physical random access channel PRACH resource allocated by the first radio access network node.

For specific content included in the third request message, refer to content included in the first request message shown in FIG. 19, and details are not described in this embodiment.

2002. The second radio access network node sends the dedicated physical random access channel PRACH resource and the third request message to the target terminal.

The second radio access network node indicates the PRACH resource and the third request message to the target terminal over a PDCCH.

2003. The target terminal sends the third request message to the second radio access network node by using the dedicated physical random access channel PRACH resource.

2004. The second radio access network node sends the third request message to the first radio access network node.

The first radio access network node receives the first request message, and the first radio access network node sends the second radio access network node a third response message generated according to the third request message.

For a specific process in which the first radio access network node generates the third response message according to the third request message, refer to FIG. 8 for a specific process in which the first radio access network node generates the first response message according to the first request message. Details are not described in this embodiment.

2005. The second radio access network node receives a third response message.

2006. The second radio access network node processes the third response message and sends a processed third response message to the target terminal.

The target terminal accesses the second radio access network node or obtains uplink synchronization with the second radio access network node according to the processed third response message.

In this embodiment, according to service data and a wireless condition of the target terminal, the first radio access network node may determine that a target radio access network node to which a media access control layer serving the target terminal belongs is the first radio access network node, so that a MAC layer of the first radio access network node serves the target terminal. That is, the first radio access network node generates first allocation information, and configures a first media access control layer function according to the first allocation information. In addition, the first media access control layer function is all functions that are of the media access control layer of the first radio access network node and are used to serve the target terminal. It may be learned that in this embodiment, a target radio access network node can be flexibly determined according to the service data and the wireless condition of the target terminal, so that flexible deployment can be implemented according to an existing service. In addition, a performance requirement and costs for an interface between the first radio access network node and the second radio access network node are reduced, for example, bandwidth and delay requirements on the interface are reduced; a quality of service (QoS) requirement of the service can be met; and system resource utilization efficiency is improved.

Figure 21:
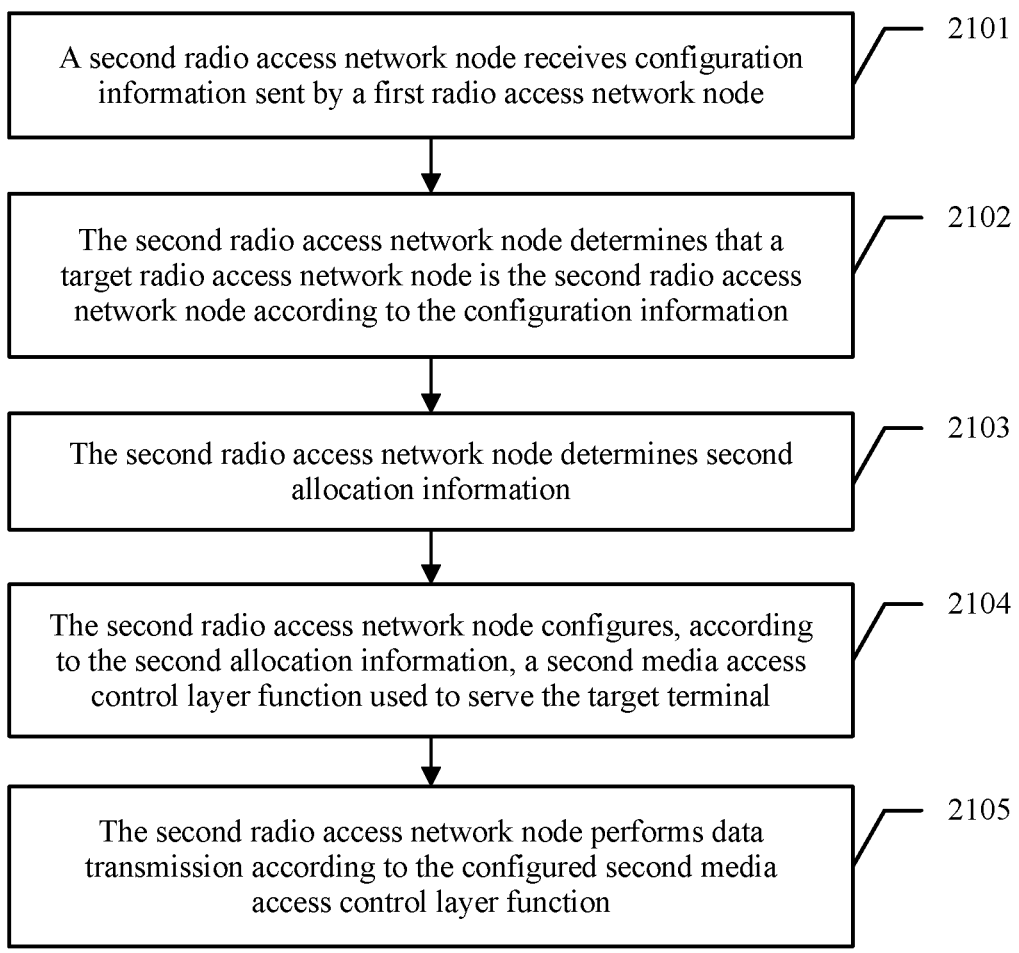
FIG. 21 is another step flowchart of a data transmission method according to an embodiment of the present disclosure.

How to implement data transmission if the first radio access network node determines that the target radio access network node is the second radio access network node is described in detail with reference to an embodiment shown in FIG. 21 in the following.

In this embodiment, a case in which the first radio access network node determines that a target radio access network node to which a media access control layer serving the target terminal belongs is the second radio access network node is described in detail.

For details about how the first radio access network node specifically determines that the target radio access network node to which the media access control layer serving the target terminal belongs is the second radio access network node, refer to the foregoing embodiment. The details are not described in this embodiment.

This embodiment may be specifically applied to a case in which both the first radio access network node and the second radio access network node provide wireless coverage, or only the second radio access network node provides wireless coverage, and the target terminal is wirelessly connected to only the second radio access network node.

In this embodiment, the first radio access network node indicates the second radio access network node that the target radio access network node is the second radio access network node by using generated configuration information.

2101. The second radio access network node receives configuration information sent by the first radio access network node.

The configuration information is used to indicate that the target radio access network node is the second radio access network node, and therefore, the configuration information can trigger the second radio access network node to determine second allocation information.

2102. The second radio access network node determines that the target radio access network node is the second radio access network node according to the configuration information.

2103. The second radio access network node determines second allocation information.

The second allocation information is used to instruct the second radio access network node to configure a second media access control layer function used to serve the target terminal.

2104. The second radio access network node configures, according to the second allocation information, a second media access control layer function used to serve the target terminal.

The second radio access network node configures the second media access control layer function for the target terminal according to the second allocation information, where the second media access control layer function is all functions that are of a media access control layer of the second radio access network node and are used to serve the target terminal.

User plane protocol stack configuration configured by the second radio access network node according to the second allocation information is shown in FIG. 11, and control plane protocol stack configuration configured by the second radio access network node according to the second allocation information is shown in FIG. 12. For details, refer to the foregoing embodiment. The details are not described in this embodiment.

2105. The second radio access network node performs data transmission according to the configured second media access control layer function.

Specifically, the first radio access network node sends generated downlink data to the second radio access network node.

The second radio access network node receives the downlink data sent by the first radio access network node.

The media access control layer of the second radio access network node processes the downlink data according to the second media access control layer function so as to generate processed downlink data.

The second radio access network node sends the processed downlink data to the target terminal, where the processed downlink data includes a MAC SDU and/or a downlink MAC CE.

The second radio access network node receives uplink data sent by the target terminal, where the uplink data includes a MAC SDU and/or an uplink MAC CE.

The media access control layer of the second radio access network node processes the uplink data according to the second media access control layer function so as to generate processed uplink data.

The second radio access network node sends the processed uplink data to the first radio access network node.

For details about how data transmission is performed if the target radio access network node is the second radio access network node, refer to the foregoing embodiment. The details are not described in this embodiment.

Specifically, there are two manners of accessing the second radio access network node by the target terminal. One manner is that the target terminal accesses the second radio access network node based on a contention-based random access process, and the other manner is that the target terminal accesses the second radio access network node based on a non-contention-based random access process.

Figure 22:
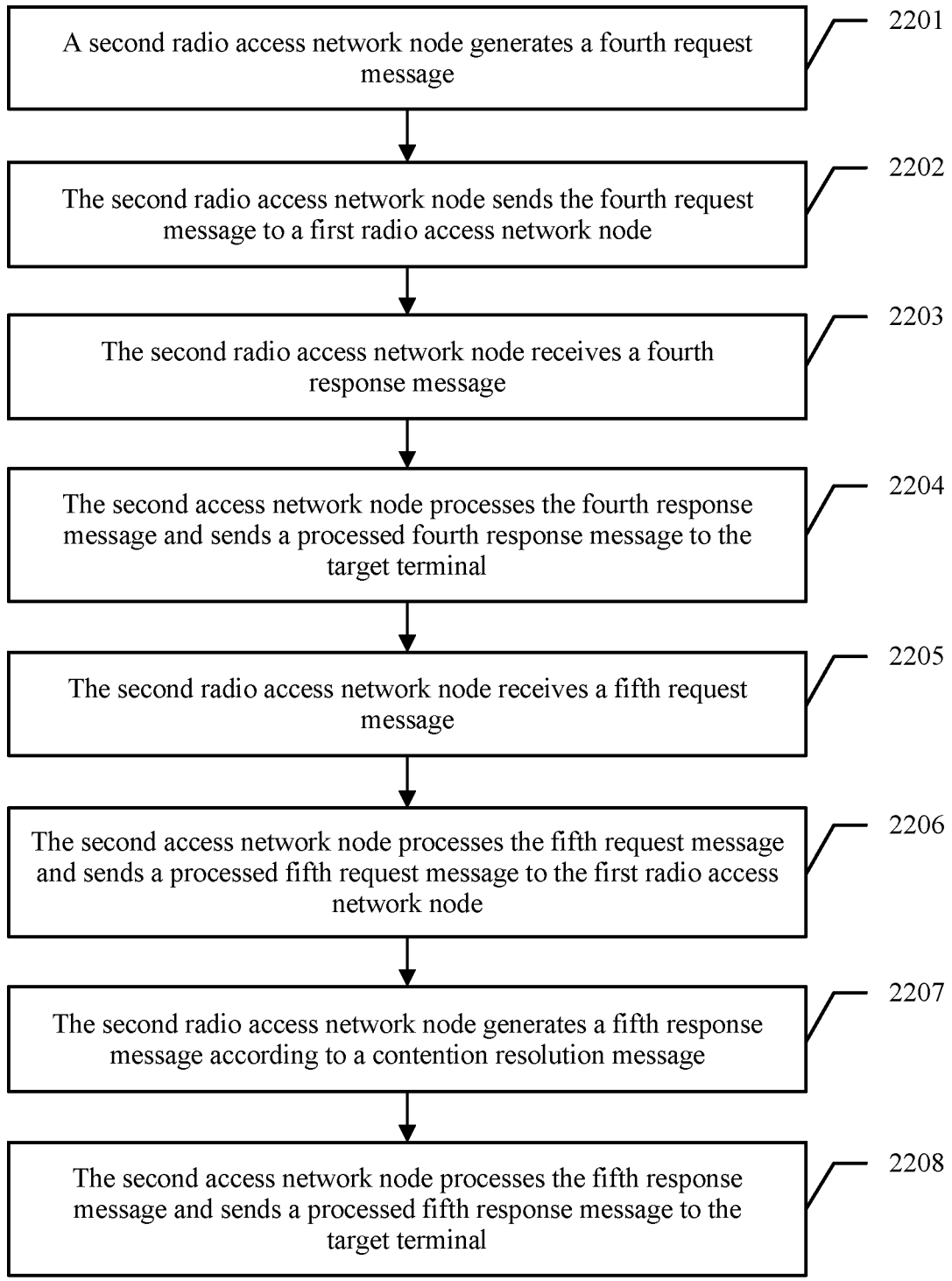
FIG. 22 is a step flowchart of enabling a target terminal to access a second radio access network node according to an embodiment of the present disclosure.

More specifically, with reference to FIG. 22, the following describes in detail how the target terminal accesses the second radio access network node based on the contention-based random access process.

2201. The second radio access network node generates a fourth request message.

The fourth request message is used to request to enable the target terminal to access the second radio access network node.

For detailed description of the fourth request message, refer to the embodiment shown in FIG. 14. Details are not described in this embodiment.

2202. The second radio access network node sends the fourth request message to the first radio access network node.

The first radio access network node sends the second radio access network node a fourth response message generated according to the fourth request message.

For detailed description of the fourth response message, refer to the embodiment shown in FIG. 14. Details are not described in this embodiment.

2203. The second radio access network node receives a fourth response message.

2204. The second radio access network node processes the fourth response message and sends a processed fourth response message to the target terminal.

The processed fourth response message is used to enable the target terminal to generate a fifth request message used to trigger the first radio access network node to perform contention resolution, and the target terminal sends the fifth request message to the second radio access network node.

A specific manner of processing the fourth response message by the second radio access network node may be as follows: The second radio access network node calculates an RA-RNTI to generate an RAR message, and adds information, such as a random access preamble index RAPID, uplink timing advance TA, and an uplink grant (UL grant), to the RAR message.

2205. The second radio access network node receives a fifth request message.

2206. The second radio access network node processes the fifth request message and sends a processed fifth request message to the first radio access network node.

The first radio access network node receives the processed fifth request message, so that the first radio access network node generates a contention resolution message according to the processed fifth request message, and the first radio access network node sends the contention resolution message to the second radio access network node.

For detailed description of the processed fifth request message, refer to the foregoing embodiment. Details are not described in this embodiment.

2207. The second radio access network node generates a fifth response message according to a contention resolution message.

For detailed description of the contention resolution message, refer to the foregoing embodiment. Details are not described in this embodiment.

2208. The second radio access network node processes the fifth response message and sends a processed fifth response message to the target terminal.

For details about how the second radio access network node specifically processes the fifth response message to generate the processed fifth response message, refer to the foregoing embodiment. Details are not described in this embodiment.

The target terminal determines to access the second radio access network node or obtain uplink synchronization with the second radio access network node according to the processed fifth response message.

In this embodiment, the target terminal may access the second radio access network node in a non-contention-based random access manner. For a specific implementation process, refer to a non-contention-based random access process in a conventional LTE technology. Details are not described herein.

The following describes a case in which the target radio access network node is the first radio access network node and the second radio access network node. In this embodiment, according to different service conditions of the target terminal, there are two cases in which the target radio access network node is the first radio access network node and the second radio access network node. One case is that the first radio access network node and the second radio access network node collaboratively serve the target terminal, and the other case is that the first radio access network node and the second radio access network node serve different services of the target terminal.

First, how the first radio access network node and the second radio access network node separately serve the target terminal and implement data transmission is described in detail with reference to an embodiment shown in FIG. 23 in the following.

The first radio access network node determines that the target radio access network node serving the target terminal is the first radio access network node and the second radio access network node.

In this embodiment, details about how the first radio access network node specifically determines that the target radio access network node is the first radio access network node and the second radio access network node are not described. For the details, refer to the foregoing embodiment.

After the first radio access network node determines that the target radio access network node is the first radio access network node and the second radio access network node, the first radio access network node determines third allocation information and fourth allocation information.

2301. The second radio access network node determines that the target radio access network node is the first radio access network node and the second radio access network node.

In this embodiment, there may be two manners in which the second radio access network node specifically determines that the target radio access network node is the first radio access network node and the second radio access network node.

Manner 1: The second radio access network node receives the third allocation information and the fourth allocation information that are sent by the first radio access network node.

The third allocation information and the fourth allocation information are allocation information determined by the first radio access network node according to service data of the target terminal.

The second radio access network node can determine that the target radio access network node is the first radio access network node and the second radio access network node according to the received third allocation information and fourth allocation information.

Manner 2:

The second radio access network node generates the fourth allocation information according to service data of the target terminal;

the second radio access network node sends the fourth allocation information to the first radio access network node, so that the first radio access network node determines the third allocation information according to the fourth allocation information, and the first radio access network node sends the fourth allocation information to the second radio access network node; and the second radio access network node determines that the target radio access network node is the first radio access network node and the second radio access network node according to the third allocation information and the fourth allocation information.

2302. The second radio access network node determines third allocation information and fourth allocation information.

The second radio access network node can determine a configuration condition of a third media access control layer function of the first radio access network node according to the third allocation information.

The third allocation information and the fourth allocation information are not limited in this embodiment. Preferably, that the third allocation information is a MAC PDU of a MAC layer of the first radio access network node is used as an example, and that the fourth allocation information is a MAC PDU of a MAC layer and the like of the second radio access network node is used as an example for description.

2303. The second radio access network node configures, according to the fourth allocation information, a fourth media access control layer function used to serve the target terminal.

The third allocation information is used to enable the first radio access network node to configure the third media access control layer function for the target terminal, and the fourth allocation information is used to enable the second radio access network node to configure the fourth media access control layer function for the target terminal. In addition, the third media access control layer function and the fourth media access control layer function are all functions that can serve the target terminal.

For detailed description of the third media access control layer function and the fourth media access control layer function, refer to the foregoing embodiment. Details are not described in this embodiment.

2304. The second radio access network node performs data transmission according to the configured fourth media access control layer function.

A specific data transmission process may be as follows:

In a downlink data transmission process:

The second radio access network node sends downlink control information to the first radio access network node, where the downlink control information includes HARQ information and/or downlink assignment information, so that the media access control layer of the first radio access network node generates downlink data according to the third media access control layer function and the downlink control information, and the media access control layer of the first radio access network node sends the downlink data to the second radio access network node.

The media access control layer of the second radio access network node processes the downlink data according to the fourth media access control layer function so as to generate processed downlink data.

The second radio access network node sends the processed downlink data to the target terminal, where the processed downlink data includes a MAC SDU and/or a downlink MAC CE.

In an uplink data transmission process:

The second radio access network node receives uplink data sent by the target terminal, where the uplink data includes a MAC SDU and/or an uplink MAC CE.

The media access control layer of the second radio access network node processes the uplink data according to the fourth media access control layer function so as to generate processed uplink data.

The second radio access network node sends the processed uplink data to the first radio access network node, so that the media access control layer of the first radio access network node receives the processed uplink data, and the media access control layer of the first radio access network node processes the processed uplink data according to the third media access control layer function.

For a specific data transmission process, refer to the foregoing embodiment. Details are not described in this embodiment.

In this embodiment, the first radio access network node may determine that the target radio access network node is the first radio access network node and the second radio access network node according to service data and a wireless condition of the target terminal, so that MAC layers of the first radio access network node and the second radio access network node separately serve the target terminal. It may be learned that in this embodiment, a target radio access network node can be flexibly determined according to the service data and the wireless condition of the target terminal, so that flexible deployment can be implemented according to an existing service. In addition, a performance requirement and costs for an interface between the first radio access network node and the second radio access network node are reduced, for example, bandwidth and delay requirements on the interface are reduced; a quality of service (QoS) requirement of the service can be met; and system resource utilization efficiency is improved.

How the first radio access network node and the second radio access network node together serve different services of the target terminal and implement data transmission is described in detail with reference to an embodiment shown in FIG. 24 in the following.

2401. The second radio access network node determines that the target radio access network node is the first radio access network node and the second radio access network node.

2402. The second radio access network node determines third allocation information and fourth allocation information.

Figure 23:
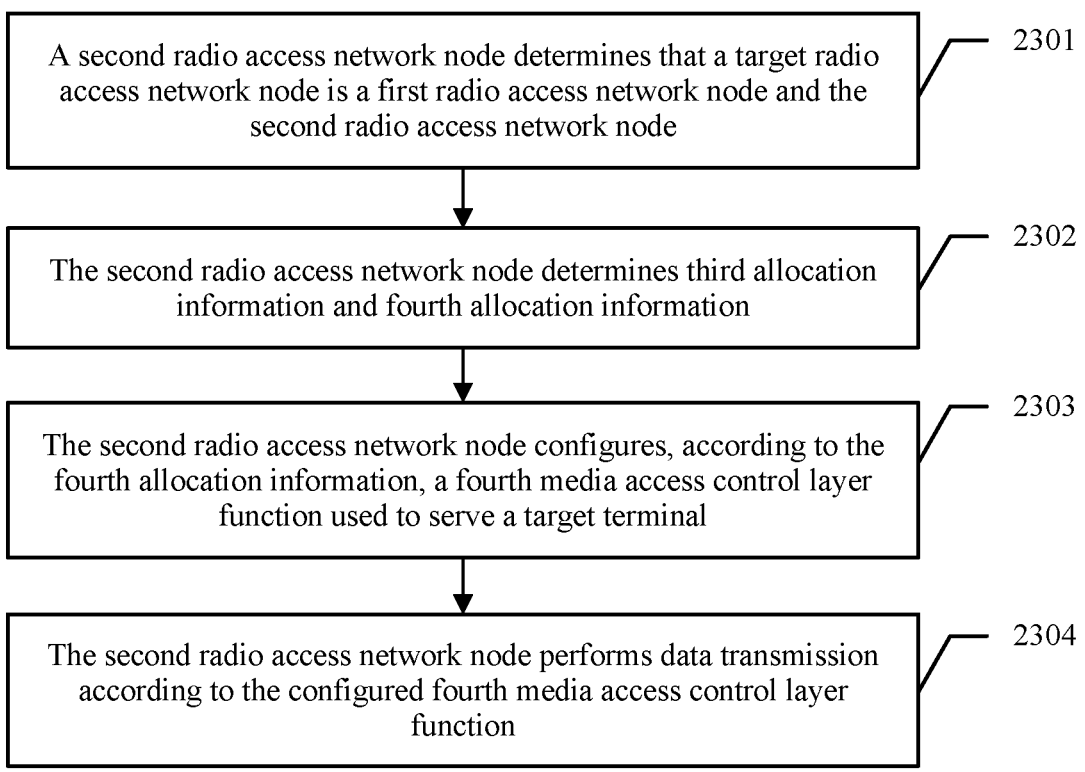
FIG. 23 is another step flowchart of a data transmission method according to an embodiment of the present disclosure.

For specific processes of step 2401 and step 2402 in this embodiment, refer to step 2301 and step 2302 shown in FIG. 23. Details are not described in this step.

2403. The second radio access network node determines, according to the third allocation information, that the first radio access network node configures a third media access control layer function.

The third media access control layer function is all functions that are of a media access control layer of the first radio access network node and are used to serve first service data of the target terminal.

Service data of the target terminal includes the first service data and second service data.

2404. The second radio access network node configures, according to the fourth allocation information, a fourth media access control layer function used to serve the second service data of the target terminal.

The fourth media access control layer function is all functions that are of a media access control layer of the second radio access network node and are used to serve the second service data of the target terminal.

In this application scenario of this embodiment, two different data radio bearers are configured for the target terminal. Therefore, the first radio access network node may determine that the target radio access network node is the first radio access network node and the second radio access network node according to a configuration condition of the data radio bearers of the target terminal, so that the MAC layer of the first radio access network node is used to serve the first service data of the target terminal, and the MAC layer of the second radio access network node is used to serve the second service data of the target terminal. Therefore, this reduces impact caused by a delay on an interface between the first radio access network node and the second radio access network node to a short-subframe frame structure.

This embodiment uses an application scenario in which the first radio access network node and the second radio access network node simultaneously serve the target terminal as an example for description, and sets no limitation. In practical application, this embodiment may be applied to another different application scenario as required, provided that the first radio access network node and the second radio access network node can serve different service data of the target terminal simultaneously or in a time-division manner.

2405. The second radio access network node performs data transmission according to the configured fourth media access control layer function.

For a specific data transmission process, refer to the foregoing embodiment. Details are not described in this embodiment.

Figure 24:
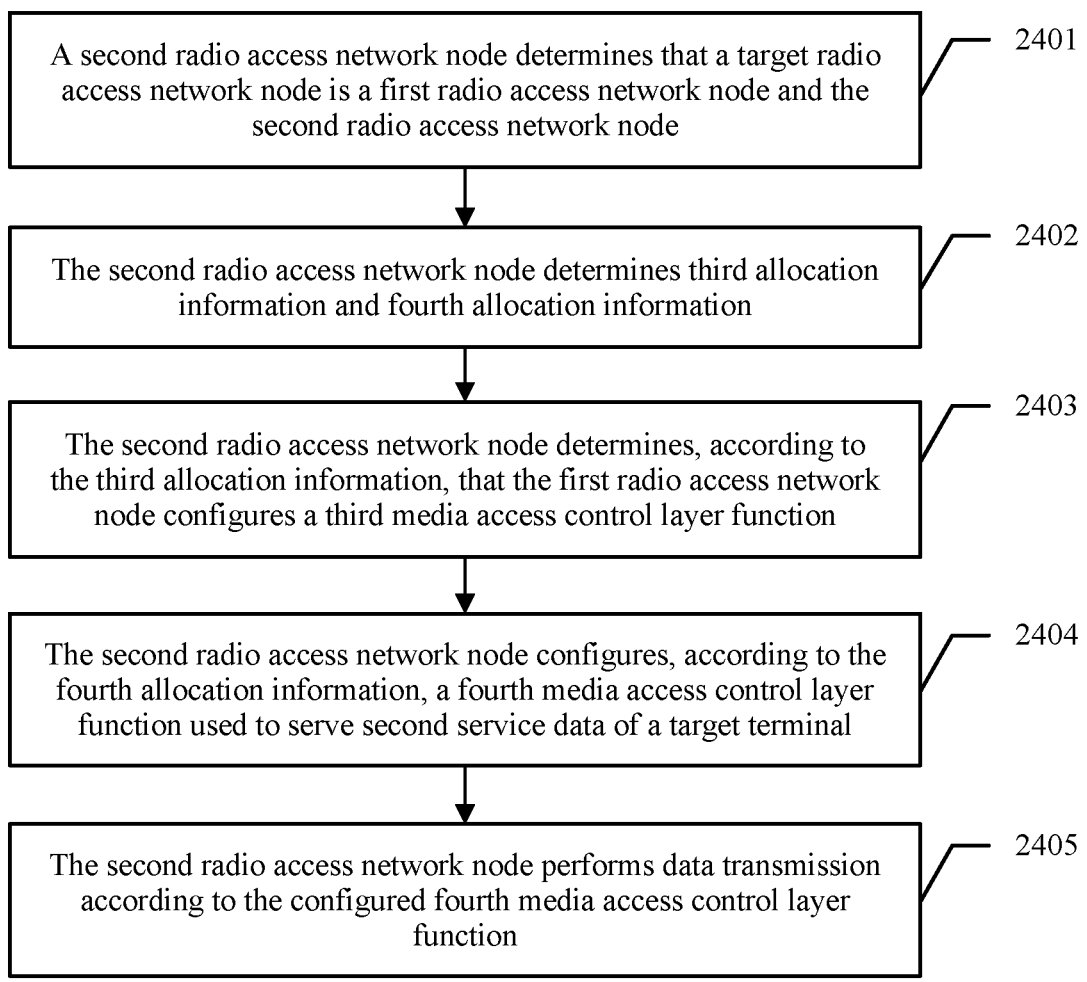
FIG. 24 is another step flowchart of a data transmission method according to an embodiment of the present disclosure.

That the first radio access network node and the second radio access network node collaboratively serve the target terminal shown in FIG. 23 and FIG. 24 is an example, and is not limited. For another example, for PRB resource allocation information in a downlink assignment and an uplink grant, the target terminal sends uplink CSI information to the second radio access network node. Optionally, the second radio access network node sends the CSI information to the first radio access network node by using the interface between the first radio access network node and the second radio access network node. The first radio access network node uses the uplink CSI information to enable the MAC layer of the first radio access network node to allocate an initial physical resource block (PRB) pool, and the first radio access network node sends initial allocation information of the PRB pool to the second radio access network node by using the third allocation information. The PRB pool may be used by the second radio access network node to schedule the target terminal in a period of time.

When the first radio access network node allocates the PRB pool, information such as load of multiple cells, the wireless condition of the target terminal, and a service requirement of the target terminal are considered.

According to the received third allocation information, the second radio access network node determines, in a subframe, to select some PRBs from the PRB pool and allocates the PRBs to the target terminal. The second radio access network node sends the foregoing resource allocation information to the target terminal over a PDCCH to perform subframe-level scheduling, so that the first radio access network node and the second radio access network node collaboratively serve the target terminal.

Figure 25:
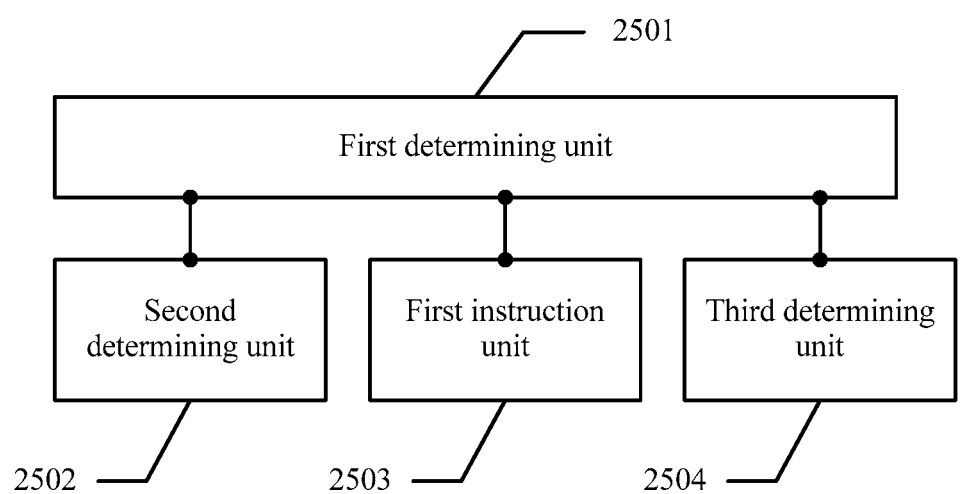
FIG. 25 is a schematic structural diagram of a first radio access network node according to an embodiment of the present disclosure.

With reference to FIG. 25, the following describes in detail a specific structure of a first radio access network node according to an embodiment of the present disclosure.

As shown in FIG. 25, the first radio access network node includes:

a first determining unit 2501, configured to determine a target radio access network node to which a media access control layer serving a target terminal belongs; and a second determining unit 2502, configured to determine first allocation information when the target radio access network node is the first radio access network node, where the first allocation information is used to instruct the first radio access network node to configure a first media access control layer function used to serve the target terminal; or a first instruction unit 2503, configured to: when the target radio access network node is a second radio access network node, instruct the second radio access network node to determine second allocation information, where the second allocation information is used to instruct the second radio access network node to configure a second media access control layer function used to serve the target terminal; or a third determining unit 2504, configured to: when the target radio access network node is the first radio access network node and a second radio access network node, determine third allocation information and fourth allocation information, where the third allocation information is used to instruct the first radio access network node to configure a third media access control layer function used to serve the target terminal, the fourth allocation information is used to instruct the second radio access network node to configure a fourth media access control layer function used to serve the target terminal, and the third media access control layer function and the fourth media access control layer function collaboratively serve the target terminal.

The first radio access network node may further include a unit, configured to: if the first radio access network node determines that the target terminal meets a preset condition, execute the first determining unit 2501.

The preset condition is as follows: Service data of the target terminal is reconfigured, added, or deleted, or a quality of service (QoS) parameter of a service borne by a control plane signaling radio bearer SRB or a user plane data radio bearer DRB is changed, or a wireless condition of the target terminal changes, for example, a wireless environment of the target terminal changes when the target terminal moves.

According to the first radio access network node shown in this embodiment, system performance is effectively improved; a performance requirement and costs for an interface between the first radio access network node and a second radio access network node are reduced, for example, bandwidth and delay requirements on the interface are reduced; a quality of service (QoS) requirement of a service can be met; and system resource utilization efficiency is improved.

Figure 26:
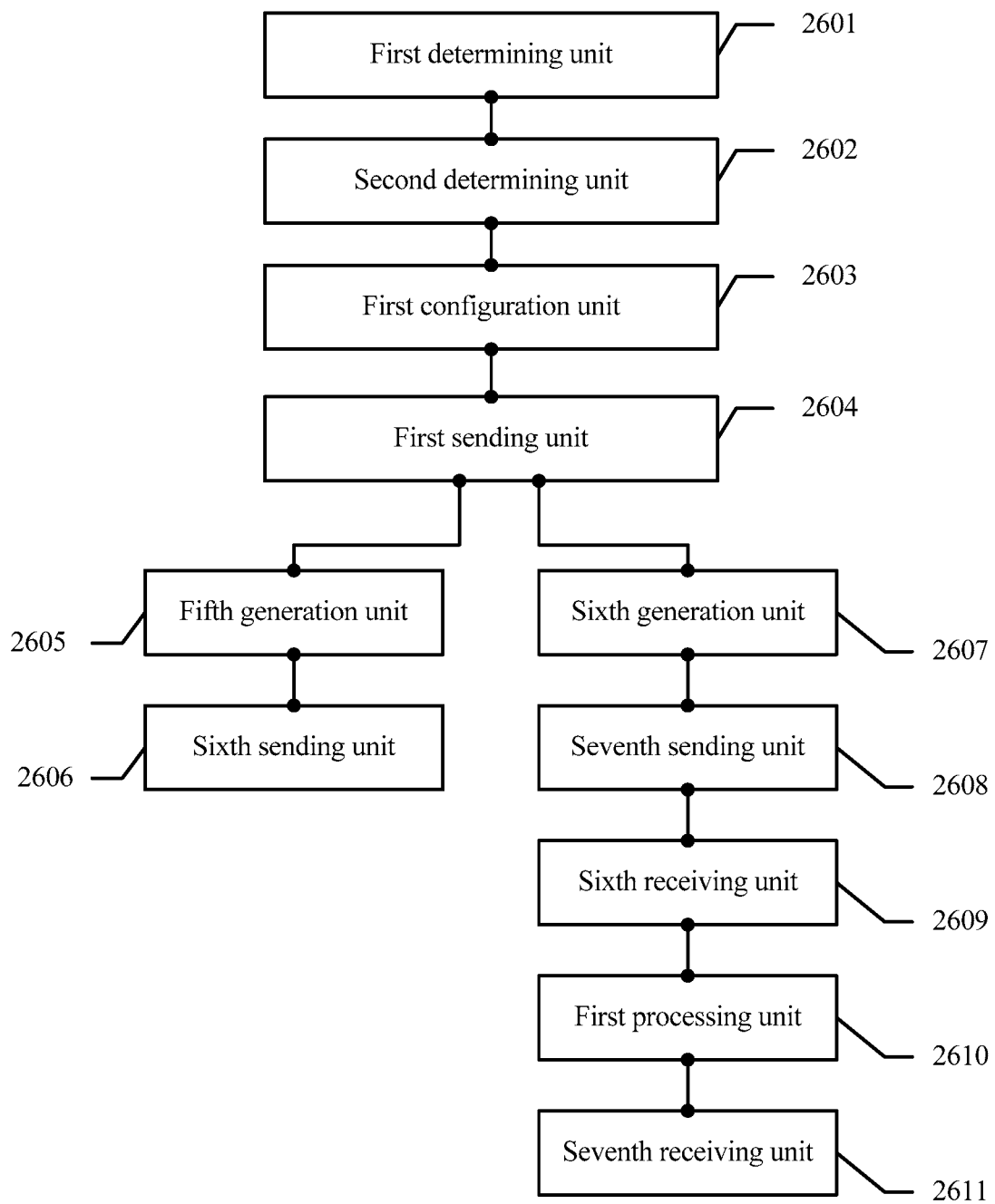
FIG. 26 is another schematic structural diagram of a first radio access network node according to an embodiment of the present disclosure.

With reference to an embodiment shown in FIG. 26, the following describes a specific structure of the first radio access network node that can perform data transmission if the first radio access network node determines that the target radio access network node is the first radio access network node.

The first radio access network node includes: a first determining unit 2601, configured to determine a target radio access network node to which a media access control layer serving a target terminal belongs;

a second determining unit 2602, configured to determine first allocation information when the target radio access network node is the first radio access network node, where the first allocation information is used to instruct the first radio access network node to configure a first media access control layer function used to serve the target terminal;

a first configuration unit 2603, configured to configure the first media access control layer function according to the first allocation information, where the first media access control layer function is all functions that are of a media access control layer of the first radio access network node and are used to serve the target terminal;

a first sending unit 2604, configured to send the first allocation information to a second radio access network node, where the first allocation information is used to enable the second radio access network node to determine that the first radio access network node is the target radio access network node;

a fifth generation unit 2605, configured to generate downlink data and downlink control information according to the first media access control layer function, where the downlink data includes a downlink media access control service data unit MAC SDU and/or a downlink MAC CE, and the downlink control information includes HARQ information and downlink assignment information;

a sixth sending unit 2606, configured to send the downlink data and the downlink control information to the second radio access network node, so that the second radio access network node sends the downlink data and the downlink control information to the target terminal;

a sixth generation unit 2607, configured to generate uplink control information according to the first media access control layer function;

a seventh sending unit 2608, configured to send the uplink control information to the second radio access network node, so that the second radio access network node sends the uplink control information to the target terminal, where the uplink control information includes uplink hybrid automatic repeat request HARQ information and uplink grant information;

a sixth receiving unit 2609, configured to be used by the media access control layer of the first radio access network node to receive uplink data, where the uplink data is sent by the target terminal to the second radio access network node, the second radio access network node sends the uplink data to the first radio access network node, the uplink data is generated by the target terminal according to the uplink control information, and the uplink data includes a MAC SDU and/or an uplink MAC CE;

a first processing unit 2610, configured to be used by the media access control layer of the first radio access network node to process the uplink data according to the first media access control layer function; and a seventh receiving unit 2611, configured to receive channel state information CSI and/or a scheduling request SR of the target terminal, where the CSI and/or the SR are/is sent by the target terminal to the second radio access network node, and the second radio access network node sends the CSI and/or the SR to the first radio access network node.

The first radio access network node may further include a unit, configured to: if the first radio access network node determines that the target terminal meets a preset condition, execute the first determining unit 2601.

Figure 27:
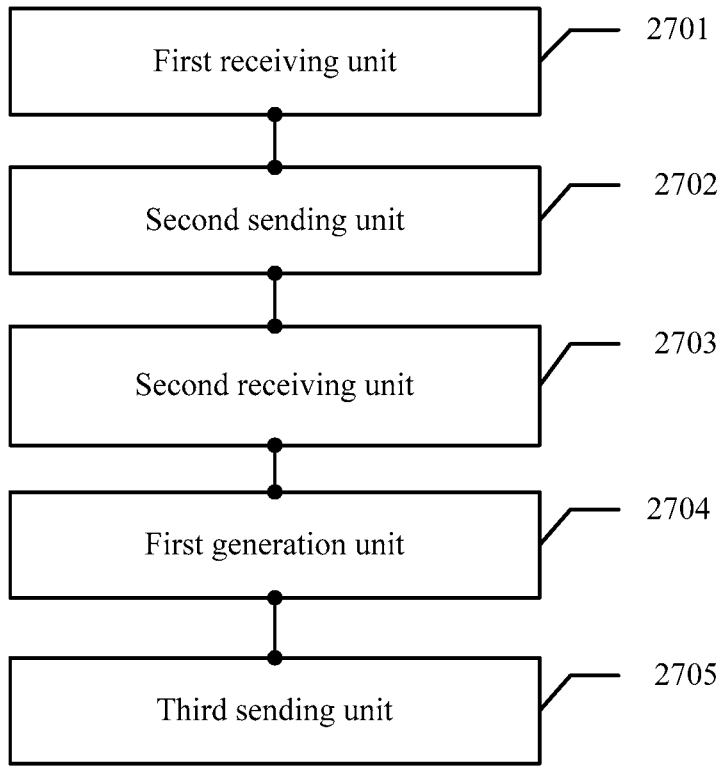
FIG. 27 is a schematic structural diagram of a first radio access network node that can enable a target terminal to access a second radio access network node based on a contention-based random access process according to an embodiment of the present disclosure.

More specifically, with reference to FIG. 27, the following describes in detail a specific structure of the first radio access network node that can enable the target terminal to access the second radio access network node based on a contention-based random access process.

The first radio access network node includes: a first receiving unit 2701, configured to receive a first request message sent by the second radio access network node, where the first request message is used to request to enable the target terminal to access the second radio access network node;

a second sending unit 2702, configured to send the second radio access network node a first response message generated according to the first request message, so that the second radio access network node processes the first response message and sends a processed first response message to the target terminal, where the processed first response message is used to enable the target terminal to generate a second request message used to trigger the first radio access network node to perform contention resolution, the target terminal sends the second request message to the second radio access network node, and the second radio access network node processes the second request message and sends a processed second request message to the first radio access network node;

a second receiving unit 2703, configured to receive the processed second request message;

a first generation unit 2704, configured to generate a contention resolution message according to the processed second request message; and a third sending unit 2705, configured to send a generated second response message to the second radio access network node, where the second response message is used to indicate the contention resolution message, and the second radio access network node processes the second response message and sends a processed second response message to the target terminal, so that the target terminal accesses the second radio access network node or obtains uplink synchronization with the second radio access network node according to the processed second response message.

For specific content and a transmission mode of the foregoing message, refer to the embodiment shown in FIG. 8. Details are not described in this embodiment.

Figure 28:
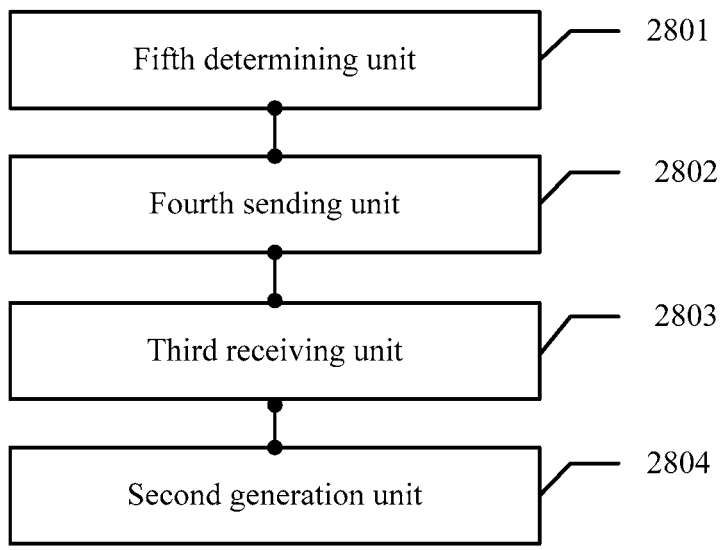
FIG. 28 is a schematic structural diagram of a first radio access network node that can enable a target terminal to access a second radio access network node based on a non-contention-based random access process according to an embodiment of the present disclosure.

With reference to FIG. 28, the following describes in detail a specific structure of the first radio access network node that can enable the target terminal to access the second radio access network node based on a non-contention-based random access process.

The first radio access network node includes: a fifth determining unit 2801, configured to allocate a dedicated physical random access channel PRACH resource and a third request message to the target terminal;

a fourth sending unit 2802, configured to send the dedicated physical random access channel PRACH resource and the third request message to the second radio access network node, so that the second radio access network node sends the dedicated physical random access channel PRACH resource and the third request message to the target terminal, the target terminal sends the third request message to the second radio access network node by using the dedicated physical random access channel PRACH resource, and the second radio access network node sends the third request message to the first radio access network node;

a third receiving unit 2803, configured to receive the third request message; and a second generation unit 2804, configured to send the second radio access network node a third response message generated according to the third request message, so that the second radio access network node processes the third response message and sends a processed third response message to the target terminal, so that the target terminal accesses the second radio access network node or obtains uplink synchronization with the second radio access network node according to the processed third response message.

For specific content and transmission modes of the foregoing messages, refer to the embodiment shown in FIG. 9. Details are not described in this embodiment.

Figure 29:
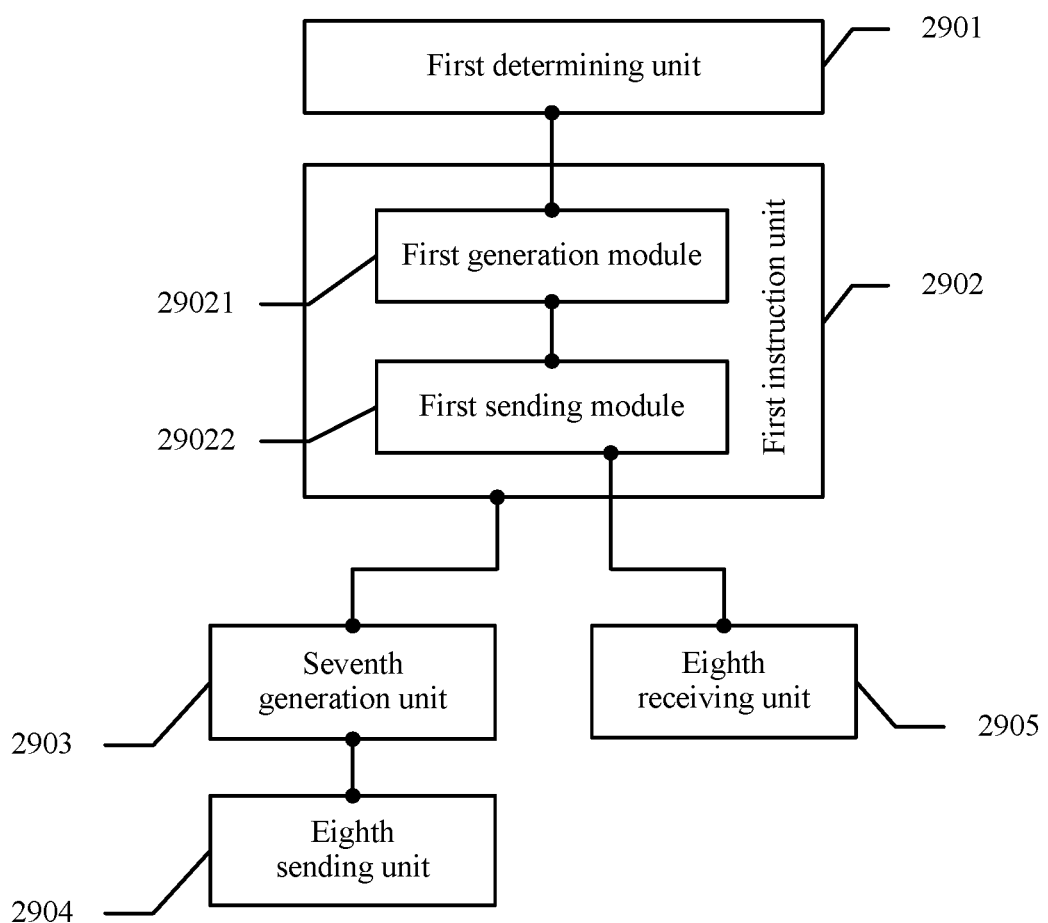
FIG. 29 is another schematic structural diagram of a first radio access network node according to an embodiment of the present disclosure.

With reference to FIG. 29, the following describes a specific structure of the first radio access network node if the first radio access network node determines that the target radio access network node is the second radio access network node.

The first radio access network node includes: a first determining unit 2901, configured to determine a target radio access network node to which a media access control layer serving a target terminal belongs; and a first instruction unit 2902, configured to: when the target radio access network node is a second radio access network node, instruct the second radio access network node to determine second allocation information, where the second allocation information is used to instruct the second radio access network node to configure a second media access control layer function used to serve the target terminal.

Specifically, the first instruction unit 2902 includes:

a first generation module 29021, configured to generate configuration information; and a first sending module 29022, configured to send the configuration information to the second radio access network node, where the configuration information is used to enable the second radio access network node to determine the second allocation information, so that the second radio access network node configures the second media access control layer function for the target terminal according to the second allocation information, and the second media access control layer function is all functions that are of a media access control layer of the second radio access network node and are used to serve the target terminal.

The first radio access network node includes: a seventh generation unit 2903, configured to generate downlink data;

an eighth sending unit 2904, configured to send the downlink data to the second radio access network node, so that the media access control layer of the second radio access network node processes the downlink data according to the second media access control layer function so as to generate processed downlink data, and the second radio access network node sends the processed downlink data to the target terminal, where the processed downlink data includes a MAC SDU and/or a downlink MAC CE; and an eighth receiving unit 2905, configured to receive processed uplink data, where the processed uplink data is data that is generated after the media access control layer of the second radio access network node processes uplink data according to the second media access control layer function, the uplink data is sent by the target terminal to the second radio access network node, and the uplink data includes a MAC SDU and/or an uplink MAC CE.

Figure 30:
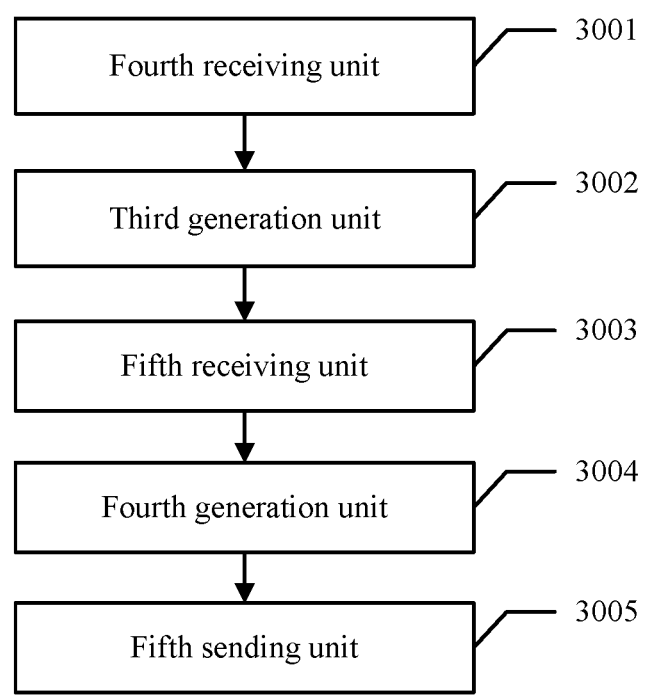
FIG. 30 is a schematic structural diagram of a first radio access network node that can enable a target terminal to access a second radio access network node based on a contention-based random access process according to an embodiment of the present disclosure.

More specifically, with reference to FIG. 30, the following describes in detail a specific structure of the first radio access network node that can enable the target terminal to access the second radio access network node based on a contention-based random access process.

The first radio access network node includes: a fourth receiving unit 3001, configured to receive a fourth request message sent by the second radio access network node, where the fourth request message is used to request to enable the target terminal to access the second radio access network node;

a third generation unit 3002, configured to send the second radio access network node a fourth response message generated according to the fourth request message, so that the second radio access network node processes the fourth response message and sends a processed fourth response message to the target terminal, where the processed fourth response message is used to enable the target terminal to generate a fifth request message used to trigger the first radio access network node to perform contention resolution, the target terminal sends the fifth request message to the second radio access network node, and the second radio access network node processes the fifth request message and sends a processed fifth request message to the first radio access network node;

a fifth receiving unit 3003, configured to receive the processed fifth request message;

a fourth generation unit 3004, configured to generate a contention resolution message according to the processed fifth request message; and a fifth sending unit 3005, configured to send the contention resolution message to the second radio access network node, so that the second radio access network node generates a fifth response message according to the contention resolution message, and the second radio access network node processes the fifth response message and sends a processed fifth response message to the target terminal, so that the target terminal determines to access the second radio access network node or obtain uplink synchronization with the second radio access network node according to the processed fifth response message.

For specific content and a transmission process of the foregoing message, refer to the embodiment shown in FIG. 14. Details are not described in this embodiment.

Figure 31:
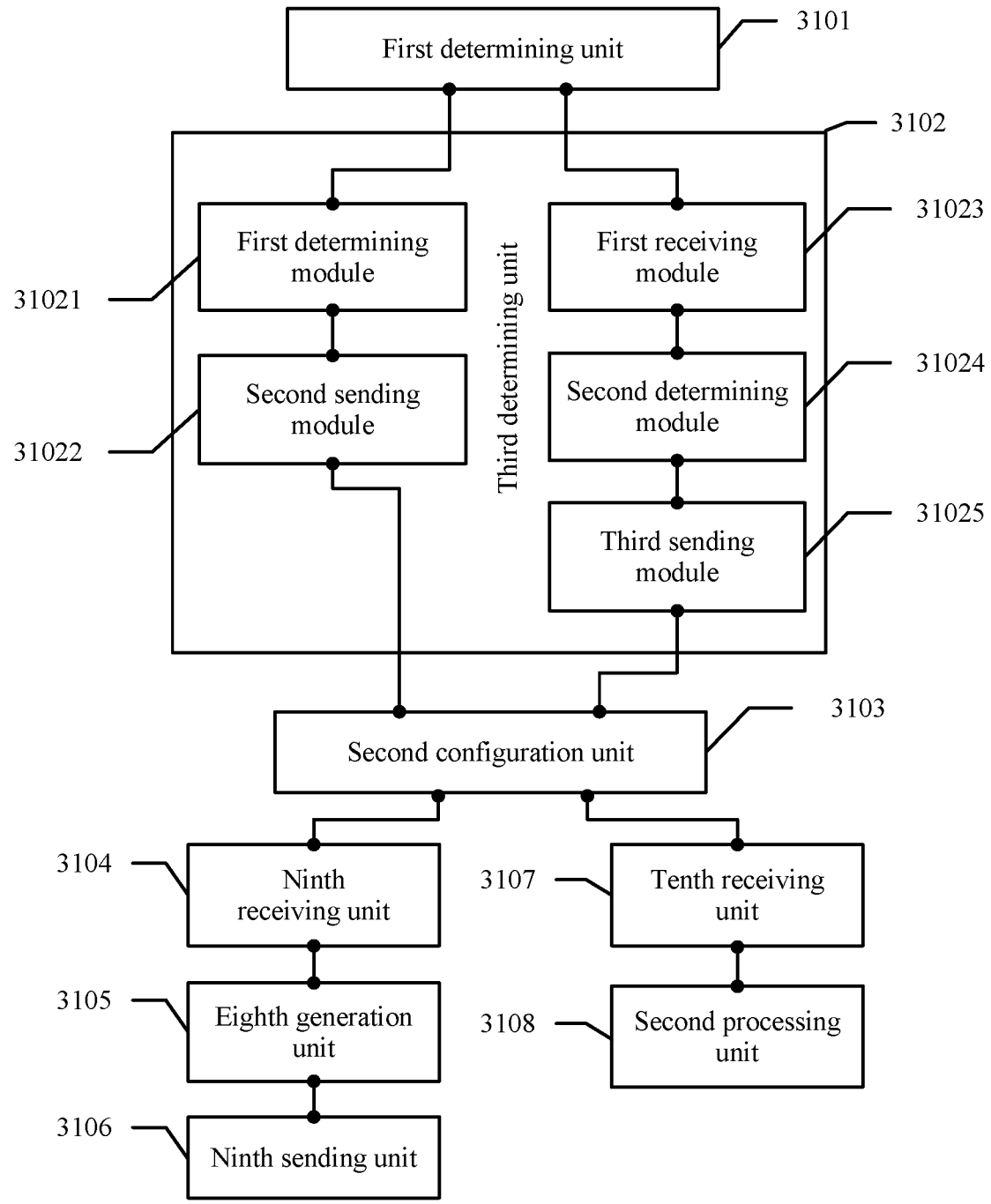
FIG. 31 is another schematic structural diagram of a first radio access network node according to an embodiment of the present disclosure.

With reference to an embodiment shown in FIG. 31, the following describes a specific structure of the first radio access network node that can implement that the first radio access network node and the second radio access network node serve the target terminal together.

The first radio access network node includes: a first determining unit 3101, configured to determine a target radio access network node to which a media access control layer serving a target terminal belongs; and a third determining unit 3102, configured to: when the target radio access network node is the first radio access network node and the second radio access network node, determine third allocation information and fourth allocation information, where the third allocation information is used to instruct the first radio access network node to configure a third media access control layer function used to serve the target terminal, the fourth allocation information is used to instruct the second radio access network node to configure a fourth media access control layer function used to serve the target terminal, and the third media access control layer function and the fourth media access control layer function collaboratively serve the target terminal.

Specifically, the third determining unit 3102 specifically includes:

a first determining module 31021, configured to determine the third allocation information and the fourth allocation information according to service data of the target terminal; and a second sending module 31022, configured to send the third allocation information and the fourth allocation information to the second radio access network node;

or a first receiving module 31023, configured to receive the fourth allocation information sent by the second radio access network node, where the fourth allocation information is generated by the second radio access network node according to service data of the target terminal;

a second determining module 31024, configured to determine the third allocation information according to the fourth allocation information; and a third sending module 31025, configured to send the third allocation information to the second radio access network node.

The first radio access network node includes: a second configuration unit 3103, configured to configure the third media access control layer function for the target terminal according to the third allocation information, where each of the third media access control layer function and the fourth media access control layer function is all functions of a media access control layer that can serve the target terminal;

a ninth receiving unit 3104, configured to receive downlink control information sent by the second radio access network node, where the downlink control information includes HARQ information and/or downlink assignment information;

an eighth generation unit 3105, configured to be used by a media access control layer of the first radio access network node to generate downlink data according to the third media access control layer function and the downlink control information;

a ninth sending unit 3106, configured to be used by the media access control layer of the first radio access network node to send the downlink data to the second radio access network node, so that a media access control layer of the second radio access network node processes the downlink data according to the fourth media access control layer function so as to generate processed downlink data, and the second radio access network node sends the processed downlink data to the target terminal, where the processed downlink data includes a MAC SDU and/or a downlink MAC CE;

a tenth receiving unit 3107, configured to be used by the media access control layer of the first radio access network node to receive processed uplink data, where the processed uplink data is data that is generated after the media access control layer of the second radio access network node processes uplink data according to the fourth media access control layer function, and the uplink data includes a MAC SDU and/or an uplink MAC CE; and a second processing unit 3108, configured to be used by the media access control layer of the first radio access network node to process the processed uplink data according to the third media access control layer function.

Figure 32:
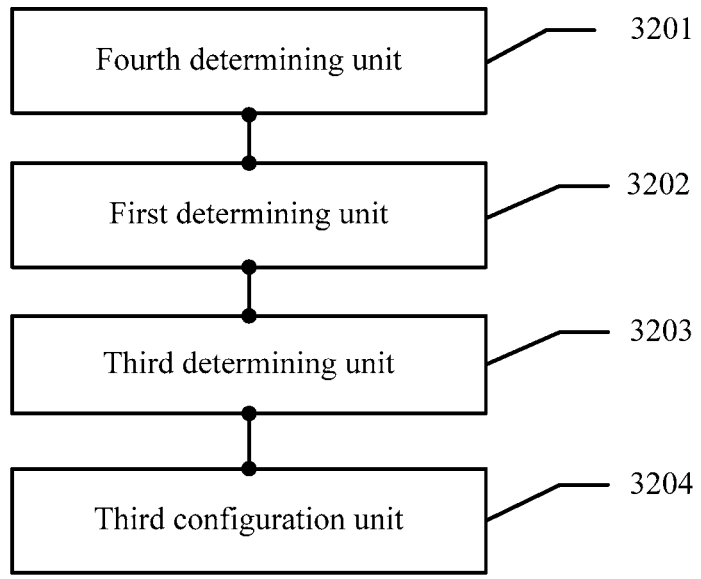
FIG. 32 is another schematic structural diagram of a first radio access network node according to an embodiment of the present disclosure.

With reference to an embodiment shown in FIG. 32, the following describes in detail a specific structure of the first radio access network node that can implement that the first radio access network node and the second radio access network node can together serve different services of the target terminal.

The first radio access network node includes: a fourth determining unit 3201, configured to determine that service data of the target terminal includes first service data and second service data;

a first determining unit 3202, configured to determine a target radio access network node to which a media access control layer serving the target terminal belongs;

a third determining unit 3203, configured to: when the target radio access network node is the first radio access network node and the second radio access network node, determine third allocation information and fourth allocation information, where the third allocation information is used to instruct the first radio access network node to configure a third media access control layer function used to serve the target terminal, the fourth allocation information is used to instruct the second radio access network node to configure a fourth media access control layer function used to serve the target terminal, and the third media access control layer function and the fourth media access control layer function collaboratively serve the target terminal; and a third configuration unit 3204, configured to configure the third media access control layer function for the target terminal according to the third allocation information, where the third media access control layer function is all functions that are of a media access control layer of the first radio access network node and are used to serve the first service data of the target terminal, the fourth allocation information is further used to instruct the second radio access network node to configure the fourth media access control layer function used to serve the second service data of the target terminal, and the fourth media access control layer function is all functions that are of a media access control layer of the second radio access network node and are used to serve the second service data of the target terminal.

Figure 33:
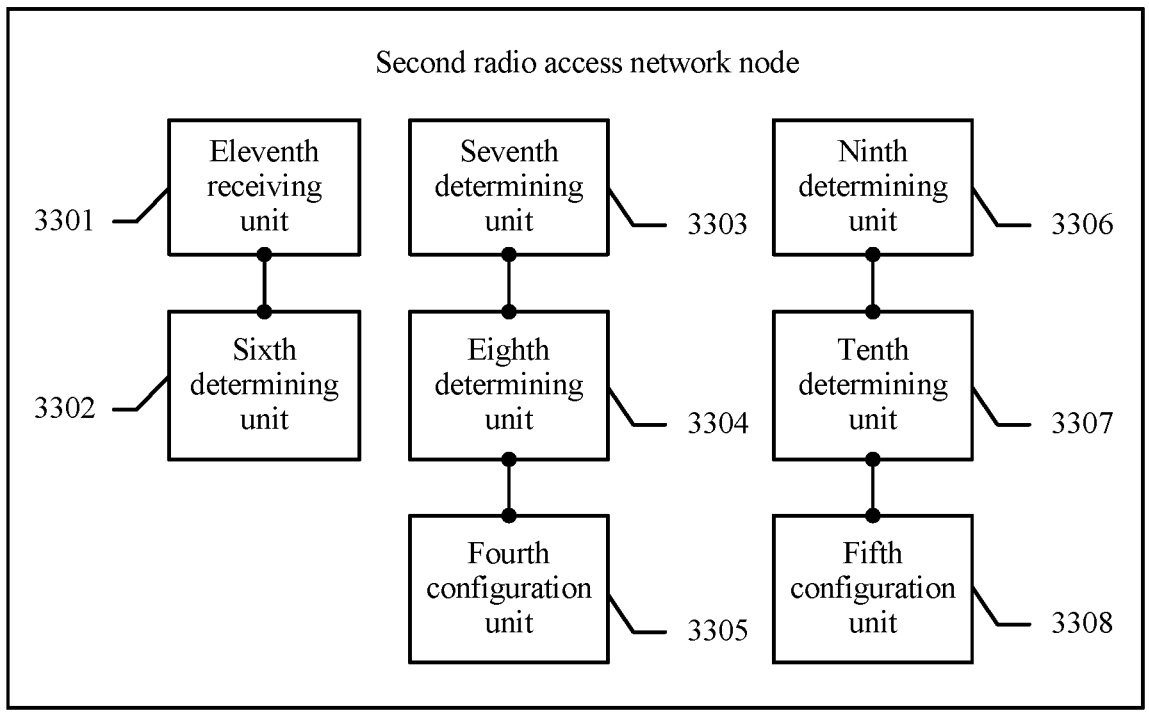
FIG. 33 is a schematic structural diagram of a second radio access network node according to an embodiment of the present disclosure.

With reference to FIG. 33, the following describes in detail a specific structure of the second radio access network node. As shown in FIG. 33, the second radio access network node includes:

an eleventh receiving unit 3301, configured to receive first allocation information sent by a first radio access network node, where the first allocation information is used to instruct the first radio access network node to configure a first media access control layer function used to serve a target terminal; and a sixth determining unit 3302, configured to determine that a target radio access network node is the first radio access network node according to the first allocation information, where the target radio access network node is a radio access network node to which a media access control layer used to serve the target terminal belongs;

or a seventh determining unit 3303, configured to determine that the target radio access network node is the second radio access network node;

an eighth determining unit 3304, configured to determine second allocation information; and a fourth configuration unit 3305, configured to: according to the second allocation information, configure a second media access control layer function used to serve the target terminal;

or a ninth determining unit 3306, configured to determine that the target radio access network node is the first radio access network node and the second radio access network node;

a tenth determining unit 3307, configured to determine third allocation information and fourth allocation information; and a fifth configuration unit 3308, configured to: according to the fourth allocation information, configure a fourth media access control layer function used to serve the target terminal, where the third allocation information is used to instruct the first radio access network node to configure a third media access control layer function used to serve the target terminal, and the third media access control layer function and the fourth media access control layer function collaboratively serve the target terminal.

According to the second radio access network node shown in this embodiment, system performance is effectively improved; a performance requirement and costs for an interface between a first radio access network node and the second radio access network node are reduced, for example, bandwidth and delay requirements on the interface are reduced; a quality of service (QoS) requirement of a service can be met; and system resource utilization efficiency is improved.

Figure 34:
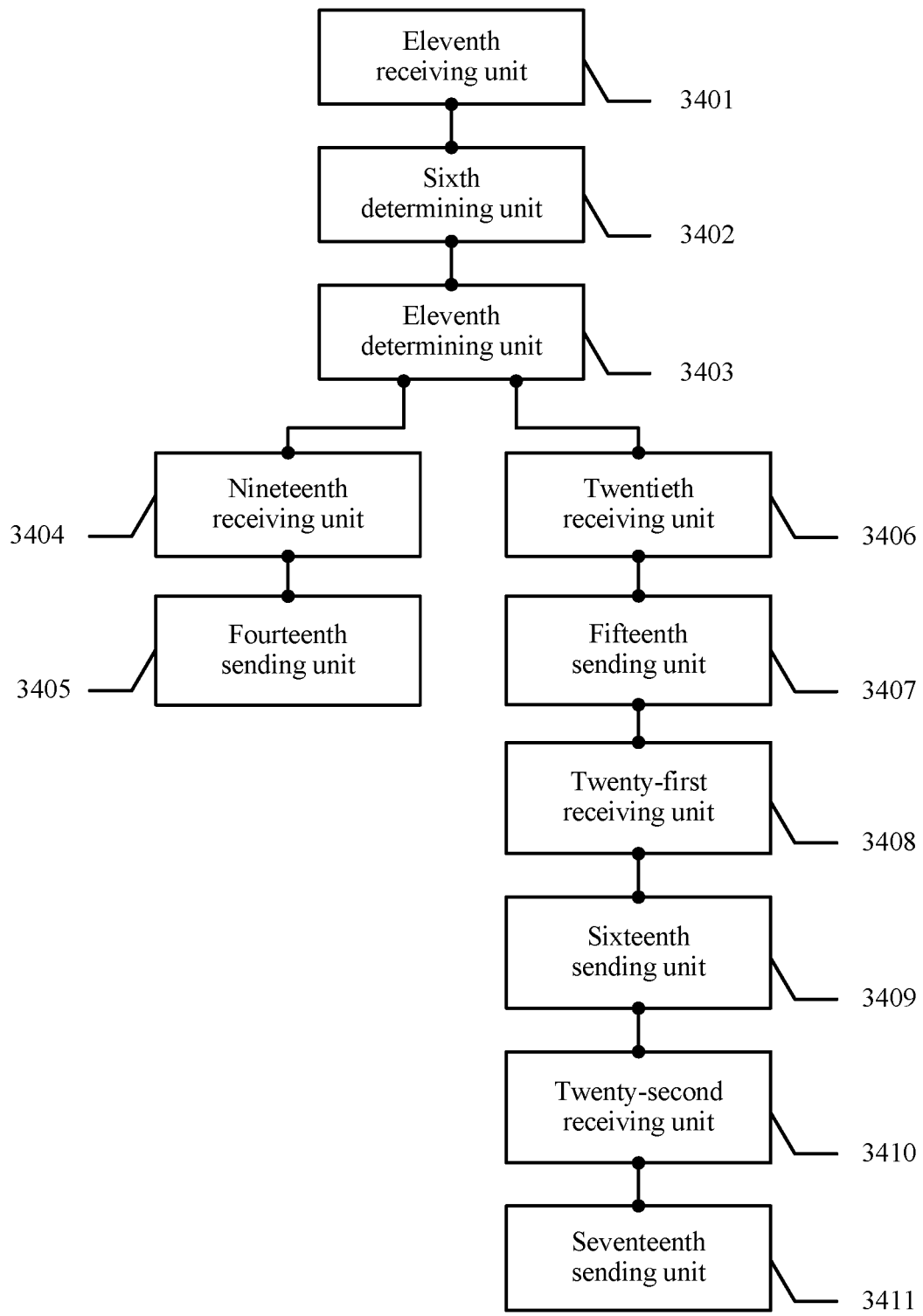
FIG. 34 is another schematic structural diagram of a second radio access network node according to an embodiment of the present disclosure.

With reference to an embodiment shown in FIG. 34, the following describes a specific structure of the second radio access network node if the target radio access network node is the first radio access network node.

The second radio access network node includes: an eleventh receiving unit 3401, configured to receive first allocation information sent by a first radio access network node, where the first allocation information is used to instruct the first radio access network node to configure a first media access control layer function used to serve a target terminal;

a sixth determining unit 3402, configured to determine that a target radio access network node is the first radio access network node according to the first allocation information, where the target radio access network node is a radio access network node to which a media access control layer used to serve the target terminal belongs;

an eleventh determining unit 3403, configured to: according to the first allocation information, determine, by the second radio access network node, that the first media access control layer function is all functions that are of a media access control layer of the first radio access network node and are used to serve the target terminal;

a nineteenth receiving unit 3404, configured to receive downlink data and downlink control information that are sent by the first radio access network node, where the downlink data and the downlink control information are generated by the first radio access network node according to the first media access control layer function, the downlink data includes a downlink media access control service data unit MAC SDU and/or a downlink MAC CE, and the downlink control information includes HARQ information and downlink assignment information;

a fourteenth sending unit 3405, configured to send the downlink data and the downlink control information to the target terminal;

a twentieth receiving unit 3406, configured to receive uplink control information sent by the first radio access network node, where the uplink control information is generated by the first radio access network node according to the first media access control layer function;

a fifteenth sending unit 3407, configured to send the uplink control information to the target terminal, where the uplink control information includes uplink hybrid automatic repeat request HARQ information and uplink grant information;

a twenty-first receiving unit 3408, configured to receive uplink data sent by the target terminal, where the uplink data is generated by the target terminal according to the uplink control information, and the uplink data includes a MAC SDU and/or an uplink MAC CE;

a sixteenth sending unit 3409, configured to send the uplink data to the first radio access network node, so that the media access control layer of the first radio access network node receives the uplink data, and the media access control layer of the first radio access network node processes the uplink data according to the first media access control layer function;

a twenty-second receiving unit 3410, configured to receive channel state information CSI and/or a scheduling request SR of the target terminal that are/is sent by the target terminal; and a seventeenth sending unit 3411, configured to send the CSI and/or the SR to the first radio access network node, so that the first radio access network node receives the CSI and/or the SR.

Figure 35:
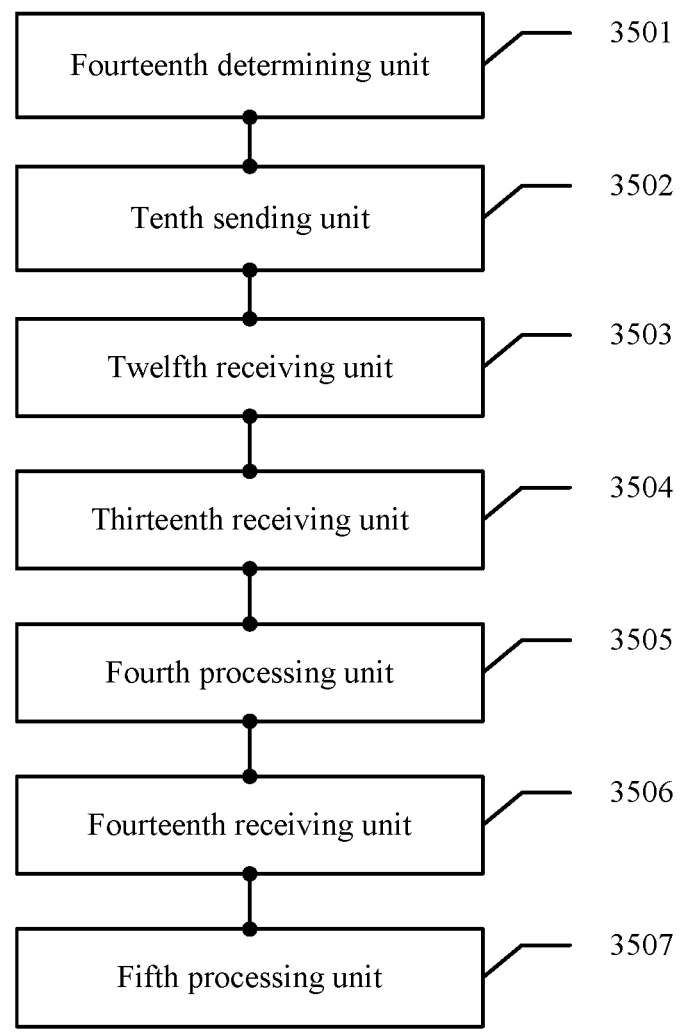
FIG. 35 is a schematic structural diagram of the second radio access network node that can enable the target terminal to access the second radio access network node based on a contention-based random access process according to an embodiment of the present disclosure.

More specifically, with reference to FIG. 35, the following describes in detail a specific structure of the second radio access network node when the target terminal can access the second radio access network node based on a contention-based random access process.

The second radio access network node includes: a fourteenth determining unit 3501, configured to determine a first request message, where the first request message is used to request to enable the target terminal to access the second radio access network node;

a tenth sending unit 3502, configured to send the first request message to the first radio access network node, so that the first radio access network node sends the second radio access network node a first response message generated according to the first request message;

a twelfth receiving unit 3503, configured to receive the first response message;

a third processing unit 3504, configured to process the first response message and send a processed first response message to the target terminal, where the processed first response message is used to enable the target terminal to generate a second request message used to trigger the first radio access network node to perform contention resolution, and the target terminal sends the second request message to the second radio access network node;

a thirteenth receiving unit 3505, configured to receive the second request message;

a fourth processing unit 3506, configured to process the second request message and send a processed second request message to the first radio access network node, so that the first radio access network node receives the processed second request message, the first radio access network node generates a contention resolution message according to the processed second request message, and the first radio access network node sends a generated second response message to the second radio access network node, where the second response message is used to indicate the contention resolution message;

a fourteenth receiving unit 3507, configured to receive the second response message; and a fifth processing unit 3508, configured to process the second response message and send a processed second response message to the target terminal, so that the target terminal accesses the second radio access network node or obtains uplink synchronization with the second radio access network node according to the processed second response message.

For specific content and transmission processes of the foregoing messages, refer to the foregoing embodiment. Details are not described in this embodiment.

Figure 36:
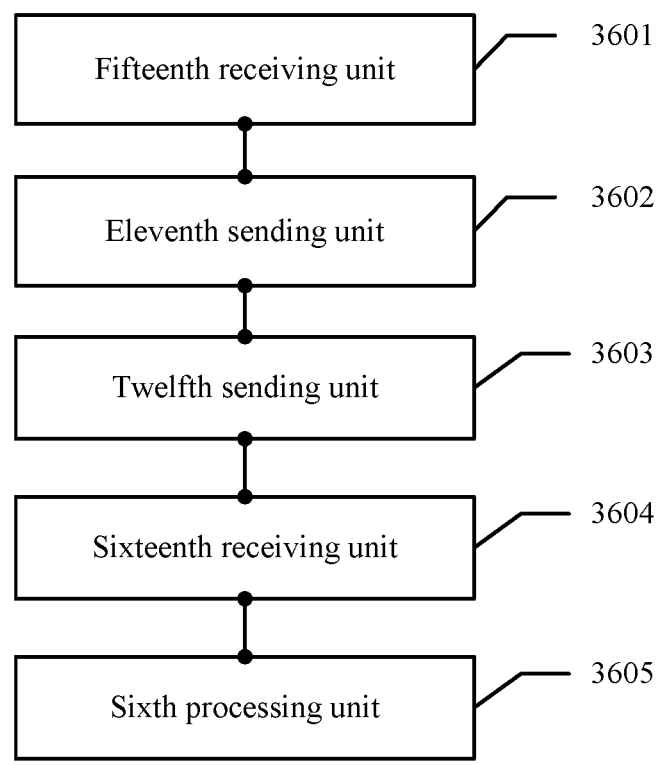
FIG. 36 is a schematic structural diagram of the second radio access network node that can enable the target terminal to access the second radio access network node based on a non-contention-based random access process according to an embodiment of the present disclosure.

With reference to FIG. 36, the following describes a specific structure of the second radio access network node when the target terminal can access the second radio access network node based on a non-contention-based random access process.

The second radio access network node includes: a fifteenth receiving unit 3601, configured to receive a dedicated physical random access channel PRACH resource and a third request message that are allocated by the first radio access network node to the target terminal;

an eleventh sending unit 3602, configured to send the dedicated physical random access channel PRACH resource and the third request message to the target terminal, so that the target terminal sends the third request message to the second radio access network node by using the dedicated physical random access channel PRACH resource;

a twelfth sending unit 3603, configured to send the third request message to the first radio access network node, so that the first radio access network node receives the third request message, and the first radio access network node sends the second radio access network node a third response message generated according to the third request message;

a sixteenth receiving unit 3604, configured to receive the third response message; and a sixth processing unit 3605, configured to process the third response message and send a processed third response message to the target terminal, so that the target terminal accesses the second radio access network node or obtains uplink synchronization with the second radio access network node according to the processed third response message.

For specific content and transmission modes of the foregoing messages, refer to the foregoing embodiment. Details are not described in this embodiment.

Figure 37:
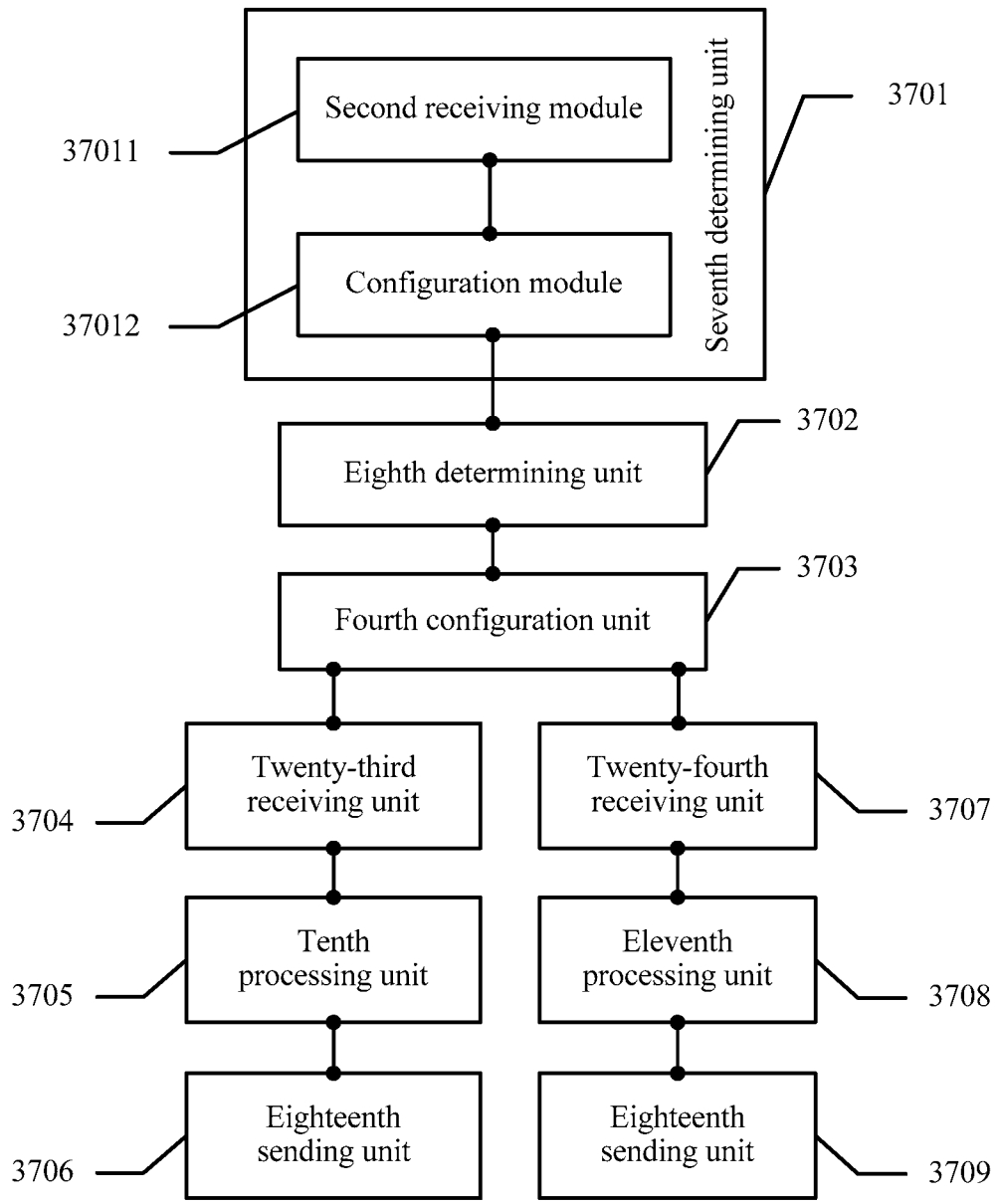
FIG. 37 is another schematic structural diagram of a second radio access network node according to an embodiment of the present disclosure.

With reference to an embodiment shown in FIG. 37, the following describes a specific structure of the second radio access network node if the target radio access network node is the second radio access network node.

The second radio access network node includes: a seventh determining unit 3701, configured to determine that the target radio access network node is the second radio access network node.

Specifically, the seventh determining unit 3701 includes:

a second receiving module 37011, configured to receive configuration information sent by the first radio access network node, where the configuration information is used to indicate that the target radio access network node is the second radio access network node; and a configuration module 37012, configured to determine that the target radio access network node is the second radio access network node according to the configuration information.

The second radio access network node includes: an eighth determining unit 3702, configured to determine second allocation information;

a fourth configuration unit 3703, configured to: according to the second allocation information, configure a second media access control layer function used to serve the target terminal, where the fourth configuration unit 3703 is further configured to configure the second media access control layer function for the target terminal according to the second allocation information, where the second media access control layer function is all functions that are of a media access control layer of the second radio access network node and are used to serve the target terminal;

a twenty-third receiving unit 3704, configured to receive downlink data sent by the first radio access network node;

a tenth processing unit 3705, configured to be used by the media access control layer of the second radio access network node to process the downlink data according to the second media access control layer function so as to generate processed downlink data;

an eighteenth sending unit 3706, configured to send the processed downlink data to the target terminal, where the processed downlink data includes a MAC SDU and/or a downlink MAC CE;

a twenty-fourth receiving unit 3707, configured to receive uplink data sent by the target terminal, where the uplink data includes a MAC SDU and/or an uplink MAC CE;

an eleventh processing unit 3708, configured to be used by the media access control layer of the second radio access network node to process the uplink data according to the second media access control layer function so as to generate processed uplink data; and an eighteenth sending unit 3709, configured to send the processed uplink data to the first radio access network node.

Figure 38:
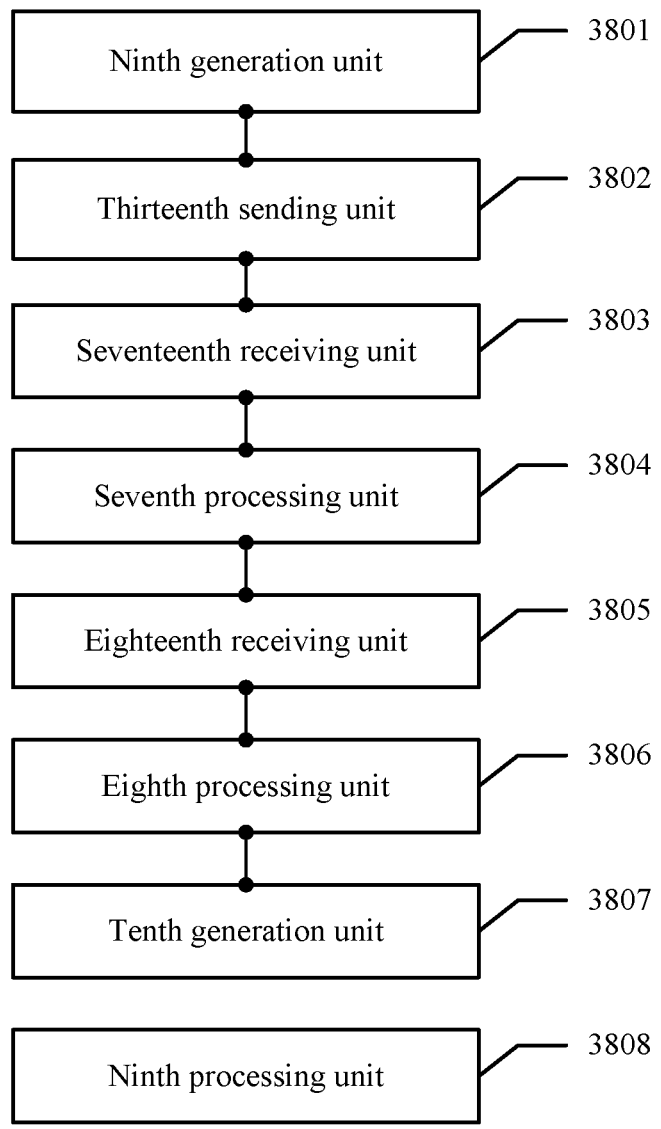
FIG. 38 is a schematic structural diagram of the second radio access network node that can enable the target terminal to access the second radio access network node based on a contention-based random access process according to an embodiment of the present disclosure.

More specifically, with reference to FIG. 38, the following describes a specific structure of the second radio access network node when the target terminal can access the second radio access network node based on a contention-based random access process.

The second radio access network node includes: a ninth generation unit 3801, configured to generate a fourth request message, where the fourth request message is used to request to enable the target terminal to access the second radio access network node;

a thirteenth sending unit 3802, configured to send the fourth request message to the first radio access network node, so that the first radio access network node sends the second radio access network node a fourth response message generated according to the fourth request message;

a seventeenth receiving unit 3803, configured to receive the fourth response message;

a seventh processing unit 3804, configured to process the fourth response message and send a processed fourth response message to the target terminal, where the processed fourth response message is used to enable the target terminal to generate a fifth request message used to trigger the first radio access network node to perform contention resolution, and the target terminal sends the fifth request message to the second radio access network node;

an eighteenth receiving unit 3805, configured to receive the fifth request message;

an eighth processing unit 3806, configured to process the fifth request message and send a processed fifth request message to the first radio access network node, so that the first radio access network node receives the processed fifth request message, the first radio access network node generates a contention resolution message according to the processed fifth request message, and the first radio access network node sends the contention resolution message to the second radio access network node;

a tenth generation unit 3807, configured to generate a fifth response message according to the contention resolution message; and a ninth processing unit 3808, configured to process the fifth response message and send a processed fifth response message to the target terminal, so that the target terminal determines to access the second radio access network node or obtain uplink synchronization with the second radio access network node according to the processed fifth response message.

In this embodiment, the target terminal may access the second radio access network node in a non-contention-based random access manner. For a specific implementation process, refer to a non-contention-based random access process in a conventional LTE technology. Details are not described herein.

The following describes a case in which the target radio access network node is the first radio access network node and the second radio access network node. In this embodiment, according to different service conditions of the target terminal, there are two cases in which the target radio access network node is the first radio access network node and the second radio access network node. One case is that the first radio access network node and the second radio access network node collaboratively serve the target terminal, and the other case is that the first radio access network node and the second radio access network node serve different services of the target terminal.

Figure 39:
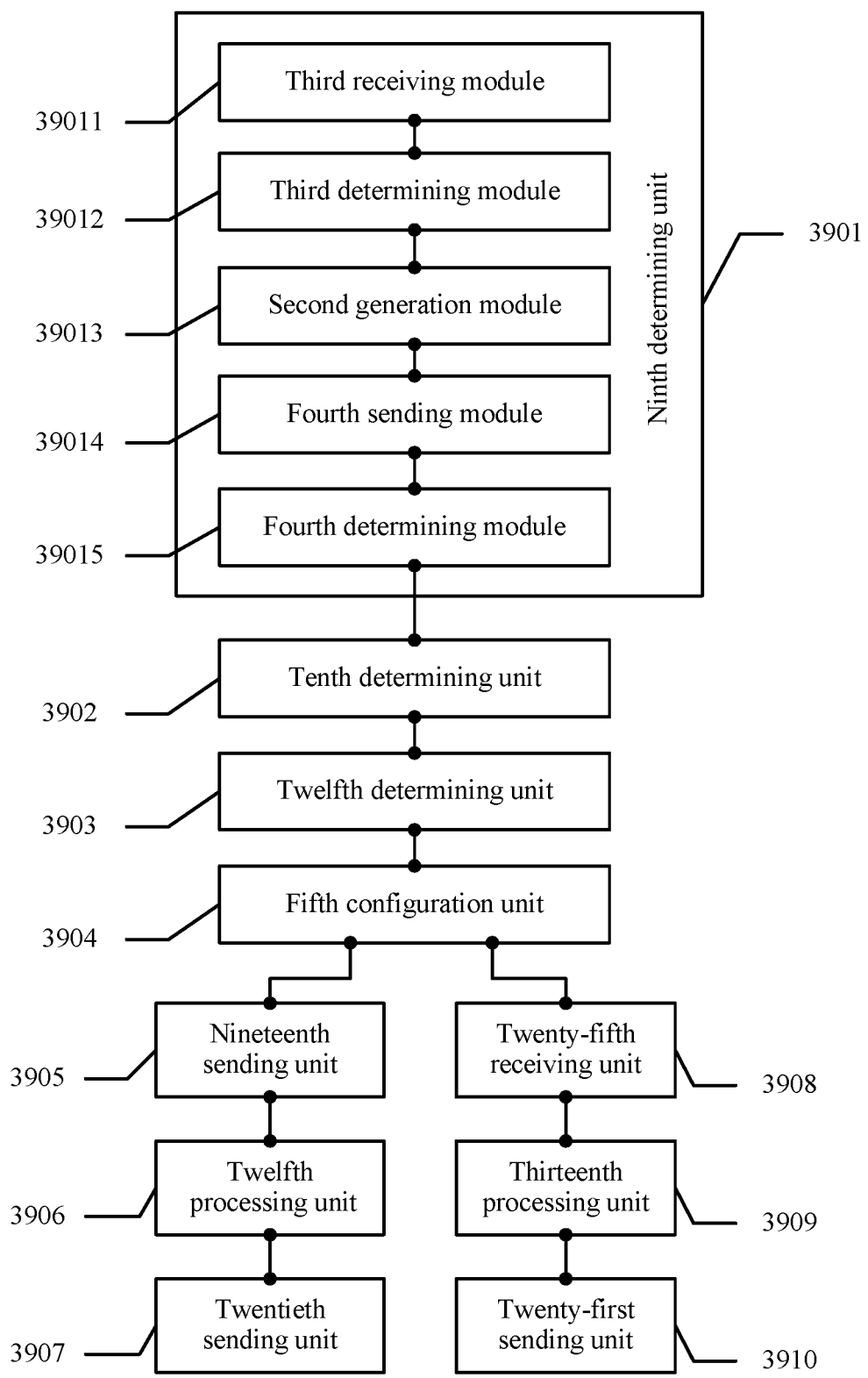
FIG. 39 is another schematic structural diagram of a second radio access network node according to an embodiment of the present disclosure.

First, with reference to an embodiment shown in FIG. 39, the following describes a specific structure of the second radio access network node when the first radio access network node and the second radio access network node can separately serve the target terminal.

The second radio access network node includes: a ninth determining unit 3901, configured to determine that the target radio access network node is the first radio access network node and the second radio access network node.

Specifically, the ninth determining unit 3901 includes:

a third receiving module 39011, configured to receive third allocation information and fourth allocation information that are sent by the first radio access network node, where the third allocation information and the fourth allocation information are allocation information determined by the first radio access network node according to service data of the target terminal; and a third determining module 39012, configured to determine that the target radio access network node is the first radio access network node and the second radio access network node according to the third allocation information and the fourth allocation information; or a second generation module 39013, configured to generate the fourth allocation information according to service data of the target terminal;

a fourth sending module 39014, configured to send the fourth allocation information to the first radio access network node, so that the first radio access network node determines the third allocation information according to the fourth allocation information, and the first radio access network node sends the fourth allocation information to the second radio access network node; and a fourth determining module 39015, configured to determine that the target radio access network node is the first radio access network node and the second radio access network node according to the third allocation information and the fourth allocation information.

The second radio access network node includes: a tenth determining unit 3902, configured to determine the third allocation information and the fourth allocation information;

a twelfth determining unit 3903, configured to: according to the third allocation information, determine that a third media access control layer function configured by the first radio access network node is all functions of a media access control layer that can serve the target terminal;

a fifth configuration unit 3904, configured to: according to the fourth allocation information, configure a fourth media access control layer function used to serve the target terminal, where the third allocation information is used to instruct the first radio access network node to configure the third media access control layer function used to serve the target terminal, and the third media access control layer function and the fourth media access control layer function collaboratively serve the target terminal; where the fifth configuration unit 3904 is further configured to configure the fourth media access control layer function according to the fourth allocation information, where the fourth media access control layer function is all functions of a media access control layer that can serve the target terminal;

a nineteenth sending unit 3905, configured to send downlink control information to the first radio access network node, where the downlink control information includes HARQ information and/or downlink assignment information, so that a media access control layer of the first radio access network node generates downlink data according to the third media access control layer function and the downlink control information, and the media access control layer of the first radio access network node sends the downlink data to the second radio access network node;

a twelfth processing unit 3906, configured to be used by a media access control layer of the second radio access network node to process the downlink data according to the fourth media access control layer function so as to generate processed downlink data;

a twentieth sending unit 3907, configured to send the processed downlink data to the target terminal, where the processed downlink data includes a MAC SDU and/or a downlink MAC CE;

a twenty-fifth receiving unit 3908, configured to receive uplink data sent by the target terminal, where the uplink data includes a MAC SDU and/or an uplink MAC CE;

a thirteenth processing unit 3909, configured to be used by the media access control layer of the second radio access network node to process the uplink data according to the fourth media access control layer function so as to generate processed uplink data; and a twenty-first sending unit 3910, configured to send the processed uplink data to the first radio access network node, so that the media access control layer of the first radio access network node receives the processed uplink data, and the media access control layer of the first radio access network node processes the processed uplink data according to the third media access control layer function.

Figure 40:
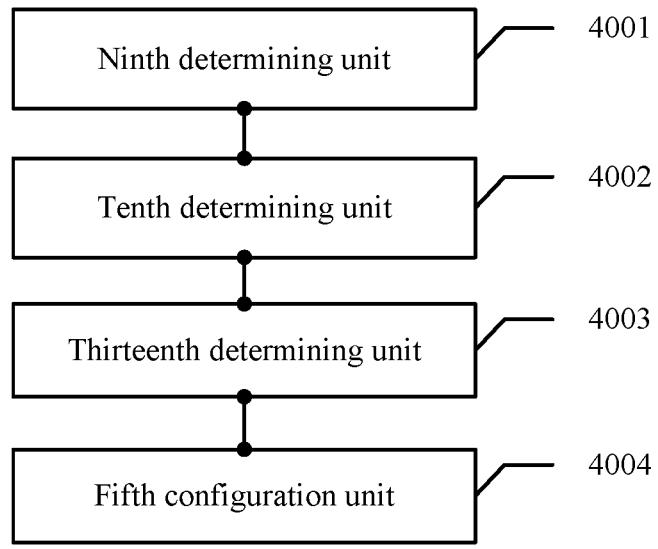
FIG. 40 is another schematic structural diagram of a second radio access network node according to an embodiment of the present disclosure.

With reference to an embodiment shown in FIG. 40, the following describes in detail a specific structure of the second radio access network node when the first radio access network node and the second radio access network node can together serve different services of the target terminal.

The second radio access network node includes: a ninth determining unit 4001, configured to determine that the target radio access network node is the first radio access network node and the second radio access network node;

a tenth determining unit 4002, configured to determine third allocation information and fourth allocation information;

a thirteenth determining unit 4003, configured to: according to the third allocation information, determine that the first radio access network node configures a third media access control layer function, where the third media access control layer function is all functions that are of a media access control layer of the first radio access network node and are used to serve first service data of the target terminal, and service data of the target terminal includes the first service data and second service data; and a fifth configuration unit 4004, configured to: according to the fourth allocation information, configure a fourth media access control layer function used to serve the target terminal, where the third allocation information is used to instruct the first radio access network node to configure the third media access control layer function used to serve the target terminal, and the third media access control layer function and the fourth media access control layer function collaboratively serve the target terminal;

the fifth configuration unit 4004 is further configured to: according to the fourth allocation information, configure the fourth media access control layer function used to serve the second service data of the target terminal, where the fourth media access control layer function is all functions that are of a media access control layer of the second radio access network node and are used to serve the second service data of the target terminal.

An embodiment of the present disclosure further provides a system that can effectively reduce a performance requirement and costs for an interface between a first radio access network node and a second radio access network node. The system includes:

the first radio access network node shown in FIG. 25 to FIG. 32;

the second radio access network node shown in FIG. 33 to FIG. 40; and at least one target terminal; for specific description of the system, refer to FIG. 3, and details are not described herein.

As shown in FIG. 25 to FIG. 32, a specific structure of the first radio access network node is described from a function module perspective. The following describes in detail a specific structure of the first radio access network node from an entity perspective.

Figure 41:
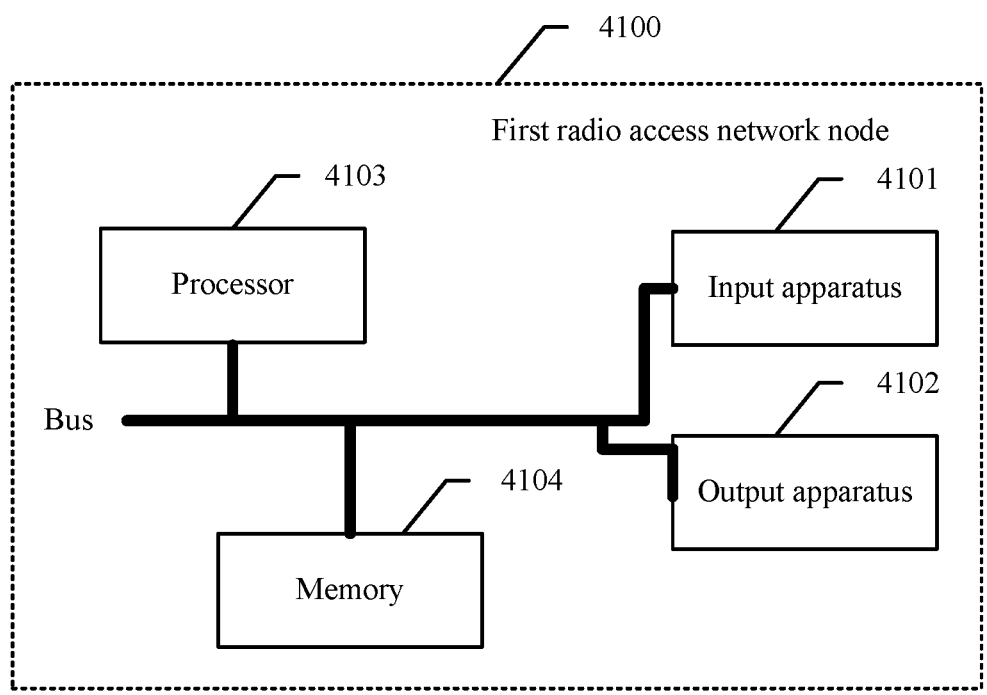
FIG. 41 is another schematic structural diagram of a first radio access network node according to an embodiment of the present disclosure.

As shown in FIG. 41, a first radio access network node 4100 includes:

an input apparatus 4101, an output apparatus 4102, a processor 4103, and a memory 4104 (there may be one or more processors 4103 shown in FIG. 41, and one processor 4103 is used as an example in FIG. 41).

In some embodiments of the present disclosure, the input apparatus 4101, the output apparatus 4102, the processor 4103, and the memory 4104 may be connected by using a bus or in another manner. In FIG. 41, that they are connected by using a bus is used as an example.

The processor 4103 is configured to perform the following steps:

determine a target radio access network node to which a media access control layer serving a target terminal belongs; and determine first allocation information when the target radio access network node is the first radio access network node, where the first allocation information is used to instruct the first radio access network node to configure a first media access control layer function used to serve the target terminal; or when the target radio access network node is a second radio access network node, instruct, by the first radio access network node, the second radio access network node to determine second allocation information, where the second allocation information is used to instruct the second radio access network node to configure a second media access control layer function used to serve the target terminal; or when the target radio access network node is the first radio access network node and a second radio access network node, determine third allocation information and fourth allocation information, where the third allocation information is used to instruct the first radio access network node to configure a third media access control layer function used to serve the target terminal, the fourth allocation information is used to instruct the second radio access network node to configure a fourth media access control layer function used to serve the target terminal, and the third media access control layer function and the fourth media access control layer function collaboratively serve the target terminal.

In other embodiments of the present disclosure, the processor 4103 is configured to perform the following steps:

configure the first media access control layer function according to the first allocation information, where the first media access control layer function is all functions that are of a media access control layer of the first radio access network node and are used to serve the target terminal.

The output apparatus 4102 is configured to perform the following step:

send the first allocation information to the second radio access network node, where the first allocation information is used to enable the second radio access network node to determine that the first radio access network node is the target radio access network node.

In other embodiments of the present disclosure, the processor 4103 is configured to generate configuration information.

The output apparatus 4102 is configured to send the configuration information to the second radio access network node, where the configuration information is used to enable the second radio access network node to determine the second allocation information, so that the second radio access network node configures the second media access control layer function for the target terminal according to the second allocation information, and the second media access control layer function is all functions that are of a media access control layer of the second radio access network node and are used to serve the target terminal.

In other embodiments of the present disclosure, the processor 4103 is configured to determine the third allocation information and the fourth allocation information according to service data of the target terminal; and the output apparatus 4102 is configured to send the third allocation information and the fourth allocation information to the second radio access network node;

or the input apparatus 4101 is configured to receive the fourth allocation information sent by the second radio access network node, where the fourth allocation information is generated by the second radio access network node according to service data of the target terminal;

the processor 4103 is configured to determine the third allocation information according to the fourth allocation information; and the output apparatus 4102 is configured to send the third allocation information to the second radio access network node.

In other embodiments of the present disclosure, the processor 4103 is configured to configure the third media access control layer function for the target terminal according to the third allocation information, where each of the third media access control layer function and the fourth media access control layer function is all functions of a media access control layer that can serve the target terminal.

In other embodiments of the present disclosure, the processor 4103 is configured to determine that the service data of the target terminal includes first service data and second service data; and configure the third media access control layer function for the target terminal according to the third allocation information, where the third media access control layer function is all functions that are of a media access control layer of the first radio access network node and are used to serve the first service data of the target terminal, the fourth allocation information is further used to instruct the second radio access network node to configure the fourth media access control layer function used to serve the second service data of the target terminal, and the fourth media access control layer function is all functions that are of a media access control layer of the second radio access network node and are used to serve the second service data of the target terminal.

In other embodiments of the present disclosure, the input apparatus 4101 is configured to receive a first request message sent by the second radio access network node, where the first request message is used to request to enable the target terminal to access the second radio access network node;

the output apparatus 4102 is configured to send the second radio access network node a first response message generated according to the first request message, so that the second radio access network node processes the first response message and sends a processed first response message to the target terminal, where the processed first response message is used to enable the target terminal to generate a second request message used to trigger the first radio access network node to perform contention resolution, the target terminal sends the second request message to the second radio access network node, and the second radio access network node processes the second request message and sends a processed second request message to the first radio access network node;

the input apparatus 4101 is configured to receive the processed second request message;

the processor 4103 is configured to generate a contention resolution message according to the processed second request message; and the output apparatus 4102 is configured to send a generated second response message to the second radio access network node, where the second response message is used to indicate the contention resolution message, and the second radio access network node processes the second response message and sends a processed second response message to the target terminal, so that the target terminal accesses the second radio access network node or obtains uplink synchronization with the second radio access network node according to the processed second response message.

In other embodiments of the present disclosure, the processor 4103 is configured to allocate a dedicated physical random access channel PRACH resource and a third request message to the target terminal;

the output apparatus 4102 is configured to send the dedicated physical random access channel PRACH resource and the third request message to the second radio access network node, so that the second radio access network node sends the dedicated physical random access channel PRACH resource and the third request message to the target terminal, the target terminal sends the third request message to the second radio access network node by using the dedicated physical random access channel PRACH resource, and the second radio access network node sends the third request message to the first radio access network node;

the input apparatus 4101 is configured to receive the third request message; and the processor 4103 is configured to send the second radio access network node a third response message generated according to the third request message, so that the second radio access network node processes the third response message and sends a processed third response message to the target terminal, so that the target terminal accesses the second radio access network node or obtains uplink synchronization with the second radio access network node according to the processed third response message.

In other embodiments of the present disclosure, the input apparatus 4101 is configured to receive a fourth request message sent by the second radio access network node, where the fourth request message is used to request to enable the target terminal to access the second radio access network node;

the output apparatus 4102 is configured to send the second radio access network node a fourth response message generated according to the fourth request message, so that the second radio access network node processes the fourth response message and sends a processed fourth response message to the target terminal, where the processed fourth response message is used to enable the target terminal to generate a fifth request message used to trigger the first radio access network node to perform contention resolution, the target terminal sends the fifth request message to the second radio access network node, and the second radio access network node processes the fifth request message and sends a processed fifth request message to the first radio access network node;

the input apparatus 4101 is configured to receive the processed fifth request message;

the processor 4103 is configured to generate a contention resolution message according to the processed fifth request message; and the output apparatus 4102 is configured to send the contention resolution message to the second radio access network node, so that the second radio access network node generates a fifth response message according to the contention resolution message, and the second radio access network node processes the fifth response message and sends a processed fifth response message to the target terminal, so that the target terminal determines to access the second radio access network node or obtain uplink synchronization with the second radio access network node according to the processed fifth response message.

In other embodiments of the present disclosure, the processor 4103 is configured to generate downlink data and downlink control information according to the first media access control layer function, where the downlink data includes a downlink media access control service data unit MAC SDU and/or a downlink MAC CE, and the downlink control information includes HARQ information and downlink assignment information; and the output apparatus 4102 is configured to send the downlink data and the downlink control information to the second radio access network node, so that the second radio access network node sends the downlink data and the downlink control information to the target terminal.

In other embodiments of the present disclosure, the processor 4103 is configured to generate uplink control information according to the first media access control layer function;

the output apparatus 4102 is configured to send the uplink control information to the second radio access network node, so that the second radio access network node sends the uplink control information to the target terminal, where the uplink control information includes uplink hybrid automatic repeat request HARQ information and uplink grant information;

the input apparatus 4101 is configured to be used by the media access control layer to receive uplink data, where the uplink data is sent by the target terminal to the second radio access network node, so that the second radio access network node sends the uplink data to the first radio access network node, the uplink data is generated by the target terminal according to the uplink control information, and the uplink data includes a MAC SDU and/or an uplink MAC CE; and the processor 4103 is configured to be used by the media access control layer of the first radio access network node to process the uplink data according to the first media access control layer function.

In other embodiments of the present disclosure, the input apparatus 4101 is configured to receive channel state information CSI and/or a scheduling request SR of the target terminal, where the CSI and/or the SR are/is sent by the target terminal to the second radio access network node, and the second radio access network node sends the CSI and/or the SR to the first radio access network node;

the processor 4103 is configured to generate downlink data; and the output apparatus 4102 is configured to send the downlink data to the second radio access network node, so that the media access control layer of the second radio access network node processes the downlink data according to the second media access control layer function so as to generate processed downlink data, and the second radio access network node sends the processed downlink data to the target terminal, where the processed downlink data includes a MAC SDU and/or a downlink MAC CE.

In other embodiments of the present disclosure, the input apparatus 4101 is configured to receive processed uplink data, where the processed uplink data is data that is generated after the media access control layer of the second radio access network node processes uplink data according to the second media access control layer function, the uplink data is sent by the target terminal to the second radio access network node, and the uplink data includes a MAC SDU and/or an uplink MAC CE.

In other embodiments of the present disclosure, the input apparatus 4101 is configured to receive downlink control information sent by the second radio access network node, where the downlink control information includes HARQ information and/or downlink assignment information;

the processor 4103 is configured to be used by the media access control layer of the first radio access network node to generate downlink data according to the third media access control layer function and the downlink control information; and the output apparatus 4102 is configured to be used by the media access control layer of the first radio access network node to send the downlink data to the second radio access network node, so that the media access control layer of the second radio access network node processes the downlink data according to the fourth media access control layer function so as to generate processed downlink data, and the second radio access network node sends the processed downlink data to the target terminal, where the processed downlink data includes a MAC SDU and/or a downlink MAC CE.

In other embodiments of the present disclosure, the processor 4103 is configured to be used by the media access control layer of the first radio access network node to receive processed uplink data, where the processed uplink data is data that is generated after the media access control layer of the second radio access network node processes uplink data according to the fourth media access control layer function, and the uplink data includes a MAC SDU and/or an uplink MAC CE; and used by the media access control layer of the first radio access network node to process the processed uplink data according to the third media access control layer function.

Figure 42:
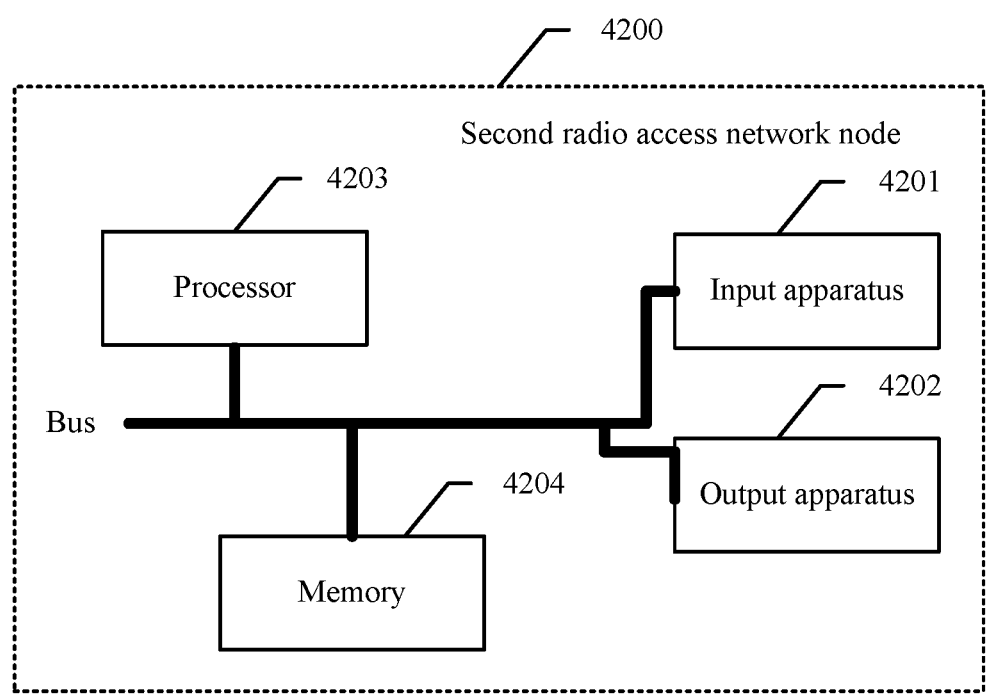
FIG. 42 is another schematic structural diagram of a second radio access network node according to an embodiment of the present disclosure.

As shown in FIG. 33 to FIG. 40, a specific structure of the second radio access network node is described from a function module perspective. With reference to FIG. 42, the following describes in detail a specific structure of the second radio access network node from an entity perspective.

As shown in FIG. 42, a second radio access network node 4200 includes:

an input apparatus 4201, an output apparatus 4202, a processor 4203, and a memory 4204 (there may be one or more processors 4203 shown in FIG. 42, and one processor 4203 is used as an example in FIG. 42).

In some embodiments of the present disclosure, the input apparatus 4201, the output apparatus 4202, the processor 4203, and the memory 4204 may be connected by using a bus or in another manner. In FIG. 42, that they are connected by using a bus is used as an example.

The input apparatus 4201 is configured to perform the following step:

receive first allocation information sent by a first radio access network node, where the first allocation information is used to instruct the first radio access network node to configure a first media access control layer function used to serve a target terminal.

The processor 4203 is configured to perform the following steps:

determine that a target radio access network node is the first radio access network node according to the first allocation information, where the target radio access network node is a radio access network node to which a media access control layer used to serve the target terminal belongs; or determine that the target radio access network node is the second radio access network node;

determine second allocation information; and according to the second allocation information, configure a second media access control layer function used to serve the target terminal; or determine that the target radio access network node is the first radio access network node and the second radio access network node;

determine third allocation information and fourth allocation information; and according to the fourth allocation information, configure a fourth media access control layer function used to serve the target terminal, where the third allocation information is used to instruct the first radio access network node to configure a third media access control layer function used to serve the target terminal, and the third media access control layer function and the fourth media access control layer function collaboratively serve the target terminal.

In other embodiments of the present disclosure, the processor 4203 is further configured to determine, according to the first allocation information, that the first media access control layer function is all functions that are of a media access control layer of the first radio access network node and are used to serve the target terminal.

In other embodiments of the present disclosure, the input apparatus 4201 is configured to receive configuration information sent by the first radio access network node, where the configuration information is used to indicate that the target radio access network node is the second radio access network node; and the processor 4203 is further configured to determine that the target radio access network node is the second radio access network node according to the configuration information; and configure the second media access control layer function for the target terminal according to the second allocation information, where the second media access control layer function is all functions that are of a media access control layer of the second radio access network node and are used to serve the target terminal.

In other embodiments of the present disclosure, the input apparatus 4201 is configured to receive the third allocation information and the fourth allocation information that are sent by the first radio access network node, where the third allocation information and the fourth allocation information are allocation information determined by the first radio access network node according to service data of the target terminal;

the processor 4203 is further configured to determine that the target radio access network node is the first radio access network node and the second radio access network node according to the third allocation information and the fourth allocation information; or generate the fourth allocation information according to service data of the target terminal;

the output apparatus 4202 is further configured to send the fourth allocation information to the first radio access network node, so that the first radio access network node determines the third allocation information according to the fourth allocation information, and the first radio access network node sends the fourth allocation information to the second radio access network node; and the processor 4203 is further configured to determine that the target radio access network node is the first radio access network node and the second radio access network node according to the third allocation information and the fourth allocation information.

In other embodiments of the present disclosure, the processor 4203 is further configured to: according to the third allocation information, determine that the third media access control layer function configured by the first radio access network node is all functions of a media access control layer that can serve the target terminal; and configure the fourth media access control layer function according to the fourth allocation information, where the fourth media access control layer function is all functions of a media access control layer that can serve the target terminal.

In other embodiments of the present disclosure, the processor 4203 is further configured to: according to the third allocation information, determine that the first radio access network node configures the third media access control layer function, where the third media access control layer function is all functions that are of the media access control layer of the first radio access network node and are used to serve first service data of the target terminal, and the service data of the target terminal includes the first service data and second service data; and according to the fourth allocation information, configure the fourth media access control layer function used to serve the second service data of the target terminal, where the fourth media access control layer function is all functions that are of the media access control layer of the second radio access network node and are used to serve the second service data of the target terminal.

In other embodiments of the present disclosure, the processor 4203 is further configured to determine a first request message, where the first request message is used to request to enable the target terminal to access the second radio access network node;

the output apparatus 4202 is further configured to send the first request message to the first radio access network node, so that the first radio access network node sends the second radio access network node a first response message generated according to the first request message;

the input apparatus 4201 is further configured to receive the first response message;

the processor 4203 is further configured to process the first response message and send a processed first response message to the target terminal, where the processed first response message is used to enable the target terminal to generate a second request message used to trigger the first radio access network node to perform contention resolution, and the target terminal sends the second request message to the second radio access network node;

the input apparatus 4201 is further configured to receive the second request message;

the processor 4203 is further configured to process the second request message and send a processed second request message to the first radio access network node, so that the first radio access network node receives the processed second request message, the first radio access network node generates a contention resolution message according to the processed second request message, and the first radio access network node sends a generated second response message to the second radio access network node, where the second response message is used to indicate the contention resolution message;

the input apparatus 4201 is further configured to receive the second response message; and the processor 4203 is further configured to process the second response message and send a processed second response message to the target terminal, so that the target terminal accesses the second radio access network node or obtains uplink synchronization with the second radio access network node according to the processed second response message.

In other embodiments of the present disclosure, the input apparatus 4201 is further configured to receive a dedicated physical random access channel PRACH resource and a third request message that are allocated by the first radio access network node to the target terminal;

the output apparatus 4202 is further configured to send the dedicated physical random access channel PRACH resource and the third request message to the target terminal, so that the target terminal sends the third request message to the second radio access network node by using the dedicated physical random access channel PRACH resource; and send the third request message to the first radio access network node, so that the first radio access network node receives the third request message, and the first radio access network node sends the second radio access network node a third response message generated according to the third request message;

the input apparatus 4201 is further configured to receive the third response message; and the processor 4203 is further configured to process the third response message and send a processed third response message to the target terminal, so that the target terminal accesses the second radio access network node or obtains uplink synchronization with the second radio access network node according to the processed third response message.

In other embodiments of the present disclosure, the processor 4203 is further configured to generate a fourth request message, where the fourth request message is used to request to enable the target terminal to access the second radio access network node;

the output apparatus 4202 is further configured to send the fourth request message to the first radio access network node, so that the first radio access network node sends the second radio access network node a fourth response message generated according to the fourth request message;

the input apparatus 4201 is further configured to receive the fourth response message;

the processor 4203 is further configured to process the fourth response message and send a processed fourth response message to the target terminal, where the processed fourth response message is used to enable the target terminal to generate a fifth request message used to trigger the first radio access network node to perform contention resolution, and the target terminal sends the fifth request message to the second radio access network node;

the input apparatus 4201 is further configured to receive the fifth request message; and the processor 4203 is further configured to process the fifth request message and send a processed fifth request message to the first radio access network node, so that the first radio access network node receives the processed fifth request message, the first radio access network node generates a contention resolution message according to the processed fifth request message, and the first radio access network node sends the contention resolution message to the second radio access network node;

generate a fifth response message according to the contention resolution message; and process the fifth response message and send a processed fifth response message to the target terminal, so that the target terminal determines to access the second radio access network node or obtain uplink synchronization with the second radio access network node according to the processed fifth response message.

In other embodiments of the present disclosure, the input apparatus 4201 is further configured to receive downlink data and downlink control information that are sent by the first radio access network node, where the downlink data and the downlink control information are generated by the first radio access network node according to the first media access control layer function, the downlink data includes a downlink media access control service data unit MAC SDU and/or a downlink MAC CE, and the downlink control information includes HARQ information and downlink assignment information; and the output apparatus 4202 is further configured to send the downlink data and the downlink control information to the target terminal.

In other embodiments of the present disclosure, the input apparatus 4201 is configured to receive uplink control information sent by the first radio access network node, where the uplink control information is generated by the first radio access network node according to the first media access control layer function;

the output apparatus 4202 is further configured to send the uplink control information to the target terminal, where the uplink control information includes uplink hybrid automatic repeat request HARQ information and uplink grant information;

the input apparatus 4201 is further configured to receive uplink data sent by the target terminal, where the uplink data is generated by the target terminal according to the uplink control information, and the uplink data includes a MAC SDU and/or an uplink MAC CE; and the output apparatus 4202 is further configured to send the uplink data to the first radio access network node, so that the media access control layer of the first radio access network node receives the uplink data, and the media access control layer of the first radio access network node processes the uplink data according to the first media access control layer function.

In other embodiments of the present disclosure, the input apparatus 4201 is further configured to receive channel state information CSI and/or a scheduling request SR of the target terminal that are/is sent by the target terminal; and the output apparatus 4202 is further configured to send the CSI and/or the SR to the first radio access network node, so that the first radio access network node receives the CSI and/or the SR.

In other embodiments of the present disclosure, the input apparatus 4201 is further configured to receive downlink data sent by the first radio access network node;

the processor 4203 is further configured to be used by the media access control layer of the second radio access network node to process the downlink data according to the second media access control layer function so as to generate processed downlink data; and the output apparatus 4202 is further configured to send the processed downlink data to the target terminal, where the processed downlink data includes a MAC SDU and/or a downlink MAC CE.

In other embodiments of the present disclosure, the input apparatus 4201 is further configured to receive uplink data sent by the target terminal, where the uplink data includes a MAC SDU and/or an uplink MAC CE;

the processor 4203 is further configured to be used by the media access control layer of the second radio access network node to process the uplink data according to the second media access control layer function so as to generate processed uplink data; and the output apparatus 4202 is further configured to send the processed uplink data to the first radio access network node.

In other embodiments of the present disclosure, the output apparatus 4202 is further configured to send downlink control information to the first radio access network node, where the downlink control information includes HARQ information and/or downlink assignment information, so that the media access control layer of the first radio access network node generates downlink data according to the third media access control layer function and the downlink control information, and the media access control layer of the first radio access network node sends the downlink data to the second radio access network node;

the processor 4203 is further configured to be used by the media access control layer of the second radio access network node to process the downlink data according to the fourth media access control layer function so as to generate processed downlink data, and the output apparatus 4202 is further configured to send the processed downlink data to the target terminal, where the processed downlink data includes a MAC SDU and/or a downlink MAC CE.

In other embodiments of the present disclosure, the input apparatus 4201 is further configured to receive uplink data sent by the target terminal, where the uplink data includes a MAC SDU and/or an uplink MAC CE;

the processor 4203 is further configured to be used by the media access control layer of the second radio access network node to process the uplink data according to the fourth media access control layer function so as to generate processed uplink data; and the output apparatus 4202 is further configured to send the processed uplink data to the first radio access network node, so that the media access control layer of the first radio access network node receives the processed uplink data, and the media access control layer of the first radio access network node processes the processed uplink data according to the third media access control layer function.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data transmission method, comprising:
    determining, by a first radio access network node, a target radio access network node to which a media access control layer serving a target terminal belongs;
    when the target radio access network node is the first radio access network node,
        determining, by the first radio access network node, first allocation information used to instruct the first radio access network node to configure a first media access control layer function used to serve the target terminal,
        receiving, by the first radio access network node, a first request message from a second radio access network node, wherein the first request message is used to request to enable the target terminal to access the second radio access network node,
        sending, by the first radio access network node, to the second radio access network node a first response message generated according to the first request message, so that the second radio access network node processes the first response message and sends a processed first response message to the target terminal, wherein the processed first response message is used to enable the target terminal to generate a second request message used to trigger the first radio access network node to perform contention resolution, so that the target terminal sends the second request message to the second radio access network node, and the second radio access network node processes the second request message and sends a processed second request message to the first radio access network node,
        receiving by the first radio access network node, the processed second request message;
        generating, by the first radio access network node, a contention resolution message according to the processed second request message, and
        sending, by the first radio access network node, a generated second response message to the second radio access network node, wherein the second response message is used to indicate the contention resolution message, and the second radio access network node processes the second response message and sends a processed second response message to the target terminal, so that the target terminal accesses the second radio access network node or obtains uplink synchronization with the second radio access network node according to the processed second response message;
    when the target radio access network node is the second radio access network node, instructing, by the first radio access network node, the second radio access network node to determine second allocation information for the second radio access network node to configure a second media access control layer function used to serve the target terminal;
    when the target radio access network node is the first radio access network node and the second radio access network node:
        determining, by the first radio access network node, third allocation information used to instruct the first radio access network node to configure a third media access control layer function used to serve the target terminal,
        determining, by the first radio access network node, fourth allocation information for the second radio access network node to configure a fourth media access control layer function used to serve the target terminal; and
        wherein the third media access control layer function and the fourth media access control layer function collaboratively serve the target terminal; and
    when at least one of the service data of the target terminal is reconfigured, added, or deleted, a quality of service (QoS) parameter of a service borne by a control plane signaling radio bearer (SRB) or a user plane data bearer (DRB) is changed, or a wireless condition of the target terminal changes, re-determining, by the first radio access network node, whether the first radio access network node, the second radio access network node, or both the first radio access network node and the second radio access network node are the target radio access network node.

2. The data transmission method according to claim 1, wherein after determining, by the first radio access network node, first allocation information, the method further comprises:
    configuring, by the first radio access network node, the first media access control layer function according to the first allocation information, wherein the first media access control layer function comprises one or more functions of a media access control layer of the first radio access network node used to serve the target terminal; and
    sending, by the first radio access network node, the first allocation information to the second radio access network node for enabling the second radio access network node to determine that the first radio access network node is the target radio access network node.

3. The data transmission method according to claim 1, wherein instructing, by the first radio access network node, the second radio access network node to determine second allocation information comprises:
    generating, by the first radio access network node, configuration information; and
    sending, by the first radio access network node, the configuration information to the second radio access network node for enabling the second radio access network node to determine the second allocation information, and for configuring the second media access control layer function for the target terminal according to the second allocation information, and wherein the second media access control layer function comprise one or more functions of a media access control layer of the second radio access network node used to serve the target terminal.

4. The data transmission method according to claim 1, wherein determining, by the first radio access network node, third allocation information and fourth allocation information comprises:
    determining, by the first radio access network node, the third allocation information and the fourth allocation information according to service data of the target terminal, and sending, by the first radio access network node, the third allocation information and the fourth allocation information to the second radio access network node;
or
receiving, by the first radio access network node, the fourth allocation information from the second radio access network node, wherein the fourth allocation information is generated by the second radio access network node according to service data of the target terminal,
determining, by the first radio access network node, the third allocation information according to the fourth allocation information, and
sending, by the first radio access network node, the third allocation information to the second radio access network node.

5. The data transmission method according to claim 1, wherein after determining, by the first radio access network node, third allocation information and fourth allocation information, the method further comprises:
configuring, by the first radio access network node, the third media access control layer function for the target terminal according to the third allocation information, wherein each of the third media access control layer function and the fourth media access control layer function comprise one or more functions of a media access control layer that can serve the target terminal.

6. The data transmission method according to claim 1, wherein:
before determining, by the first radio access network node, third allocation information and fourth allocation information, the method further comprises:
determining, by the first radio access network node, that service data of the target terminal comprises first service data and second service data; and
after determining, by the first radio access network node, third allocation information and fourth allocation information, the method further comprises:
configuring, by the first radio access network node, the third media access control layer function for the target terminal according to the third allocation information, wherein the third media access control layer function comprises one or more functions of a media access control layer of the first radio access network node used to serve the first service data of the target terminal, and wherein the fourth allocation information is further used to instruct the second radio access network node to configure the fourth media access control layer function used to serve the second service data of the target terminal, and the fourth media access control layer function comprises one or more functions of a media access control layer of the second radio access network node used to serve the second service data of the target terminal.

7. A data transmission method, comprising:
determining, by a first radio access network node, a target radio access network node to which a media access control layer serving a target terminal belongs;
when the target radio access network node is the first radio access network node,
determining, by the first radio access network node, first allocation information used to instruct the first radio access network node to configure a first media access control layer function used to serve the target terminal,
receiving, by the first radio access network node, a first request message from a second radio access network node, wherein the first request message is used to request to enable the target terminal to access the second radio access network node,
sending, by the first radio access network node, to the second radio access network node a first response message generated according to the first request message, so that the second radio access network node processes the first response message and sends a processed first response message to the target terminal,
allocating, by the first radio access network node, a dedicated physical random access channel (PRACH) resource and a third request message to the target terminal;
sending, by the first radio access network node, the PRACH resource and the third request message to the second radio access network node, so that the second radio access network node sends the PRACH resource and the third request message to the target terminal, the target terminal sends the third request message to the second radio access network node by using the PRACH resource, and the second radio access network node sends the third request message to the first radio access network node;
receiving, by the first radio access network node, the third request message; and
sending, by the first radio access network node, the second radio access network node a third response message generated according to the third request message, so that the second radio access network node processes the third response message and sends a processed third response message to the target terminal, so that the target terminal accesses the second radio access network node or obtains uplink synchronization with the second radio access network node according to the processed third response message,
when the target radio access network node is the second radio access network node, instructing, by the first radio access network node, the second radio access network node to determine second allocation information for the second radio access network node to configure a second media access control layer function used to serve the target terminal;
when the target radio access network node is the first radio access network node and the second radio access network node;
determining, by the first radio access network node, third allocation information used to instruct the first radio access network node to configure a third media access control layer function used to serve the target terminal,
determining, by the first radio access network node, fourth allocation information for the second radio access network node to configure a fourth media access control layer function used to serve the target terminal; and
wherein the third media access control layer function and the fourth media access control layer function collaboratively serve the target terminal; and
when at least one of the service data of the target terminal is reconfigured, added, or deleted, a quality of service (QoS) parameter of a service borne by a control plane signaling radio bearer (SRB) or a user plane data bearer (DRB) is changed, or a wireless condition of the target terminal changes, re-determining by the first radio access network node, whether the first radio access network node, the second radio access network node, or both the first radio access network node and the second radio access network node are the target radio access network node.

8. A data transmission method, comprising:
determining, by a first radio access network node, a target radio access network node to which a media access control layer serving target terminal belongs,
when the target radio access network node is the first radio access network node,
  determining, by the first radio access network node, first allocation information used to instruct the first radio access network nose to configure a first media access control layer function used to serve the target terminal,
  receiving, by the first radio access network node, a first request message from a second radio access network node, wherein the first request message is used to request to enable the target terminal to access the second radio access network node,
  sending, by the first radio access network node, to the second radio access network node a first response message generated according to the first request message, so that the second radio access network node processes the first response message and sends a processed first response message to the target terminal,
when the target radio access network node is the second radio access network node,
  instructing, by the first radio access network node, the second radio access network node to determine second allocation information for the second radio access network node to configure a second media access control layer function used to serve the target terminal,
  receiving, by the first radio access network node, a fourth request message from the second radio access network node, wherein the fourth request message is used to request to enable the target terminal to access the second radio access network node;
  sending, by the first radio access network node, the second radio access network node a fourth response message generated according to the fourth request message, so that the second radio access network node processes the fourth response message and sends a processed fourth response message to the target terminal, wherein the processed fourth response message is used to enable the target terminal to generate a fifth request message used to trigger the first radio access network node to perform contention resolution, the target terminal sends the fifth request message to the second radio access network node, and the second radio access network node processes the fifth request message and sends a processed fifth request message to the first radio access network node;
  receiving, by the first radio access network node, the processed fifth request message;
  generating, by the first radio access network node, a contention resolution message according to the processed fifth request message; and
  sending, by the first radio access network node, the contention resolution message to the second radio access network node, so that the second radio access network node generates a fifth response message according to the contention resolution message, and the second radio access network node processes the fifth response message and sends a processed fifth response message to the target terminal, so that the target terminal determines to access the second radio access network node or obtain uplink synchronization with the second radio access network node according to the processed fifth response message;
when the target radio access network node is the first radio access network node and the second radio access network node,
  determining, by the first radio access network node, third allocation information used to instruct the first radio access network node to configure a third media access control layer function used to serve the target terminal,
  determining by the first radio access network node, fourth allocation information for the second radio access network node to configure a fourth media access control layer function used to serve the target terminal; and
  wherein the third media access control layer function and the fourth media access control layer function collaboratively serve the target terminal; and
  when at least one of the service data of the target terminal is reconfigured, added, or deleted, a quality of service (OoS) parameter of a service borne by a control plane signaling radio bearer (SRB) or a user plane data bearer (DRB) is changed, or a wireless condition of the target terminal changes, re-determining, by the first radio access network node, whether the first radio access network node, the second radio access network node, or both the first radio access network node and the second radio access network node are the target radio network access network node.

9. A first radio access network node, comprising:
an input apparatus;
an output apparatus;
a memory; and
a processor configured to:
  determine a target radio access network node to which a media access control layer serving a target terminal belongs,
  when the target radio access network node is determined to be the first radio access network node,
    determine first allocation information used to instruct the first radio access network node to configure a first media access control layer function used to serve the target terminal,
    the input apparatus is further configured to receive a first request message from a second radio access network node, wherein the first request message is used to request to enable the target terminal to access the second radio access network node,
    the output apparatus is further configured to send the second radio access network node a first response message generated according to the first request message, so that the second radio access network node processes the first response message and sends a processed first response message to the target terminal, wherein the processed first response message is used to enable the target terminal to generate a second request message used to trigger the first radio access network node to perform contention resolution, the target terminal sends the second request message to the second radio access network node, and the second radio access network node processes the second request message and sends a processed second request message to the first radio access network node, the input apparatus is further configured to receive the processed second request message;

the processor is further configured to generate a contention resolution message according to the processed second request message, and the output apparatus is further configured to send a generated second response message to the second radio access network node, wherein the second response message is used to indicate the contention resolution message, and the second radio access network node processes the second response message and sends a processed second response message to the target terminal, so that the target terminal accesses the second radio access network node or obtains uplink synchronization with the second radio access network node according to the processed second response message;

when the target radio access network node is determined to be the second radio access network node, instruct the second radio access network node to determine second allocation information, for the second radio access network node to configure a second media access control layer function used to serve the target terminal, when the target radio access network node is the first radio access network node and the second radio access network node, determine third allocation information used to instruct the first radio access network node to configure a third media access control layer function used to serve the target terminal, determine fourth allocation information to instruct the second radio access network node to configure a fourth media access control layer function used to serve the target terminal, and wherein the third media access control layer function and the fourth media access control layer function collaboratively serve the target terminal, and when at least one of service data of the target terminal is reconfigured, added, or deleted, a quality of service (QoS) parameter of a service borne by a control plane signaling radio bearer (SRB) or a user plane data radio bearer (DRB) is changed, or a wireless condition of the target terminal changes, re-determine whether the first radio access network node, the second radio access network node, or both the first radio access network node and the second radio access network node are target radio access network node.

10. The first radio access network node according to claim 9, wherein:

the processor is further configured to configure the first media access control layer function according to the first allocation information, wherein the first media access control layer function is one or more functions that are of a media access control layer of the first radio access network node and are used to serve the target terminal; and the output apparatus is configured to send the first allocation information to the second radio access network node, wherein the first allocation information is used to enable the second radio access network node to determine that the first radio access network node is the target radio access network node.

11. The first radio access network node according to claim 9, wherein:

the processor is configured to generate configuration information; and the output apparatus is configured to send the configuration information to the second radio access network node, wherein the configuration information is used to enable the second radio access network node to determine the second allocation information, so that the second radio access network node configures the second media access control layer function for the target terminal according to the second allocation information, and the second media access control layer function is one or more functions that are of a media access control layer of the second radio access network node and are used to serve the target terminal.

12. The first radio access network node according to claim 9, wherein:

the processor is configured to determine the third allocation information and the fourth allocation information according to service data of the target terminal; and the output apparatus is configured to send the third allocation information and the fourth allocation information to the second radio access network node;

or the input apparatus is configured to receive the fourth allocation information from the second radio access network node, wherein the fourth allocation information is generated by the second radio access network node according to service data of the target terminal;

the processor is configured to determine the third allocation information according to the fourth allocation information; and the output apparatus is configured to send the third allocation information to the second radio access network node.

13. The first radio access network node according to claim 9, wherein:

the processor is further configured to configure the third media access control layer function for the target terminal according to the third allocation information, wherein each of the third media access control layer function and the fourth media access control layer function is one or more functions of a media access control layer that can serve the target terminal.

14. The first radio access network node according to claim 9, wherein:

the processor is further configured to determine that the service data of the target terminal comprises first service data and second service data; and configure the third media access control layer function for the target terminal according to the third allocation information, wherein the third media access control layer function is one or more functions that are of a media access control layer of the first radio access network node and are used to serve the first service data of the target terminal, the fourth allocation information is further used to instruct the second radio access network node to configure the fourth media access control layer function used to serve the second service data of the target terminal, and the fourth media access control layer function is one or more functions that are of a media access control layer of the second radio access network node and are used to serve the second service data of the target terminal.

15. A first radio access network node, comprising:
an input apparatus;
an output apparatus,
a memory; and
a processor configured to,
  determine a target radio access network node to which a media access control layer serving a target terminal belongs,
  when the target radio access network node is determined to be the first radio access network node,
    determine first allocation information used to instruct the first radio access network node to configure a first media access control layer function used to serve the target terminal,
    the input apparatus is further configured to receive a first request message from a second radio access network node, wherein the first request message is used to request to enable the target terminal to access the second radio access network node,
    the output apparatus is further configured to send the second radio access network node a first response message generated according to the first request message, so that the second radio access network node processes the first response message and sends a processed first response message to the target terminal,
    the processor is further, configured to allocate a dedicated physical random access channel (PRACH) resource and a third request message to the target terminal;
    the output apparatus is further configured to send the PRACH resource and the third request message to the second radio access network node, so that the second radio access network node sends the PRACH resource and the third request message to the target terminal, the target terminal sends the third request message to the second radio access network node by using the PRACH resource, and the second radio access network node sends the third request message to the first radio access network node;
    the input apparatus is further configured to receive the third request message; and
    the output apparatus is further configured to send the second radio access network node a third response message generated according to the third request message, so that the second radio access network node processes the third response message and sends a processed third response message to the target terminal, so that the target terminal accesses the second radio access network node or obtains uplink synchronization with the second radio access network node according to the processed third response message;
  when the target radio access network node is determined to be the second radio access network node, instruct the second radio access network node to determine second allocation information, for the second radio access network node to configure a second media access control layer function used to serve the target terminal,
  when the target radio access network node is the first radio access network node and the second radio access network node, determine third allocation information used to instruct the first radio access network node to configure a third media access control layer function used to serve the target terminal, determine fourth allocation information to instruct the second radio access network node to configure a fourth media access control layer function used to serve the target terminal, and wherein the third media access control layer function and the fourth media access control layer function collaboratively serve the target terminal, and
  when at least one of service data of the target terminal is reconfigured, added, or deleted, a quality of service (QoS) parameter of a service borne by a control plane signaling radio bearer (SRB) or a user plane data radio bearer (DRB) is changed, or a wireless condition of the target terminal changes, re-determine whether the first radio access network node, the second radio access network node, or both the first radio access network node and the second radio access network node are target radio access network node.

16. A first radio access network node, comprising:
an input apparatus;
an output apparatus;
a memory, and
a processor configured to:
  determine a target radio access network node to which a media access control layer serving a target terminal belongs,
  when the target radio access network node is determined to be the first radio access network node,
    determine first allocation information used to instruct the first radio access network node to configure a first media access control layer function used to serve the target terminal,
    the input apparatus is further configured to receive a first request message from a second radio access network node, wherein the first request message is used to request to enable the target terminal to access the second radio access network node,
    the output apparatus is further configured to receive a first request radio access network node a first response message generated according to the first request message, so that the second radio access network node processes the first response message and send a processed first response message to the target terminal,
  when the target radio access network node is determined to be the second radio access network node,
    instruct the second radio access network node to determine second allocation information, for the second radio access network node to configure a second media access control layer function used to serve the target terminal,
    the input apparatus is further configured to receive a fourth request message from the second radio access network node, wherein the fourth request message is used to request to enable the target terminal to access the second radio access network node;
    the processor is further configured to send the second radio access network node a fourth response message generated according to the fourth request message, so that the second radio access network node processes the fourth response message and sends a processed fourth response message to the target terminal, wherein the processed fourth response message is used to enable the target terminal to generate a fifth request message used to trigger the first radio access network node to perform contention resolution, the target terminal sends the fifth request message to the second radio access network node, and the second radio access network node processes the fifth request message and sends a processed fifth request message to the first radio access network node;

the input apparatus is further configured to receive the processed fifth request message;

the processor is further configured to generate a contention resolution message according to the processed fifth request message; and the output apparatus is further configured to send the contention resolution message to the second radio access network node, so that the second radio access network node generates a fifth response message according to the contention resolution message, and the second radio access network node processes the fifth response message and sends a processed fifth response message to the target terminal, so that the target terminal determines to access the second radio access network node or obtain uplink synchronization with the second radio access network node according to the processed fifth response message;

when the target radio access network node is the first radio access network node and the second radio access network node, determine third allocation information used to instruct the first radio access network node to configure a third media access control layer function used to serve the target terminal, determine fourth allocation information to instruct the second radio access network node to configure a fourth media access control layer function used to serve the target terminal, and wherein the third media access control layer function and the fourth media access control layer function collaboratively serve the target terminal, and when at least one of service data of the target terminal is reconfigured, added, or deleted, a quality of service (QoS) parameter of a service borne by a control plane signaling radio bearer (SRB) or a user plane data radio bearer (DRB) is changed, or a wireless condition of the target terminal changes, re-determine whether the first radio access network node, the second radio access network node, or both the first radio access network node and the second radio access network node are target radio access network node.

17. A system, comprising:
a first radio access network node, a second radio access network node, and a target terminal, wherein:
the first radio access network node is configured to:
  determine a target radio access network node to which a media access control layer serving a target terminal belongs;
  when the target radio access network node is the first radio access network node,
    determine first allocation information used to instruct the first radio access network node to configure a first media access control layer function used to serve the target terminal,
    receive, by the first radio access network node, a first request message from a second radio access network node, wherein the first request message is used to request to enable the target terminal to access the second radio access network node,
    send, by the first radio access network node, to the second radio access network node a first response message generated according to the first request message, so that the second radio access network node processes the first response message and sends a processed first response message to the target terminal, wherein the processed first response message is used to enable the target terminal to generate a second request message used to trigger the first radio access network node to perform contention resolution, so that the target terminal sends the second request message to the second radio access network node, and the second radio access network node processes the second request message and sends a processed second request message to the first radio access network node,
    receive, by the first radio access network node, the processed second request message;
    generate, by the first radio access network node, a contention resolution message according to the processed second request message; and
    send, by the first radio access network node, a generated second response message to the second radio access network node, wherein the second response message is used to indicate the contention resolution message, and the second radio access network node processes the second response message and sends a processed second response message to the target terminal, so that the target terminal accesses the second radio access network node or obtains uplink synchronization with the second radio access network node according to the processed second response message;
  when the target radio access network node is the second radio access network node, instruct the second radio access network node to determine second allocation information, wherein the second allocation information is used to instruct the second radio access network node to configure a second media access control layer function used to serve the target terminal, and
  when the target radio access network node is the first radio access network node and the second radio access network node, determine third allocation information and fourth allocation information, wherein the third allocation information is used to instruct the first radio access network node to configure a third media access control layer function used to serve the target terminal, the fourth allocation information is used to instruct the second radio access network node to configure a fourth media access control layer function used to serve the target terminal, and the third media access control layer function and the fourth media access control layer function collaboratively serve the target terminal;
the second radio access network node is configured to:
  receive first allocation information from the first radio access network node, and determine that the target radio access network node is the first radio access network node according to the first allocation information, or
  determine that the target radio access network node is the second radio access network node, determine second allocation information, and configure, according to the second allocation information, a second media access control layer function used to serve the target terminal, or determine that the target radio access network node is the first radio access network node and the second radio access network node, determine third allocation information and fourth allocation information, and configure, according to the fourth allocation information, a fourth media access control layer function used to serve the target terminal; and wherein the first radio access network node is further configured to when at least one of the service data of the target terminal is reconfigured, added, or deleted, a quality of service (QoS) parameter of a service borne by a control plane signaling radio bearer (SRB) or a user plane data radio bearer (DRB) is changed, or a wireless condition of the target terminal changes, re-determine whether the first radio access network node, the second radio access network node, or both the first radio access network node and the second radio access network node are the target radio access network node.

* * * * *

UNITED STATES PATENT AND TRADEMARK OFFICE
CERTIFICATE OF CORRECTION

| | | |
|---|---|---|
| PATENT NO. | : 10,856,260 B2 | Page 1 of 1 |
| APPLICATION NO. | : 15/858209 | |
| DATED | : December 1, 2020 | |
| INVENTOR(S) | : Jian Zhang et al. | |

It is certified that error appears in the above-identified patent and that said Letters Patent is hereby corrected as shown below:

In the Claims

In Claim 8, Column 97, Line 9, delete "serving target terminal belongs," and insert --serving a target terminal belongs;--.

In Claim 8, Column 97, Line 14, delete "nose" and insert --node--.

In Claim 8, Column 98, Line 26, delete "(OoS)" and insert --(QoS)--.

In Claim 8, Column 98, Line 34-35, delete "radio network access network node" and insert --radio access network node--.

In Claim 16, Column 102, Line 38-39, delete "configured to receive a first request radio access network node" and insert --configured to send the second radio access network node--.

In Claim 16, Column 102, Line 43, delete "and send a processed" and insert --and sends a processed--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*